(12) United States Patent
Sullad et al.

(10) Patent No.: US 9,553,953 B2
(45) Date of Patent: Jan. 24, 2017

(54) METHOD AND APPARATUS FOR EXTENDING CAPABILITIES OF A VIRTUALIZATION DOMAIN TO SUPPORT FEATURES AVAILABLE IN A NORMAL DESKTOP APPLICATION

(71) Applicant: Dell Products, L.P., Round Rock, TX (US)

(72) Inventors: Roshan Sullad, Karnataka (IN); Curtis J. Schwebke, Los Gatos, CA (US); Stevan Kominac, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 14/460,801

(22) Filed: Aug. 15, 2014

(65) Prior Publication Data

US 2015/0067035 A1 Mar. 5, 2015

Related U.S. Application Data

(63) Continuation-in-part of application No. 12/546,674, filed on Aug. 24, 2009.
(Continued)

(51) Int. Cl.
*G06F 15/16* (2006.01)
*H04L 29/06* (2006.01)
(Continued)

(52) U.S. Cl.
CPC ............ *H04L 67/42* (2013.01); *G06F 3/0481* (2013.01); *G06F 3/0484* (2013.01);
(Continued)

(58) Field of Classification Search
CPC ..................................................... H04L 67/10
(Continued)

(56) References Cited

U.S. PATENT DOCUMENTS

| 4,777,880 A | 10/1988 | Beattie et al. |
| 5,898,419 A | 4/1999 | Liu |

(Continued)

FOREIGN PATENT DOCUMENTS

| WO | 2005/112384 | 11/2005 | ............ H04L 29/06 |
| WO | 2008/087409 A1 | 7/2008 | |

OTHER PUBLICATIONS

Extended European Search Report; Application No. 10764908.9-2211; pp. 7, Oct. 31, 2012.
(Continued)

*Primary Examiner* — David Lazaro
*Assistant Examiner* — Marie Georges Henry
(74) *Attorney, Agent, or Firm* — Baker Botts L.L.P.

(57) ABSTRACT

Examples of systems and methods are provided for communication and for establishing a remote session between a client device and a remote server using RDP. An RDP share option is enabled to notify the remote server of a request for a shared RDP session. Multiple client devices may connect to the single shared RDP session. One client device may be considered the presenter and given special permissions. Any other client devices may be considered attendees and given only restricted access. Multiple RDP sessions may be initiated for multiple client devices.

20 Claims, 60 Drawing Sheets

Related U.S. Application Data

(60) Provisional application No. 61/169,664, filed on Apr. 15, 2009, provisional application No. 61/169,667, filed on Apr. 15, 2009.

(51) Int. Cl.
  *G06F 9/44* (2006.01)
  *G06F 3/0481* (2013.01)
  *G06F 3/0484* (2013.01)
  *H04L 29/08* (2006.01)

(52) U.S. Cl.
  CPC ............ *G06F 9/4445* (2013.01); *H04L 63/08* (2013.01); *H04L 63/0853* (2013.01); *H04L 63/10* (2013.01); *H04L 63/126* (2013.01); *H04L 67/02* (2013.01); *H04L 67/08* (2013.01)

(58) Field of Classification Search
  USPC ................................ 709/203, 217, 219, 227
  See application file for complete search history.

(56) References Cited

U.S. PATENT DOCUMENTS

| | | |
|---|---|---|
| 5,918,039 A | 6/1999 | Buswell et al. |
| 5,961,582 A | 10/1999 | Gaines |
| 6,020,881 A | 2/2000 | Naughton et al. |
| 6,085,247 A | 7/2000 | Parsons, Jr. et al. |
| 6,128,010 A | 10/2000 | Baxter et al. |
| 6,286,003 B1 | 9/2001 | Muta |
| 6,341,097 B1 | 1/2002 | Hsu et al. |
| 6,430,609 B1 | 8/2002 | Dewhurst et al. |
| 6,483,813 B1 | 11/2002 | Blencowe |
| 6,510,229 B1 | 1/2003 | Geile |
| 6,518,965 B2 | 2/2003 | Dye et al. |
| 6,654,784 B1 | 11/2003 | Wei |
| 6,710,790 B1 | 3/2004 | Fagioli |
| 6,784,855 B2 | 8/2004 | Matthews et al. |
| 6,836,885 B1 | 12/2004 | Buswell et al. |
| 6,920,502 B2 | 7/2005 | Araujo et al. |
| 6,938,221 B2 | 8/2005 | Nguyen |
| 6,950,991 B2 | 9/2005 | Bloomfield et al. |
| 6,990,477 B2 | 1/2006 | Cotner et al. |
| 7,093,003 B2 | 8/2006 | Yuh et al. |
| 7,177,902 B2 | 2/2007 | Hubbard |
| 7,213,228 B2 | 5/2007 | Putterman et al. |
| 7,242,406 B2 | 7/2007 | Robotham et al. |
| 7,274,368 B1 | 9/2007 | Keslin |
| 7,293,243 B1 | 11/2007 | Ben-Shachar et al. |
| 7,430,681 B1 | 9/2008 | Hobbs |
| 7,475,421 B2 | 1/2009 | Abdo et al. |
| 7,489,306 B2 | 2/2009 | Kolmykov-Zotov et al. |
| 7,502,754 B2 | 3/2009 | Campbell et al. |
| 7,512,906 B1 | 3/2009 | Baier et al. |
| 7,577,924 B2 | 8/2009 | Nguyen |
| 7,584,505 B2 | 9/2009 | Mondri et al. |
| 7,590,744 B2* | 9/2009 | Richardson ............. H04L 67/08 709/227 |
| 7,607,128 B2 | 10/2009 | Arthurs et al. |
| 7,685,539 B2 | 3/2010 | Nguyen |
| 7,703,047 B2 | 4/2010 | Keely, Jr. et al. |
| 7,705,829 B1 | 4/2010 | Plotnikov |
| 7,711,366 B1 | 5/2010 | O'Neil et al. |
| 7,747,086 B1 | 6/2010 | Hobbs et al. |
| 7,870,496 B1 | 1/2011 | Sherwani |
| 7,895,521 B2 | 2/2011 | Bhogal et al. |
| 7,996,461 B1 | 8/2011 | Kobres et al. |
| 8,024,407 B2 | 9/2011 | Harwood et al. |
| 8,078,164 B2 | 12/2011 | Ganesan |
| 8,882,666 B1 | 11/2014 | Goldberg et al. |
| 2002/0057295 A1 | 5/2002 | Panasyuk et al. |
| 2002/0099829 A1 | 7/2002 | Richards et al. |
| 2002/0118175 A1 | 8/2002 | Liebenow et al. |
| 2002/0126099 A1 | 9/2002 | Engholm |
| 2002/0165993 A1 | 11/2002 | Kramer |
| 2003/0012216 A1 | 1/2003 | Novacs |
| 2003/0018725 A1* | 1/2003 | Turner .................. H04L 12/581 709/206 |
| 2003/0087601 A1 | 5/2003 | Agam et al. |
| 2003/0122856 A1 | 7/2003 | Hubbard |
| 2003/0160813 A1 | 8/2003 | Raju |
| 2003/0177322 A1 | 9/2003 | Crockett et al. |
| 2004/0039827 A1* | 2/2004 | Thomas .................. H04L 29/06 709/228 |
| 2004/0141010 A1 | 7/2004 | Fitzmaurice et al. |
| 2004/0205117 A1 | 10/2004 | Hertling et al. |
| 2004/0205260 A1 | 10/2004 | Oki et al. |
| 2005/0012723 A1 | 1/2005 | Pallakoff |
| 2005/0091359 A1 | 4/2005 | Soin et al. |
| 2005/0101300 A1 | 5/2005 | Hon et al. |
| 2005/0114797 A1 | 5/2005 | Nguyen |
| 2005/0120312 A1 | 6/2005 | Nguyen |
| 2005/0184145 A1 | 8/2005 | Law et al. |
| 2005/0197136 A1 | 9/2005 | Friday et al. |
| 2005/0246445 A1 | 11/2005 | Panasyuk et al. |
| 2005/0267935 A1 | 12/2005 | Gandhi et al. |
| 2005/0278708 A1 | 12/2005 | Zhao et al. |
| 2006/0026535 A1 | 2/2006 | Hotelling et al. |
| 2006/0068769 A1 | 3/2006 | Adya et al. |
| 2006/0075114 A1 | 4/2006 | Panasyuk et al. |
| 2006/0085381 A1 | 4/2006 | Fugate et al. |
| 2006/0179118 A1 | 8/2006 | Stirbu |
| 2006/0206827 A1 | 9/2006 | DeWitt |
| 2007/0008922 A1 | 1/2007 | Abhishek et al. |
| 2007/0050470 A1 | 3/2007 | Suzuki et al. |
| 2007/0056009 A1 | 3/2007 | Spilo et al. |
| 2007/0061460 A1 | 3/2007 | Khan et al. |
| 2007/0067328 A1 | 3/2007 | Mingot et al. |
| 2007/0140189 A1 | 6/2007 | Muhamed et al. |
| 2007/0156677 A1 | 7/2007 | Szabo |
| 2007/0192329 A1 | 8/2007 | Croft et al. |
| 2007/0234048 A1 | 10/2007 | Ziv |
| 2007/0236470 A1 | 10/2007 | Abanami et al. |
| 2007/0262964 A1 | 11/2007 | Zotov et al. |
| 2007/0288640 A1 | 12/2007 | Schmieder |
| 2008/0005236 A1* | 1/2008 | Schmieder .......... H04L 65/4084 709/204 |
| 2008/0016467 A1 | 1/2008 | Chambers et al. |
| 2008/0082666 A1* | 4/2008 | Brandstatter ........... G06F 9/505 709/226 |
| 2008/0088602 A1 | 4/2008 | Hotelting |
| 2008/0155012 A1 | 6/2008 | Chiang |
| 2008/0222416 A1 | 9/2008 | Kiwimagi et al. |
| 2008/0222618 A1 | 9/2008 | Valtchev |
| 2008/0270910 A1 | 10/2008 | Lukaskik et al. |
| 2008/0291210 A1 | 11/2008 | Partani et al. |
| 2008/0316218 A1 | 12/2008 | Kilani et al. |
| 2009/0016529 A1 | 1/2009 | Gopinath et al. |
| 2009/0058822 A1 | 3/2009 | Chaudhri |
| 2009/0083628 A1 | 3/2009 | Fitzmaurice et al. |
| 2009/0083829 A1* | 3/2009 | Peterson ............. G06F 9/45558 726/1 |
| 2009/0106662 A1 | 4/2009 | Ye et al. |
| 2009/0164564 A1 | 6/2009 | Willis |
| 2009/0193340 A1 | 7/2009 | Mahajan et al. |
| 2009/0322687 A1 | 12/2009 | Duncan et al. |
| 2010/0005395 A1 | 1/2010 | Shirakawa |
| 2010/0011299 A1 | 1/2010 | Brodersen et al. |
| 2010/0049820 A1 | 2/2010 | Richardson et al. |
| 2010/0131654 A1 | 5/2010 | Malakapalli et al. |
| 2010/0138780 A1 | 6/2010 | Marano et al. |
| 2010/0174713 A1 | 7/2010 | Baessler et al. |
| 2010/0177645 A1 | 7/2010 | Kang et al. |
| 2010/0217874 A1* | 8/2010 | Anantharaman . H04L 29/12528 709/228 |
| 2010/0250903 A1 | 9/2010 | Jensen |
| 2010/0323762 A1 | 12/2010 | Sindhu |
| 2011/0029896 A1 | 2/2011 | Cheng |
| 2011/0093822 A1 | 4/2011 | Sherwani |
| 2011/0099497 A1 | 4/2011 | Fok et al. |

(56) References Cited

U.S. PATENT DOCUMENTS

2011/0239127 A1     9/2011    Meng et al.
2011/0246904 A1    10/2011    Pinto et al.

OTHER PUBLICATIONS

Sanz et al., "XML Based Integration of Web, Mobile and Desktop Components in a Service Oriented Architecture", Aug. 29, 2008, International Symposium on Distributed Computing and Artificial Intelligence 2008, vol. 50/2009, pp. 565-573.

Filip, "Jaadu", http://www.creativeapplications.net/iphonejaadu-vnc-iphone/, Dec. 26, 2008, pp. 1-5.

Garrett, "TiPb at Work: Jaadu VNC vs. Mocha VNC", http://www.tipb.com/2008/10/22/tipb-at-work-jaadu-vnc-vs-mocha-vnc/, Oct. 22, 2008, pp. 1-6.

\* cited by examiner

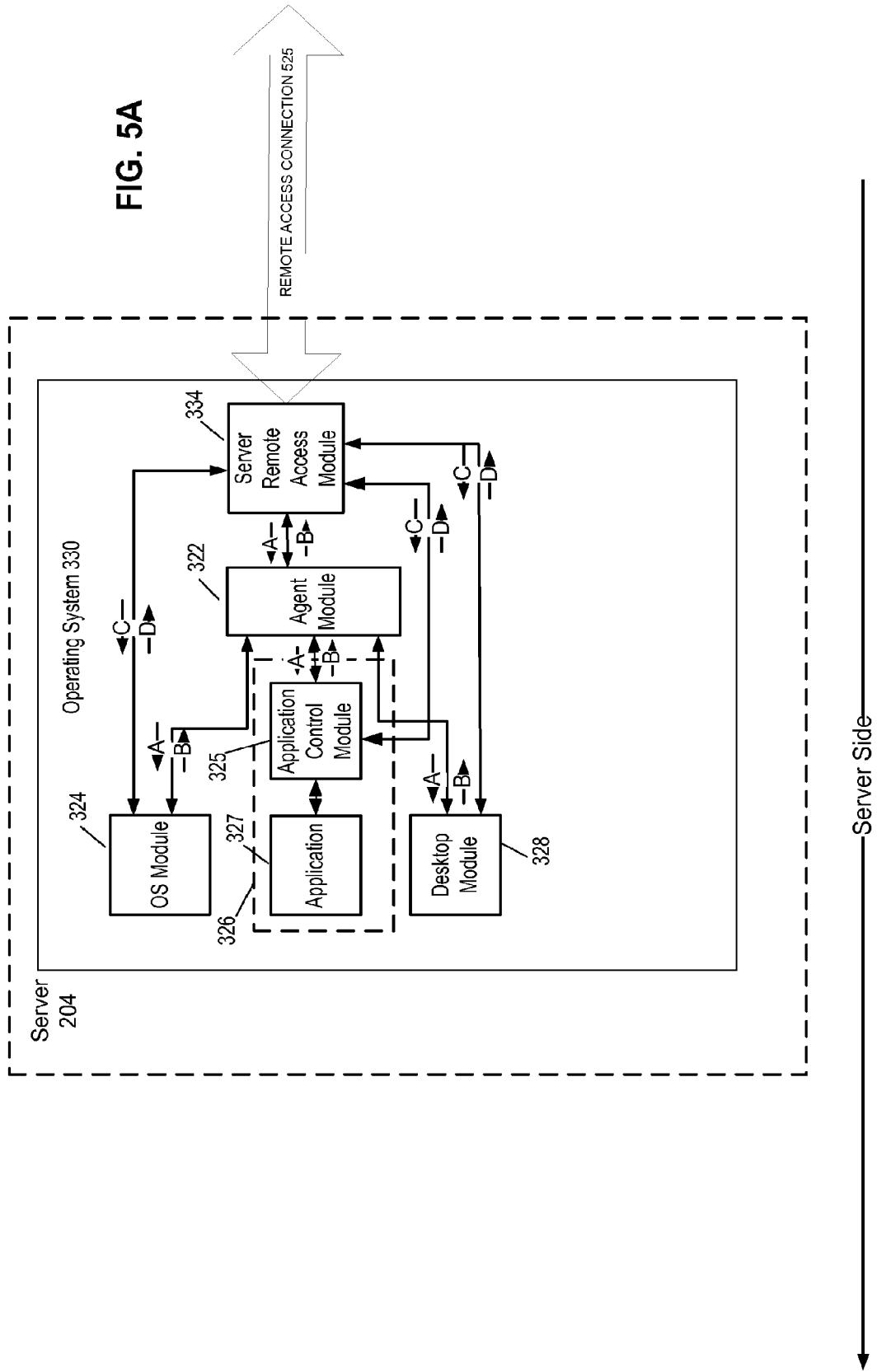

METHOD AND APPARATUS FOR EXTENDING CAPABILITIES OF A VIRTUALIZATION DOMAIN TO SUPPORT FEATURES AVAILABLE IN A NORMAL DESKTOP APPLICATION

CROSS-REFERENCES TO RELATED APPLICATIONS

The present application is a continuation-in-part of application Ser. No. 12/546,674, entitled "METHOD AND APPARATUS FOR TRANSFERRING REMOTE SESSION DATA," filed on Aug. 24, 2009 which claims the benefit of priority under 35 U.S.C. §119 from U.S. Provisional Patent Application Ser. No. 61/169,664, entitled "ENABLING SERVER SIDE COMPUTING ON A REMOTE CLIENT WHILE FACILITATING AN IMPROVED USER EXPERIENCE FOR THE REMOTE CLIENT USER," filed on Apr. 15, 2009, and U.S. Provisional Application Ser. No. 61/169,667, entitled "ENABLING SERVER SIDE COMPUTING FROM A REMOTE CLIENT AND FACILITATING THE REMOTE CLIENT TO CUSTOMIZE AND CONTROL A SERVER APPLICATION," filed on Apr. 15, 2009, both of which are hereby incorporated by reference in their entirety for all purposes.

TECHNICAL FIELD

This disclosure relates generally to information handling systems and, more particularly, to redirecting remote cursors in client sessions.

BACKGROUND

One approach to the design and implementation of computer networks, particularly with regard to the development of client/server applications, includes designing client applications and client devices so that the majority of the heavily used resources are at a remote computing device, such as a centralized server, connected via a network. These client devices generally have minimal memory, disk storage, and processor power, but are designed under the premise that most users connected to a powerful server do not need the additional processing power. With these client devices, the total cost of ownership is minimized, because of the reduced resources and because the clients can be centrally administered and updated from the server.

In practice, because a server allows a user logging from a remote client device to access applications on the server, a user is required to establish his identity through an authentication mechanism. Well-known authentication mechanisms may include username/password combination, verification of biometric characteristic of the user (fingerprint, retina scan, etc.), removable security modules such as dongles and smartcards, radio frequency identification (RFID) tags, and others.

These authentication techniques suffer from drawbacks that they may be cumbersome, may be perceived by some users as being intrusive (biometric scans) or may be expensive to implement because they require special sensors, software and/or hardware. Furthermore, these authentications may limit portability of a remote desktop session from one client device to another. A better method for authentication and portability of a remote session is needed.

SUMMARY

In an aspect of the disclosure, a system may be provided at a client device side for communication and for forwarding display data related to a remote session between a client device and a remote server to a host device. The system may comprise one or more of: a client remote session module configured to facilitate establishing the remote session with the remote server, a client trusted relationship module configured to facilitate establishing a trusted relationship between the client device and the host device; and a client forwarding module configured to filter out data related to local graphical user interface (GUI) and selectively forward from the client device to the host device display data related to the remote session established between the client device and the remote server.

In another aspect of the disclosure, a method may be provided at a client device side for communication and for forwarding display data related to a remote session between a client device and a remote server to a host device. The method may comprise one or more of the following: facilitating establishing the remote session with the remote server; facilitating establishing a trusted relationship between the client device and the host device, and filtering out data related to local graphical user interface (GUI), and selectively forwarding, from the client device to the host device, display data related to the remote session established between the client device and the remote server.

In yet another aspect of the disclosure, a machine-readable medium may be encoded with instructions for execution at a client device side for communication and for forwarding display data related to a remote session between a client device and a remote server to a host device. The instructions may comprise code for one or more of the following: facilitating establishing the remote session with the remote server, facilitating establishing a trusted relationship between the client device and the host device and filtering out data related to local graphical user interface (GUI), and selectively forwarding, from the client device to the host device, display data related to the remote session established between the client device and the remote server.

In yet another aspect of the disclosure, an apparatus may be provided for communication and for forwarding display data related to a remote session between a client device and a remote server to a host device. The apparatus may comprise one or more of the following: means for facilitating establishing the remote session with the remote server, means for facilitating establishing a trusted relationship between the client device and the host device, and means for filtering out data related to local graphical user interface (GUI), and means for selectively forwarding, from the client device to the host device, display data related to the remote session established between the client device and the remote server.

In yet another aspect of the disclosure, a system may be provided at a host device side for displaying graphical user interface (GUI) for a remote session between a client device and a remote server. The system may comprise one or more of the following: a host trusted relationship module configured to facilitate establishing a trusted relationship between the client device and the host device, a host display data module configured to receive, from the client device, display data for the remote session established between the client device and the remote server, the display data based on a remote session protocol format, and a host remote session view module configured to facilitate displaying a remote application view based on the received display data for the remote session, wherein the host device is configured to communicate with the client device via a wireless connection.

In yet another aspect of the disclosure, a method may be provided at a host device side for communication and for displaying graphical user interface (GUI) for a remote session between a client device and a remote server. The method may comprise one or more of the following: facilitating establishing a trusted relationship between the client device and the host device, receiving, from the client device, display data for the remote session established between the client device and the remote server, the display data based on a remote session protocol format, and facilitating displaying a remote application view based on the received display data for the remote session, wherein the host device is configured to communicate with the client device via a wireless connection.

In yet another aspect of the disclosure, a machine-readable medium may be encoded with instructions for execution at a host device side for communication and for displaying graphical user interface (GUI) for a remote session between a client device and a remote server. The instructions may comprise code for one or more of the following: facilitating establishing a trusted relationship between the client device and the host device, receiving, from the client device, display data for the remote session established between the client device and the remote server, the display data based on a remote session protocol format, and facilitating displaying a remote application view based on the received display data for the remote session, wherein the host device is configured to communicate with the client device via a wireless connection.

In yet another aspect of the disclosure, an apparatus may be provided for communication and for displaying graphical user interface (GUI) for a remote session between a client device and a remote server, The apparatus may comprise one or more of the following: means for facilitating establishing a trusted relationship between the client device and the host device, means for receiving, from the client device, display data for the remote session established between the client device and the remote server, the display data based on a remote session protocol format, and means for facilitating displaying a remote application view based on the received display data for the remote session, wherein the host device is configured to communicate with the client device via a wireless connection.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 5A is a conceptual block diagram of a server according to certain aspects of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1A:
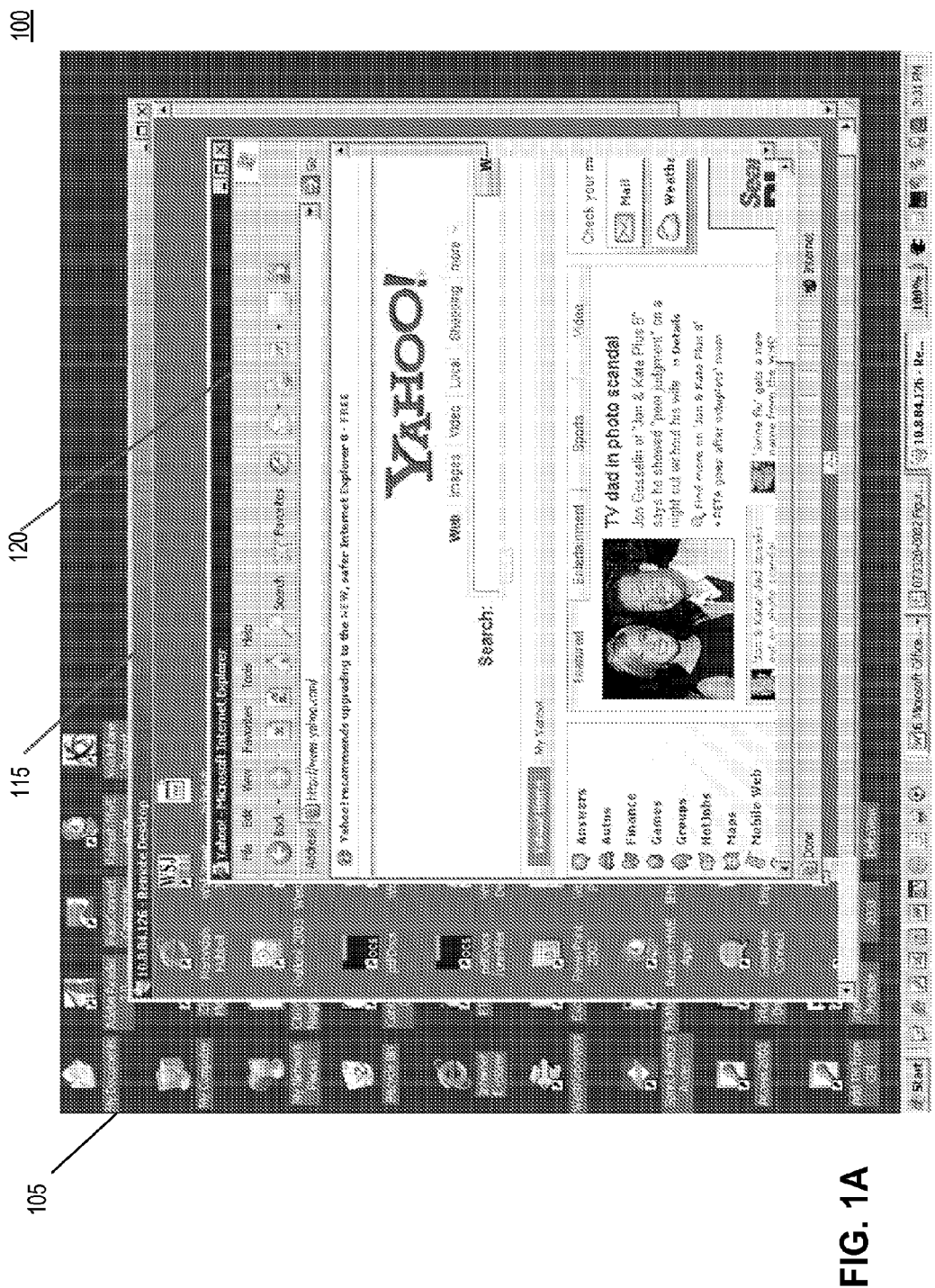
FIG. 1A illustrates an example of a display on a client device during a remote access session with a remote server.

FIG. 1A shows an example of a display 100 at a client device with a large screen during a remote access session with a server. The display 100 includes the local desktop 105 of the client device, a remote view window 115 showing an image of a remote desktop 115 and a remote web browser application 120 running on the server. The image of the remote desktop 115 and remote application 120 are based on display output data of the remote desktop 115 and remote application 120 from the server.

Figure 1B:
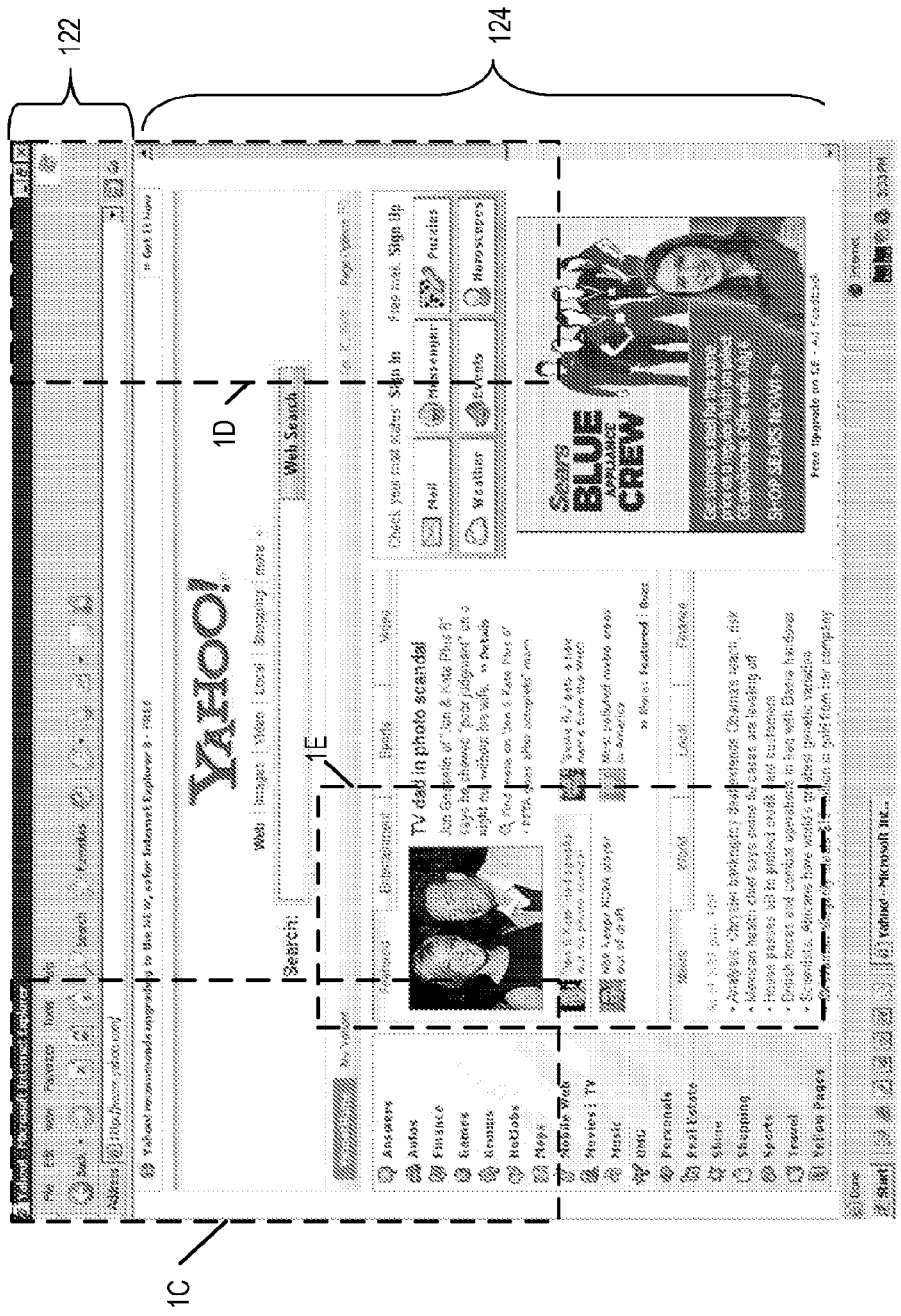
FIG. 1B illustrates an example of a web browser running on a server.

FIG. 1B shows an enlarged view of the remote web browser application 120. The remote web browser application 120 includes a GUI 122 (e.g., toolbars) and a window 124 for displaying web content. The GUI 122 is designed to be viewed on a large display. As a result, it can be very different for a user at a client device with a small display to remotely interact with the remote web browser 120. For example, if the image of the entire remote web browser application 120 is displayed on a client device with a small display, then the GUI 122 is greatly reduced in size making it difficult for the user to view the GUI 122 and select graphical control objects in the GUI 122.

Figure 1E:
FIGS. 1C to 1E illustrate examples of different portions of the web browser displayed on a client device.
Figure 1D:
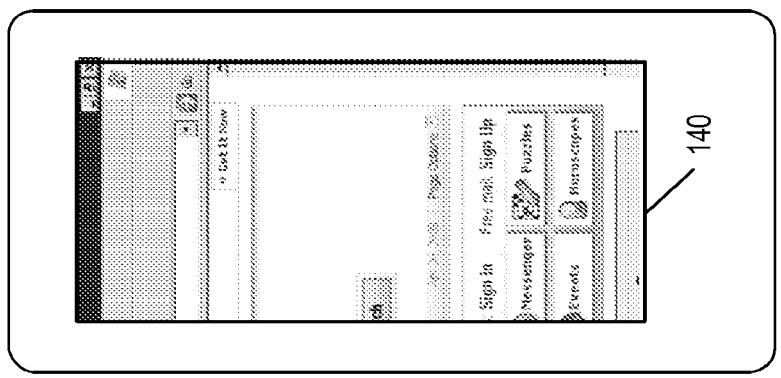
Figure 1C:
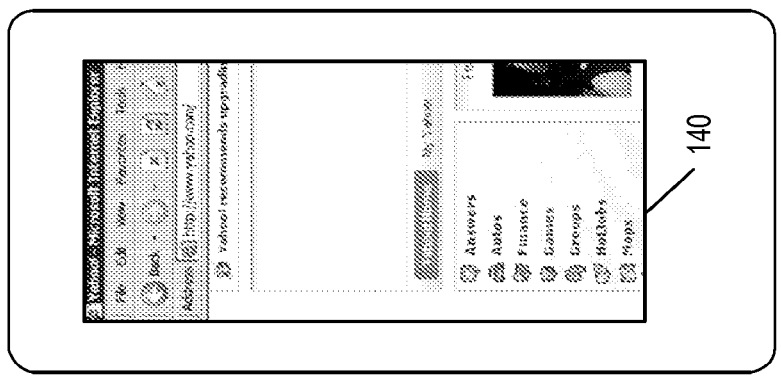

If the user at the client device zooms in on a portion of the remote web browser application 120 to enlarge that portion for viewing on a client device with a small screen (e.g., mobile phone), then the user needs to constantly manipulate the remote view by adjusting the zoom and scrolling to view different portions of the web browser application 120. FIG. 1C shows an example of a client device 135 in which a portion of the remote web browser application 120 has been zoomed in for viewing on the display 140 of the client device 135 (e.g., smartphone). In this example, only a portion of the GUI 122 is visible. As a result, the user at the client device has to adjust the zoom and/or scroll the remote view on the display 140 to view the GUI 122. FIG. 1D shows another example in which a different portion of the GUI 122 is visible on the display 140. FIG. 1E shows an example in which the GUI 122 is not visible at all on the display 140. The different portions of the web browser application 120 displayed in FIGS. 1C to 1E are shown in FIG. 1B in dashed boxes. Thus, interacting with a remote application running on a server from a client device (e.g., smartphone) can be very cumbersome and difficult.

Figure 2:
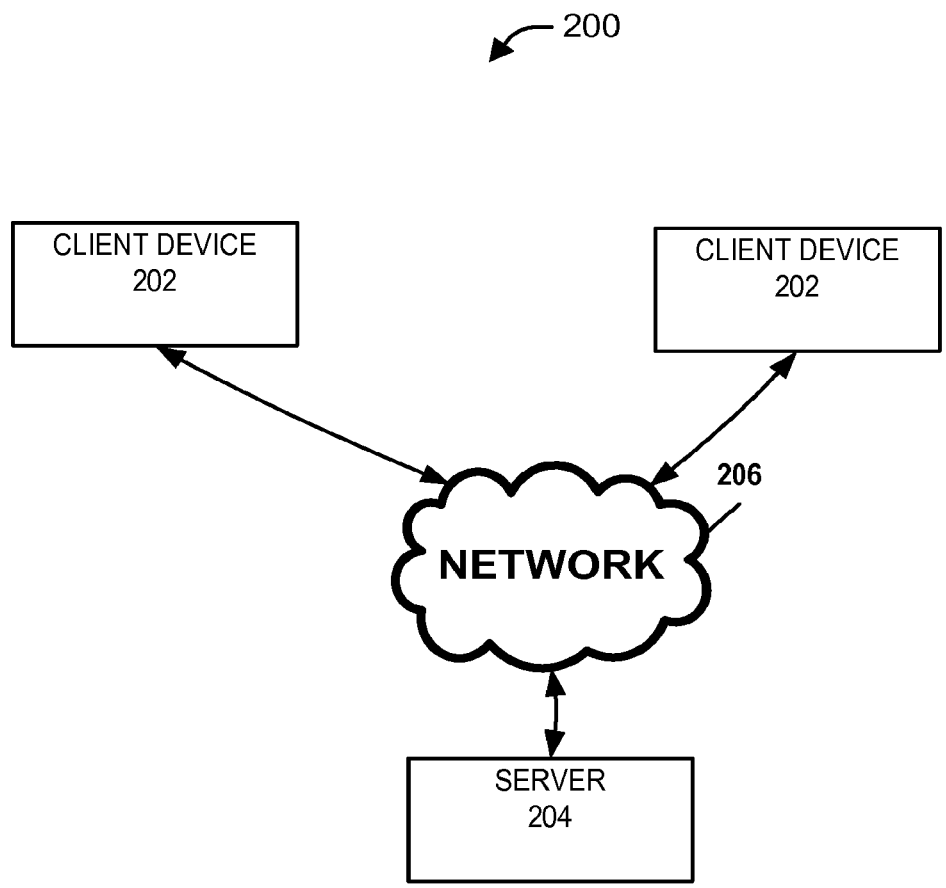
FIG. 2 is a conceptual block diagram of a computer network according to certain aspects of the present disclosure.

FIG. 2 illustrates a simplified diagram of a system 200 in accordance with an aspect of the present disclosure. The system 200 may include one or more remote client devices 202 in communication with a server computing device 204 (server) via a network 206. In one aspect, the server 204 is configured to allow remote sessions (e.g., remote desktop sessions) wherein users can access applications and files on the server 204 by logging onto the server 204 from a client device 202. Such a connection may be established using any of several well-known techniques such as the Remote Desktop Protocol (RDP) on a Windows-based server.

By way of illustration and not limitation, in one aspect of the disclosure, stated from a perspective of a server side (treating a server as a local device and treating a client device as a remote device), a server application is executed (or runs) at a server 204. While a remote client device 202 may receive and display a view of the server application on a display local to the remote client device 202, the remote client device 202 does not execute (or run) the server application at the remote client device 202. Stated in another way from a perspective of the client side (treating a server as remote device and treating a client device as a local device), a remote application is executed (or runs) at a remote server 204.

By way of illustration and not limitation, a client device 202 can represent a computer, a mobile phone, a laptop computer, a thin client device, a personal digital assistant (PDA), a portable computing device, or a suitable device with a processor. In one example, a client device 202 is a smartphone (e.g., iPhone, Android phone, Blackberry, etc.). In certain configurations, a client device 202 can represent an audio player, a game console, a camera, a camcorder, an audio device, a video device, a multimedia device, or a device capable of supporting a connection to a remote server. In one example, a client device 202 can be mobile. In another example, a client device 202 can be stationary. According to one aspect of the disclosure, a client device 202 may be a device having at least a processor and memory, where the total amount of memory of the client device 202 could be less than the total amount of memory in a server 204. In one example, a client device 202 does not have a hard disk. In one aspect, a client device 202 has a display smaller than a display supported by a server 204. In one aspect, a client device may include one or more client devices.

In one aspect, a server 204 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server 204 can be stationary. In another aspect, a server 204 can be mobile. In certain configurations, a server 204 may be any device that can represent a client device. In one aspect, a server 204 may include one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client device 202 and a server 204 are remote with respect to each other, a client device 202 may connect to a server 204 over a network 206, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 206 can be a LAN network, a WAN network, a wireless network, the Internet, an intranet or other network. A network 206 may include one or more routers for routing data between client devices and/or servers. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s).

According to certain aspects of the present disclosure, the terms "client device" and "remote client device" are generally used synonymously in relation to a server, and the word "remote" may indicate that a client device is in communication with a server(s), for example, over a network connection(s).

In one aspect of the disclosure, a "client device" may be sometimes referred to as a client or vice versa. Similarly, a "server" may be sometimes referred to as a server device or vice versa.

In one aspect, the terms "local" and "remote" are relative terms, and a client device may be referred to as a local client device or a remote client device, depending on whether a client device is described from a client side or from a server side, respectively. Similarly, a server may be referred to as a local server or a remote server, depending on whether a server is described from a server side or from a client side, respectively. Furthermore, an application running on a server may be referred to as a local application, if described from a server side, and may be referred to as a remote application, if described from a client side.

In one aspect, devices placed on a client side (e.g., devices connected directly to a client device(s) or to one another using wires or wirelessly) may be referred to as local devices with respect to a client device and remote devices with respect to a server. Similarly, devices placed on a server side (e.g., devices connected directly to a server(s) or to one another using wires or wirelessly) may be referred to as local devices with respect to a server and remote devices with respect to a client device.

Figure 3:
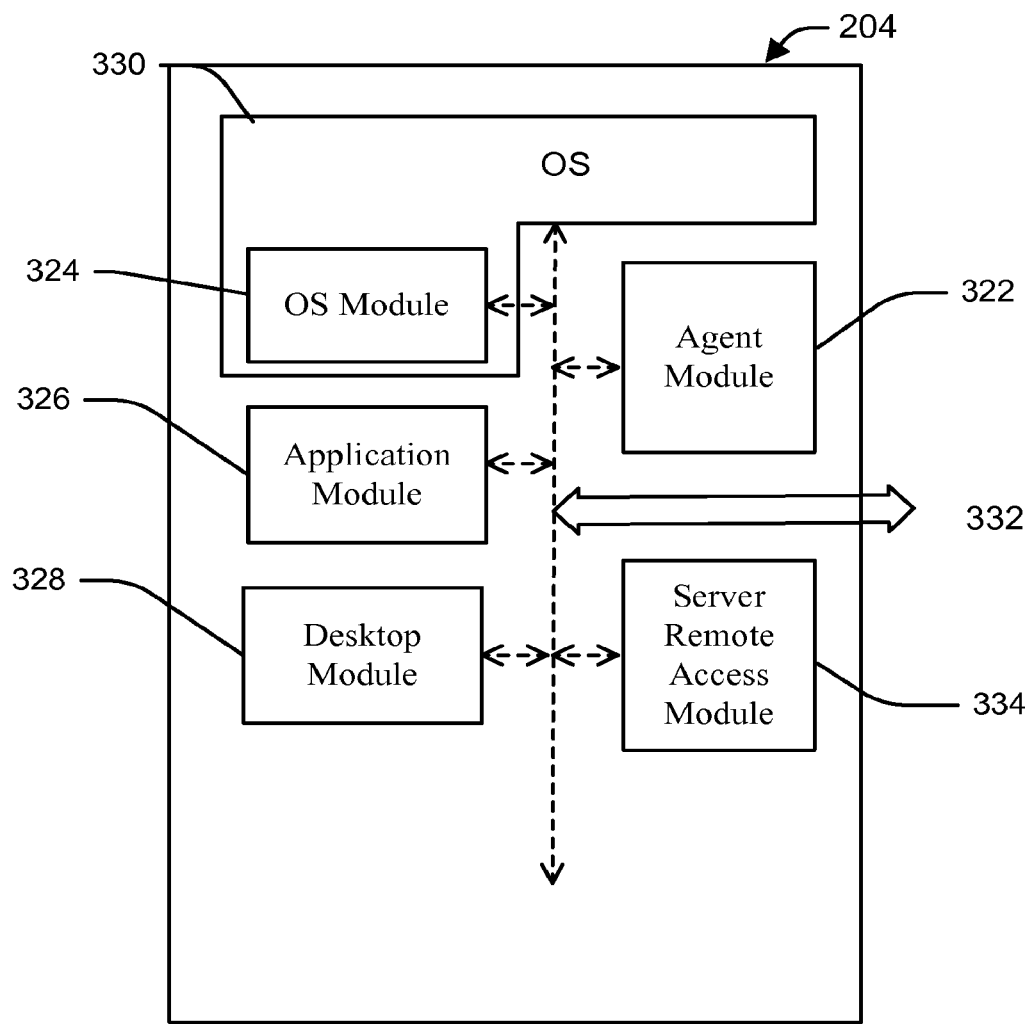
FIG. 3 is a conceptual block diagram of a server according to certain aspects of the present disclosure.

FIG. 3 illustrates a simplified block diagram of a server 204 in accordance with an aspect of the present disclosure. The server 204 comprises an agent module 322, an OS module 324, one or more application control modules 325, a desktop module 328, a server remote access module 334 and an operating system (OS) 330 in communication with the modules. In one aspect, the OS module 324 can be a part of the OS 330. The server 204 is communicatively coupled with the network 206 via a network interface 332. The modules can be implemented in software, hardware and/or a combination of both. Features and functions of these modules according to various aspects are further described in the present disclosure.

Figure 4:
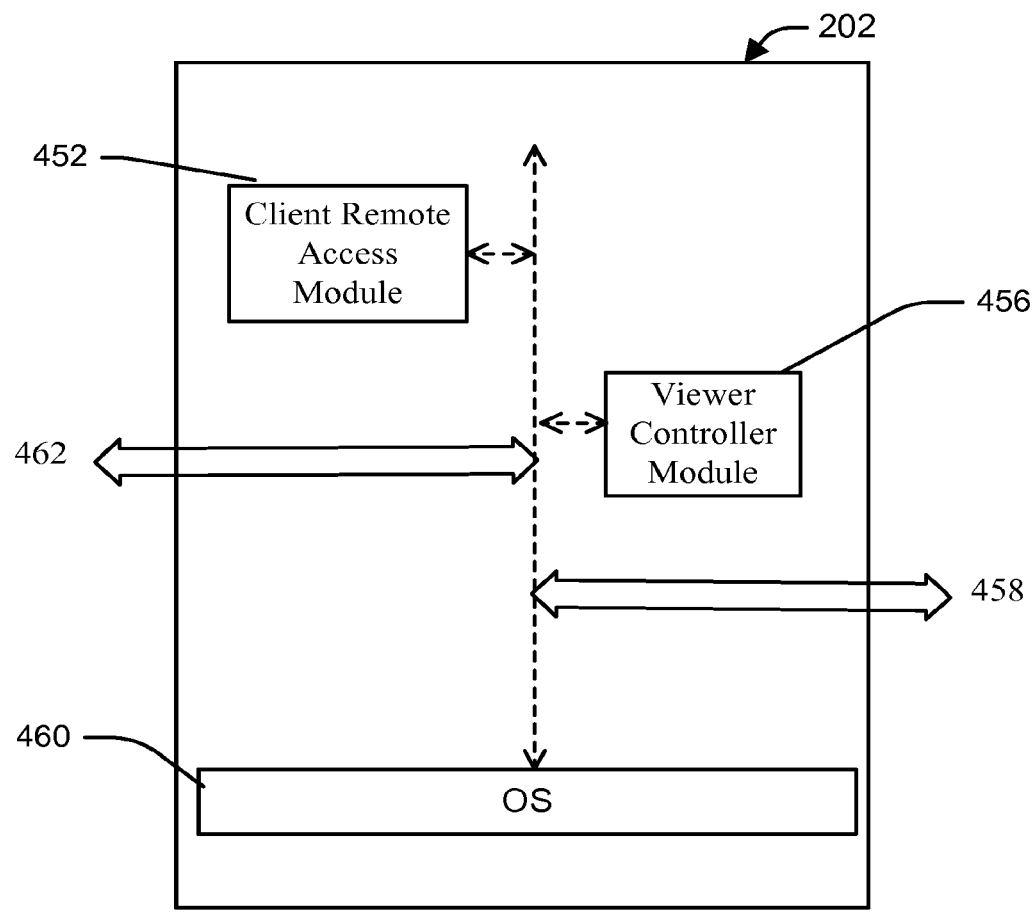
FIG. 4 is a conceptual block diagram of a client device according to certain aspects of the present disclosure.

FIG. 4 illustrates a simplified block diagram of a client device 202 in accordance with an aspect of the present invention. The client device 202 comprises a viewer controller (VC) module 456, a client remote access module 452 and an operating system (OS) 460 in communication with the modules. The modules are further in communication with various user interface devices (not shown in FIG. 4) via a human interface devices (HID) connection 458. The user interface devices may include one or more output devices (e.g., one or more of a display, a speaker, or other audio, image or video output devices) and one or more input devices (e.g., one or more of a keyboard, a mouse, a trackball, a microphone, a stylus, a touch screen, a touch pad, a pen, a tablet, or other audio, image or video input devices). The modules are also in communication with the network 206 via a network connection 462. The modules can be implemented in software, hardware and/or a combination of both. Additional features and functions of these modules according to various aspects of the present disclosure are further described in the disclosure.

Figure 5B:
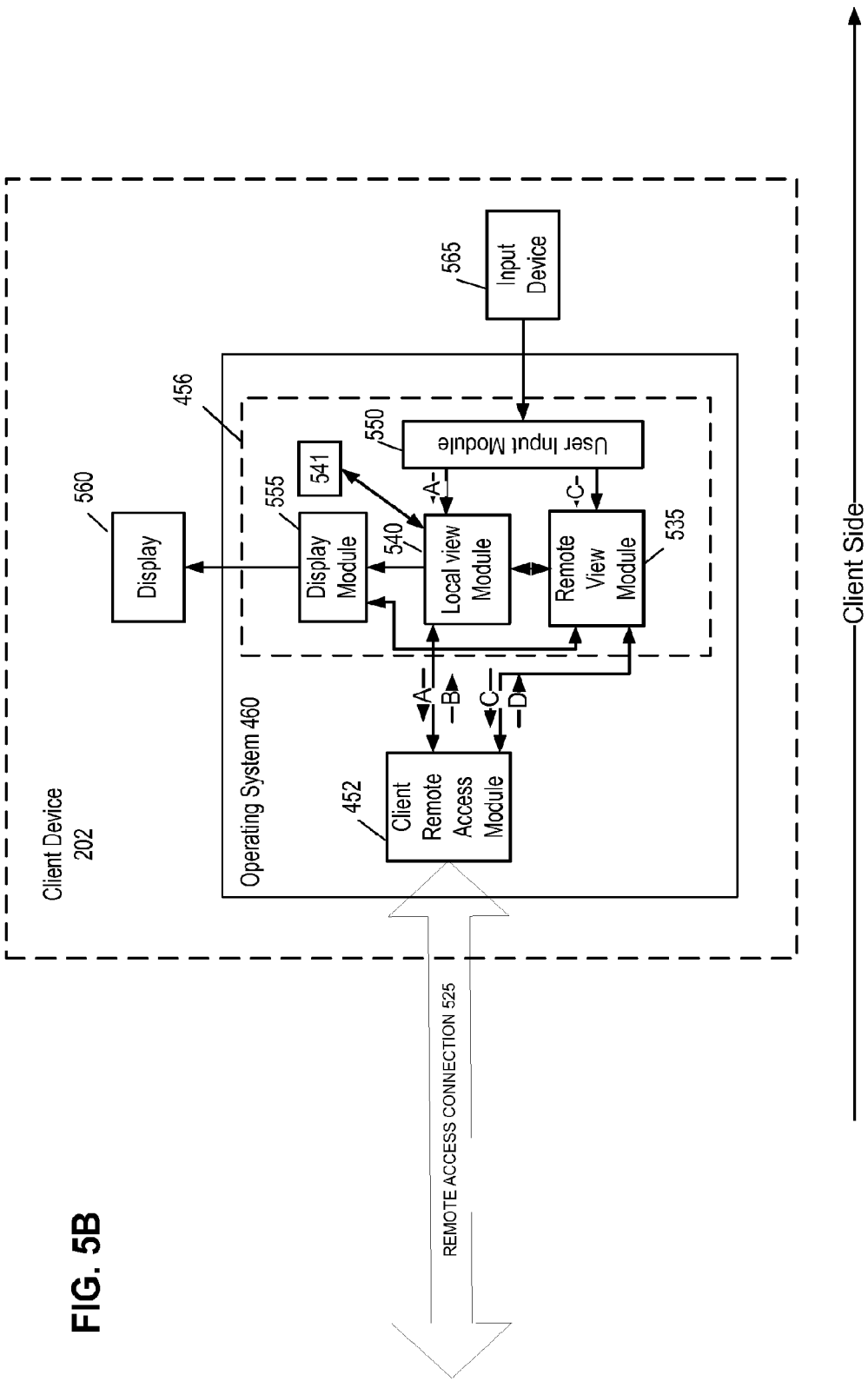
FIG. 5B is a conceptual block diagram of a client according to certain aspects of the present disclosure.

FIGS. 5A and 5B are conceptual block diagrams illustrating a server 204 and a client device 202 according to an aspect of the disclosure.

Referring to FIG. 5A, the server 204 may comprise the server remote access module 334 and the agent module 322. The server remote access module 334 is configured to establish a remote access connection 525 with the client device 202 to provide the client device 202 with remote access to a desktop and/or applications running on the server 204. The server remote access module 334 may comprise a remote access application and may communicate with the client device 202 over a network 206 based on a remote access protocol (e.g., RDP/ICA), other protocols or a combination of protocols. Remote access applications allow a user at a client device to remotely access a desktop and/or application running on a server. Examples of remote access applications include, but are not limited to, the Microsoft® Remote Desktop Protocol (RDP) application and the Citrix® Independent Computing Architecture (ICA) application.

The server remote access module 334 is also configured to receive command messages from the client device 202 and communicate the received command messages to the agent module 322. The agent module 322 may be configured to control a desktop and/or application running on the server 204 based on the received command messages, as described further below.

The server 204 further comprises an application module 326, the desktop module 328 and the OS module 324. The application module 326 comprises an application 327 and an application control module 325. An application 327 may include one or more applications. The application 327 may include, for example, a web browser application, a word processing application, a spreadsheet application, a game application, an audio application, and/or other applications. The application 327 may also include applications for rendering multi-media content including, for example, Adobe® Acrobat, Microsoft® Silverlight, and/or other applications. In one example, the application 327 is executed (or runs) at the server 204, and the client device 202 does not execute (or run) the application 327 locally at the client device 202.

An application control module 325 may include one or more application control modules. The application control module 325 may be configured to control the application 327 based on commands from the agent module 322. The application control module 325 may comprise one or more ActiveX controllers for controlling Windows-based applications or other types of controller. The application control module 325 may also control the applications based on user inputs received by the remote access module 334 from the client device 202. The user inputs may comprise pointer inputs, keyboard inputs and/or other inputs. The application control module 325 may also control the applications based on events generated by the application 327 or the operating system (OS) 330.

The desktop module 328 may be configured to generate a desktop that provides a GUI for allowing a user to select and launch applications on the server 204, manage files, and configure certain features of the operating system 330. The GUI may be a server-based GUI presented by the agent module 322. Alternatively, the GUI may be controlled by the agent module 322 and displayed natively on the client device. The desktop may display icons representing different applications that can be launched on the server 204, in which a user can select an application by moving a pointer to the corresponding icon and double clicking on the icon. The OS module 324 may be configured to communicate certain OS events to the agent module 322 and the server remote access module 334, as described further below.

The server 204 further comprises the operating system 330, which may manage and provide communication to and receive communication from the modules and application shown in FIG. 5A. The operating system 330 may also manage multiple remote user sessions allowing multiple client devices to remotely access the server 204. The operating system 330 may include Microsoft® Windows, Linux, Unix, Mac OS or another operating system. Although the server remote access module 334 is shown separately from the operating system 330, the server remote access module 334 may be considered part of the operating system 330. For example, the remote access module 334 may comprise an RDP application that comes pre-installed on the server 204 as part of Microsoft® Windows.

Referring now to FIG. 5B, the client device 202 may comprise the client remote access module 452 and the viewer controller module 456. The client remote access module 452 may be configured to communicate with the server 204 over a network 206 to remotely access a desktop and/or applications running on the server 204. The client remote access module 452 may communicate with the server remote access module 334 based on a remote access protocol (e.g., RDP/ICA), other protocols or a combination of protocols. In one aspect, the client remote access module 452 may be configured to receive display output data of a desktop and/or application running on the server 204 from the server remote access module 334 over a network 206.

In one aspect of the disclosure, display output data may comprise visual/audio information that a user located at a server 204 would have seen on a display at the server (e.g., a "virtual display) and/or would have heard from an audio output such as a speaker at the server (e.g., a "virtual" speaker). In one aspect, the display output data may comprise an image (e.g., bitmap) and/or drawing commands of the display output of a desktop and/or application running on the server 204. In one aspect, drawing commands provide instructions or information to a display system as to what is to be drawn on a display. The instructions or information may include, for example and without limitation, the location, texture, geometry, shading, light intensity, or color, or any combination therein, of a pixel or group of pixels of the display. In some aspects, a drawing command corresponds to multiple pixels. Still in some aspects, a drawing command corresponds to a single pixel of a display. In some aspects, drawing commands may include raster operations. In one aspect of the disclosure, the phrase "display output data" may be sometimes referred to as "display data", "display output" or vice versa.

Figure 6:
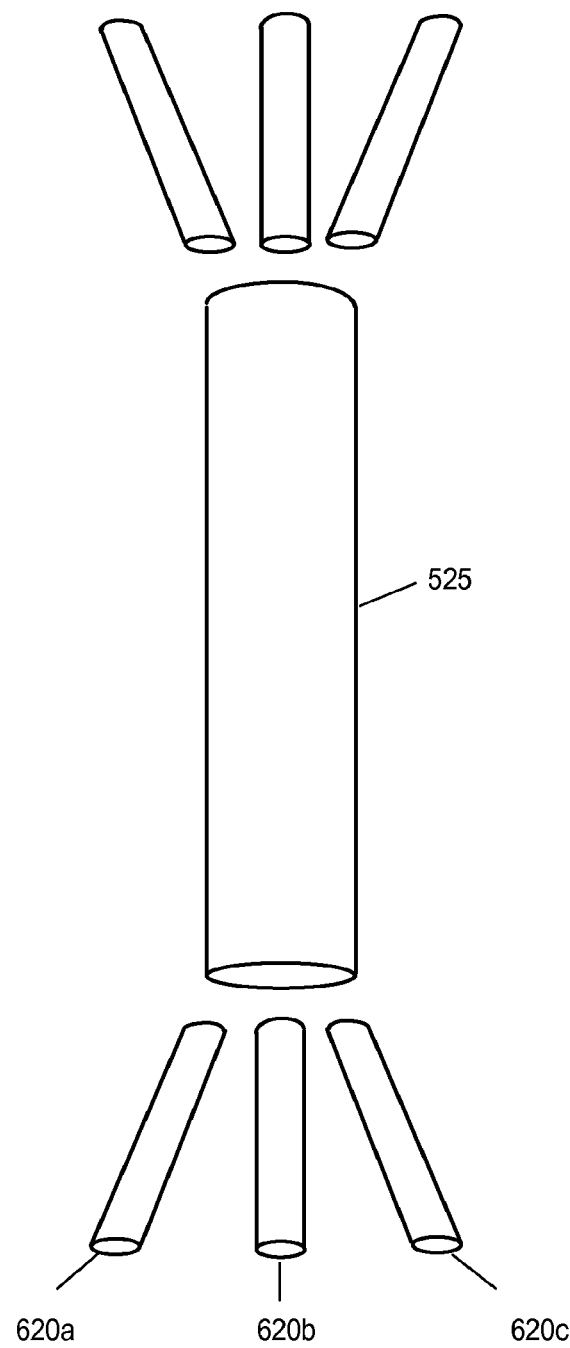
FIG. 6 illustrates an example of a remote access connection.

The client remote access module 452 may be configured to send user inputs to the server remote access module 334 over a network 206. The user inputs may comprise pointer inputs, keyboard inputs and/or other types of input. The client remote access module 452 may also be configured to send command messages to the server remote access module 334, which are described in further detail below. The remote access connection 525 between the server 204 and client device 202 may comprise a plurality of virtual channels for communicating different types of data. For example, a RDP connection may include different virtual channels for display output data and user inputs. FIG. 6 illustrates an example of the remote access connection 525 comprising multiple virtual channels 620a to 620c.

The viewer controller module 456 may comprise a remote view module 535, a local view module 540 and a display module 555. The remote view module 535 may be configured to receive display output data of a desktop and/or application 327 running on the server 204 from the client remote access module 452 and generate a remote view of the display output of the remote desktop and/or application. In one aspect of the disclosure, the phrase "remote view" may sometimes be referred to as "remote application view" or vice versa. In one aspect of the disclosure, the term "an application" or "a remote application" may refer to an application, a remote application, a desktop, or a remote desktop.

The local view module 540 may be configured to generate a local GUI that allows a user at the client device 202 to remotely control the application 327 running on the server 204. The local view module 540 may generate the local GUI based on a configuration file 541. In one aspect, the file 541 may be generated by the agent module 322 or application module 326 and be sent to the client device 202. The file 541 may fully define the layout, design and logical operation of the local GUI. This would allow the server 204 to update the local GUI in the client device 202 without having to make modifications to the client device 202. The local GUI may provide similar controls as the GUI of the application 327 running on the server 204. The local GUI may include graphical control objects for controlling certain functions of the application 327.

For the example of a web browser application, the graphical control objects of the local GUI may include an address field for entering the address (e.g., URL) of a web page, a refresh button, a go button, and scrollbars. The local GUI is displayed on the local display 560 of the client device 202. A user at the client device 202 may select graphical control objects of the local GUI displayed on the display 560 using an input device 565, for example, a touch screen overlying the display 560. As described further below, the local GUI may be optimized for the display 560 of the client device 202 to provide the user at the client device 202 with a user friendly interface for remotely controlling the application 327 running on the server 204.

The display module 555 may be configured to receive a local GUI from the local view module 540 and a remote application view of a remote desktop and/or a remote application from the remote view module 535 and generate a composite view comprising the local GUI and the remote application view of the remote desktop and/or remote application.

Figure 7:
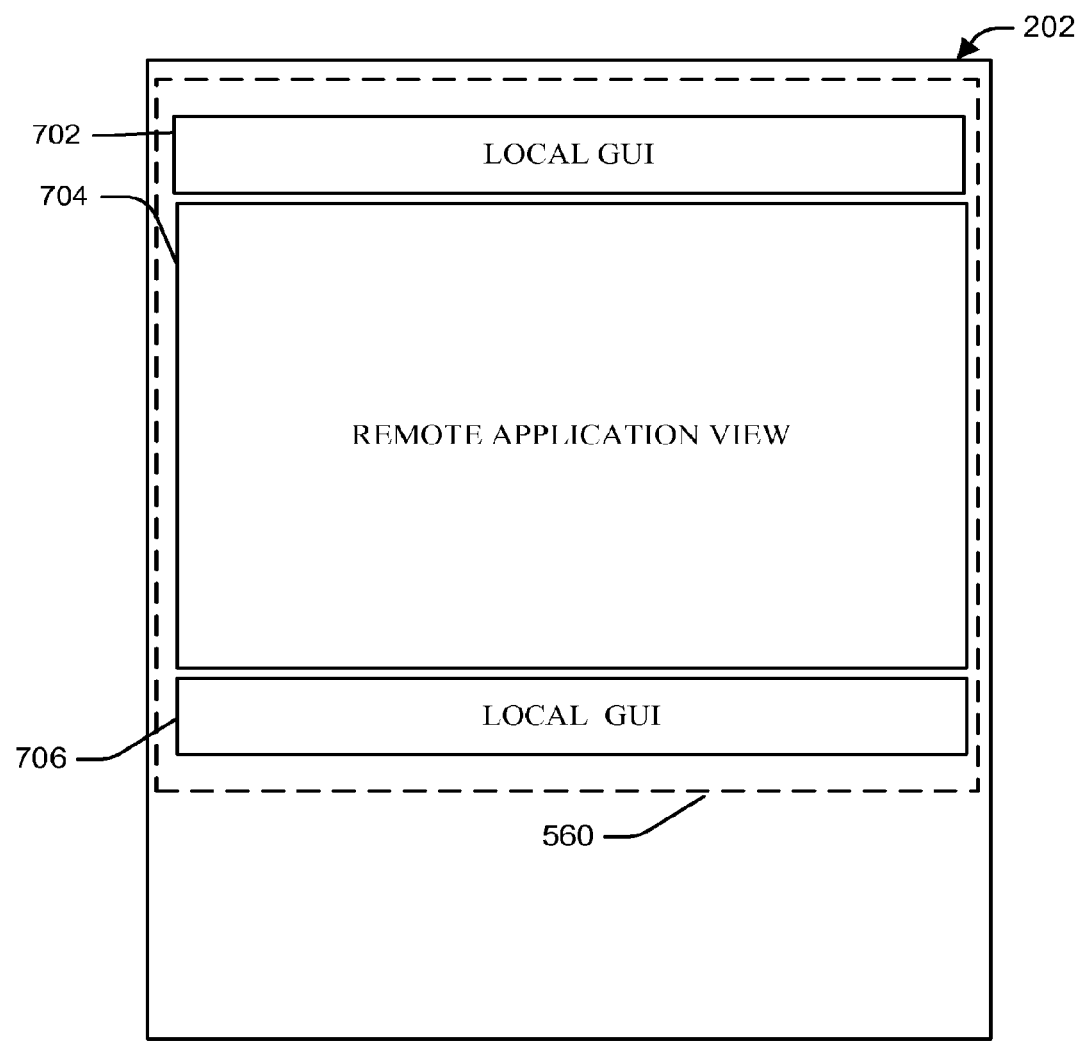
FIG. 7 illustrates a composite view at the client device according to certain aspects of the present disclosure.

FIG. 7 shows an example of a composite view rendered on a display 560 of a client device 202. In this example, the composite view includes a remote application view 704 for viewing an image of the display output of a remote application 327 running on the server 204. The remote application view is based on the display output data of the remote application 327 received from the server 204. The user may manipulate the image of the remote application 327 shown in the remote application view 704. For example, the remote application view 704 may be responsive to, for example, viewing selections by a user such as zooming factor, the depth of the color palette used, viewing angle (pan and tilt) and so on. The viewing selections may be provided in a GUI. The user may also zoom in and out within the remote application view 704 using any technique. For example, the user may zoom in by sliding two fingers on the display 560 away from each other and zoom out by sliding the fingers on the display towards each other on the display 560, which is currently supported by, for example, iPhone and Palm Pre. User inputs within the remote application view 704 are directed to the remote view module 535.

The composite view may also include a local GUI 702 and 706. The local GUI 702 may display a local header for the application shown in the display area 704. In one aspect, the local header may display an application name based on information received from the server 204. In another aspect, the local header may be locally generated (e.g., a remote session window). In yet another aspect, the local header may display an editable text input area, such as an address field for a web browser. The local GUI 706 may display, for example, local control GUI objects such as a local control GUI toolbar. The local control GUI objects may be based on information received from the remote server 204.

The dimensions and layouts of the remote application view 704 and local GUI 702 and 706 are not limited to the example shown in FIG. 7. The remote application view 704 and local GUI 702 and 706 may have other dimensions and layouts, for example, based on the remote application being accessed by the client device 202.

In one aspect, the local GUI 702 and 706 is not generated from the display output of a remote application 327 running on the server 204. For example, the local GUI 702 and 706 is not an image of the remote application's GUI generated from the display output of the remote application 327 running on the server 204. Instead, the local GUI is locally generated by the local view module 540, for example, based on configuration file 541 (shown in FIG. 5B). Furthermore, the configuration file 541 may be received by the local view module 540 by the application control module 325 or the agent module 322.

Figure 8A:
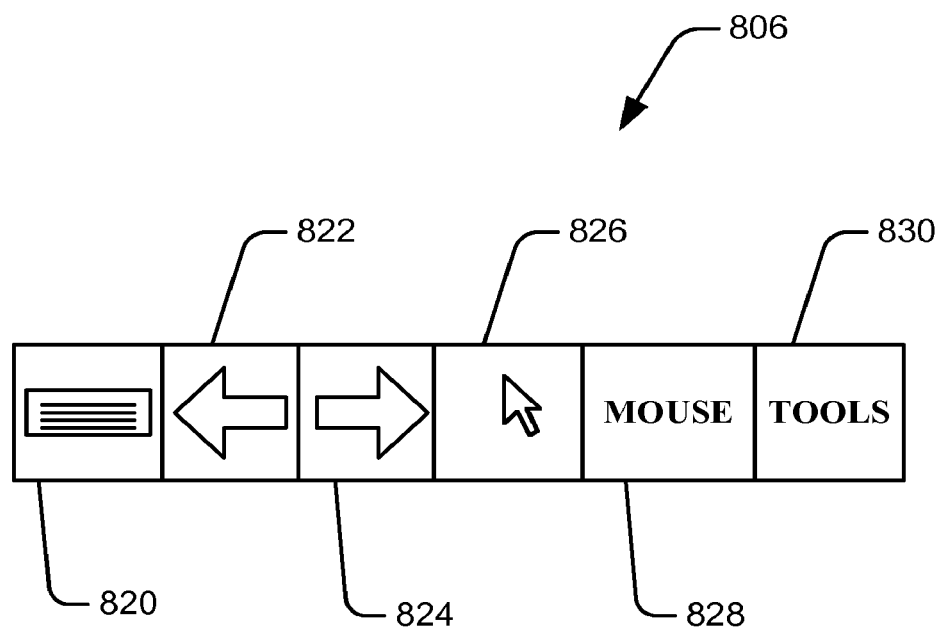
FIG. 8A illustrates an example of a local GUI according to certain aspects of the present disclosure.
Figure 8B:
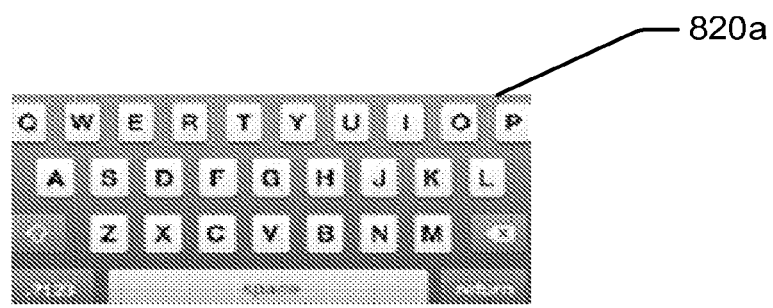
FIG. 8B illustrates an example of a graphical keyboard according to certain aspects of the present disclosure.

FIG. 8A shows an example of a local control GUI 706. The local control GUI 706 comprises a toolbar 806 including graphical control objects. The graphical control objects may include a keyboard icon 820, a BACK arrow 822, a FORWARD arrow 824, a pointer icon 826, a MOUSE icon 828 and a TOOLS icon 830. When a user selects the keyboard icon 820 (e.g., by touching or tapping), the local view module 540 may change the local control GUI 806 to display a graphical keyboard 820a for the user to enter text (shown in FIG. 8B). The layout details of a keyboard 820a may be provided in a configuration file 541 (shown in FIG. 5B), or may be based on the local GUI tools provided by the OS 460 of the client device 202.

When a user selects the BACK icon 822, the web browser application displays a previously displayed web page. In certain embodiments, the client device 202 may perform this by communicating to the server 204, a control code corresponding to this event. In other embodiments, the client device 202 may include a local cache of previously displayed web pages and may use the cached data to render the previously displayed web page. In a manner similar to the BACK icon 822, the FORWARD icon 824 may be used to render a later viewed web page in the web browser. The pointer icon 826 may allow a user to activate a pointer within the display area of the remote application view 704. The MOUSE icon 828 may allow a user to activate a mouse cursor, which then will invoke mouse movements or mouse clicks, and the TOOLS icon 830 may open further menus containing additional tools, as provided in a configuration file and as provided by the OS 460 of the client device 202.

It will be appreciated by one skilled in the art that, according to one aspect of the disclosure, because the control objects of the local GUI are rendered locally, these objects can be advantageously rendered at the resolution of the local display 560 and can be rendered to have dimensions that can be easily navigated or handled by a user using a finger, a stylus or any other native navigation method(s) provided by the client device 202 (e.g., track-ball, keyboard, etc.). Furthermore, the available display area for the remote application view (e.g., 704) of a remote application can be fully dedicated to content displayed by the remote application by deactivating control GUI objects from the remote application view 704. For example, a web browser executed at a remote server 204 may be displayed in the remote application view 704 after deactivating scrollbars and menu header of the web browser at the server 204. The toolbar and the menu header controls can be provided by the local GUI instead.

Figure 9:
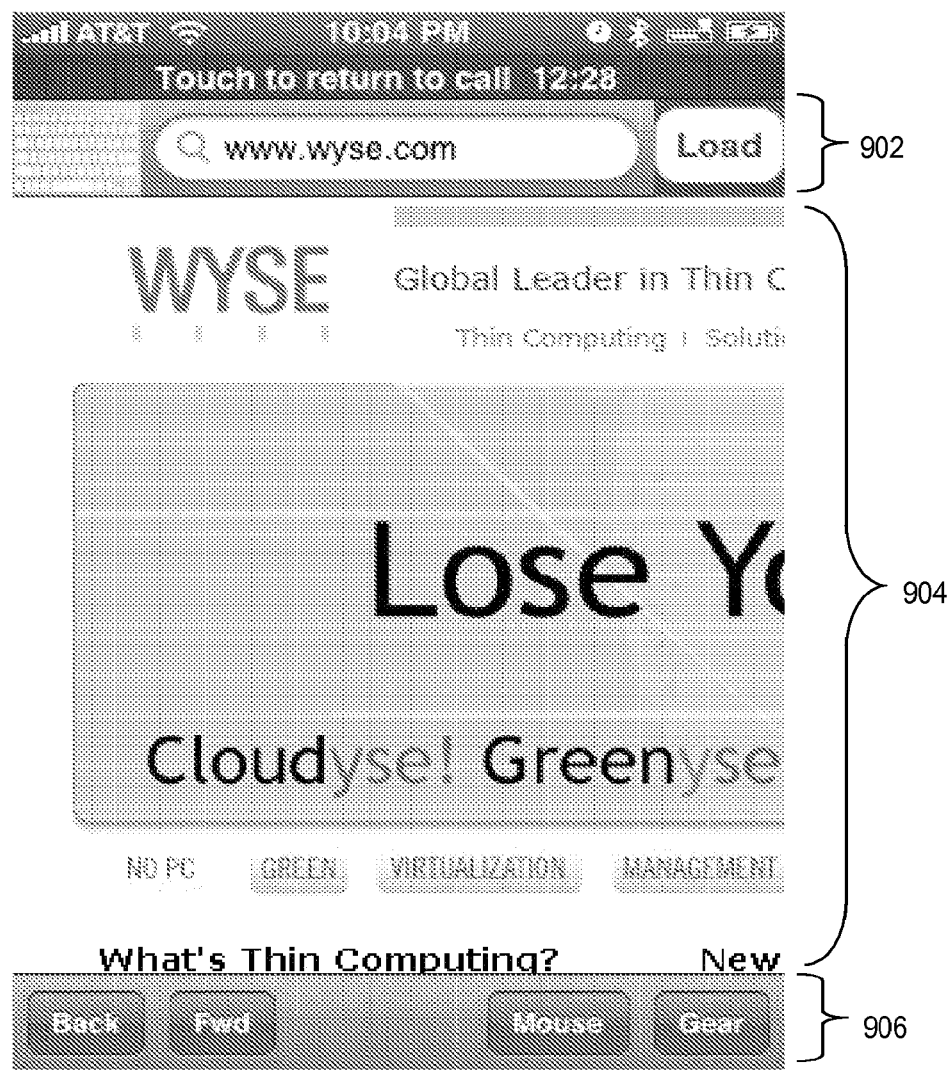
FIG. 9 illustrates a display at the client device according to certain aspects of the present disclosure.

FIG. 9 illustrates an example of a composite view 900 that may be rendered locally on display 560. The composite view 900 comprises the local GUI 902 and 906 and the remote application view 904 of a remote application 327 running on the server 204. In this example, the graphical control objects of the local GUI 902 and 906 include an IP address field, a LOAD button, a BACK button, a FORWARD button, a MOUSE button, and a GEAR button for remotely controlling a web browser application 327 running on the server 204.

Referring to the figures discussed above, various operations of the modules in a 204 sever and in a client device 202 are further described below in accordance with one aspect of the disclosure.

Now referring to FIGS. 5B and 7, the client device 202 may further comprise an input device 560 and a user input module 550. In one example, the input device 560 comprises a touch screen overlaying the display 560. In this aspect, the user may enter user inputs within a display area corresponding to the local GUI 702 and 706 by tapping on a desired graphical control object using a finger or stylus. The user input module 550 may send user inputs to the local GUI 702 and 706 for remotely controlling the application 327 to the local view module 540. For the example of a touch screen, when the user touches a display area corresponding to the local GUI 702 and 706, the user input module 550 directs the corresponding user inputs to the local view module 540. The user inputs may comprise coordinates of the location where the user touched the display 560.

The user may also enter user inputs within a remote application view 704 of a remote application 327 on the display 560. For the example of a touch screen, the user may enter user inputs by moving a pointer (not shown) within a display area corresponding to the remote application view 704 of the remote application 327. In this aspect, the user input module 550 directs user inputs within the remote view 704 to the remote view module 535.

In one aspect of the disclosure, the local view module 540 may be configured to generate a command message based on user inputs to the local GUI 702 and 706 for remotely controlling the application 327 and send the command message to the server 204. For the example of a touch screen, the local view module 540 interprets user inputs to the local GUI 702 or 706 and then translates them into corresponding command messages. In this example, a user input may comprise coordinates of a location where the user touches the local GUI 702 or 706 on the display 560 or coordinates of a pointer within the local GUI 702 or 706 controlled by the user, for example, using a pointer device. The local view module 540 can determine which graphical control object is selected by the user based on the graphical control object in the local GUI 702 and 706 corresponding to the coordinates of the user inputs. The local view module 540 determines the function associated with the selected graphical control object and generates a command message for the server 204 with a command to perform the function. For example, if the user touches the local GUI 702 or 706 (e.g., using a finger) at a location corresponding to a refresh button in the local GUI 702 and 706, then the local view module 540 generates a command message for the server 204 to refresh the web page.

In one aspect, the agent module 322 on the server 204 receives the command message and issues a command to the application control module 325 to control the application 327 based on the command message. For example, if the command message is to refresh the web page, then the agent module 322 instructs the application control module 325 to reload the web page on the web browser application 327. Thus, the local view module 540 generates command messages based on user inputs to the local GUI and sends the command messages to the agent module 322 on the server 204, and the agent module 322 controls the remote application based on the received command messages using the application control module 325.

In one aspect, when a local view module 540 receives one or more user inputs directed to, or placed into, a local GUI (e.g., 702 or 706), the local view module 540 may interpret the one or more user inputs, determine (or identify) function(s) corresponding to the one or more user inputs, and generate one or more command messages corresponding to the function(s) by, for example, translating the one or more user inputs into the command message(s). Determining the function of a user input may, for example, include identifying the type of user input (e.g., a text entry, a button selection, a menu selection) and/or determining a function corresponding to the user input (e.g., a text entry for an IP address field, a selection of a BACK button, etc.). For example, when the user input comprises a selection of a button (e.g., refresh button) in the local GUI (e.g., based on coordinates of a user's touch on the display 560), the local view module 540 may determine the function (e.g., refresh current web page) associated with the selected button. In one aspect, these functions are predetermined. The local view module 540 then generates a command message based on the determined function. Some examples of command messages may include, but are not limited to, a command to load a web page from an IP address, display a previously viewed web page, display a later viewed web page, refresh or reload a current web page, stop loading of a webpage, zoom in or out, switch applications, open bookmarks or history (e.g., for a web browser application), and other commands. A command message may comprise a command packet that is transmitted from the client device 202 to the server 204 using various protocols, compressions and encryption schemes. The server 204 may also send commands and status information to the client device 202. For example, the server 204 may send the client device 202 a web page loading status, a redirected URL or keyboard state.

In one aspect, the remote view module 535 may be configured to send user inputs received within the remote application view 704 to the server 204 via the remote access module 452. The user inputs may include pointer inputs comprising coordinates of pointer movements and clicks (e.g., mouse clicks). For example, the user may move a pointer (not shown) within the remote application view 704 using a touch screen, a touch pad, a trackball, a mouse or other pointer input device. In this example, the coordinates of the pointer movements may be transmitted to the server 204. The user inputs may also include keyboard inputs. The user inputs may enter keyboard inputs using a graphical keyboard (e.g., 820a) displayed on the display 560, a keypad or other device. For example, when the user desires to enter text at the location of a pointer or cursor within the remote application view 704, the user may tap on a keyboard icon (e.g., 920) to bring up the graphical keyboard to enter the text. In one aspect, the client device access module 452 may send user inputs comprising pointer inputs (e.g., coordinates of pointer movements) and keyboard inputs to the server 204 using RDP, ICA or other remote access protocol.

In one aspect, the server remote access module 334 may receive the user inputs from the client remote access module 452 over the remote access connection 525 and sends the user inputs to the application control module 325. The application control module 325 interprets the received user inputs and controls the application 327 accordingly.

In one aspect, when an application 327 updates its display output in response to a received command message or user inputs, the remote access module 334 may send updated display output data to the client device 202. The client remote access module 452 receives the updated display output data of the remote application 327 and sends the updated display output data to the remote view module 535. The remote view module 535 then generates an updated image of the display output of the remote application, which is displayed within the remote application view 704 of the display 560.

Aspects of the disclosure allow the user at the client device 202 to remotely view an application running on the server 204 while controlling the application using a local GUI that can be optimized for the display 560 of the client device 202.

An advantage of aspects of the disclosure may be illustrated with reference to FIGS. 9 and 1B. FIG. 9 shows an example of a composite view 900 at the client device 202 for a web browser application running on the server 204, according to an aspect of the disclosure. In this example, the GUI of the application 327 running on the server 204 may be similar to the GUI 122 shown in FIG. 1B which is designed for a large display. Instead of displaying an image of the remote application's GUI 122 running on the server 204, the local view module 540 advantageously generates and displays a local GUI 902 and 906 for controlling the remote application 327. In one aspect, the local GUI 902 and 906 in FIG. 9 is not based on the display output of the remote application 327. The local GUI 902 and 906 may be optimized for the display 560 of the client device 202. An image of the display output of the remote web browser application 327 is displayed within the remote application view 904 allowing the user at the client device 202 to remotely view the web browser application 327 while remotely controlling the web browser application 327 using the local GUI 902 and 906.

The local GUI 702 and 706 may be designed to have a similar look and feel of a web browser application that is native to the client device (e.g., smartphone). This allows the user at the client device to control a web browser application 327 running on a server 204 in a similar manner as a web browser that is native to the client device (e.g., smartphone), while enjoying the benefits of server-side computing such as increased computing power and resources available on the server 204. For example, a web browser application 327 running on a server has access to plug-in applications on the server 204 for rendering multi-media content. As a result, the plug-in applications do not have to be, for example, loaded onto the client device 202. Another advantage of the local GUI is that it allows a user at the client device 202 to use the application on the server 204 in a user friendly environment without having to extensively rewrite the application and port the application to the client device.

In an aspect of the disclosure, the local GUI and the remote application view 704 on the display 560 can be controlled independently. For example, the remote view module 535 may allow the user to adjust the zoom and scroll the image of the remote application 327 within the remote application view 704 while the local view module 540 maintains the size and location of the local GUI 702 and 706 on the display 560. Thus, the local GUI 702 and 706 can remain on the display 560 and be readily accessible to the user while the user manipulates the image of the remote application within the remote application view 704.

In an aspect of the disclosure, the agent module 322 may instruct the application control module 325 to deactivate the GUI of the application 327 so that display output data of the application 327 sent to the client device 202 does not include the GUI of the application. For the example of the web browser 120 running on a server in FIG. 1B. the agent module 322 may deactivate the GUI 122 so that only the display of the web content 124 is sent to the client device 202. This allows a user at the client device 202 to view the web content 124 of the web browser 120 running on the server 204 while controlling the web browser 120 with the local GUI 702 and 706 instead of the remote application's GUI 122 running on the server 204.

The local GUI at the client device 202 is not limited to the example of a web browser application and may be used to remotely control many other applications on the server 204. Examples of applications that may be controlled by local GUIs include word processing applications, spread sheet applications, multi-media player applications, electronic mail applications, and other applications. For the example of a word processing application, the local GUI may include graphical control objects for print, edit, and formatting functions. For a multimedia player, the local GUI may include graphical control objects for play, stop and rewind functions.

In one aspect, the client device 202 may have a plurality of local GUIs for controlling different applications. In this aspect, when the user at the client device 202 remotely launches an application on the server 204, the agent module 322 may determine what type of application was launched. The agent module 322 may then send a message to the client device 202 via the server remote access module 334 indicating the type of application that was launched on the server 204. The client remote access module 452 sends the received message to the local view module 540. The local view module 540 may then select a local GUI from a plurality of local GUIs that matches the type of application indicated by the received message. The agent 322 may also send a configuration file to the client device 202 specifying the local GUI. Thus, the local view module 540 can change the local GUI to adapt to changes in the application running on the server 204.

Figure 10:
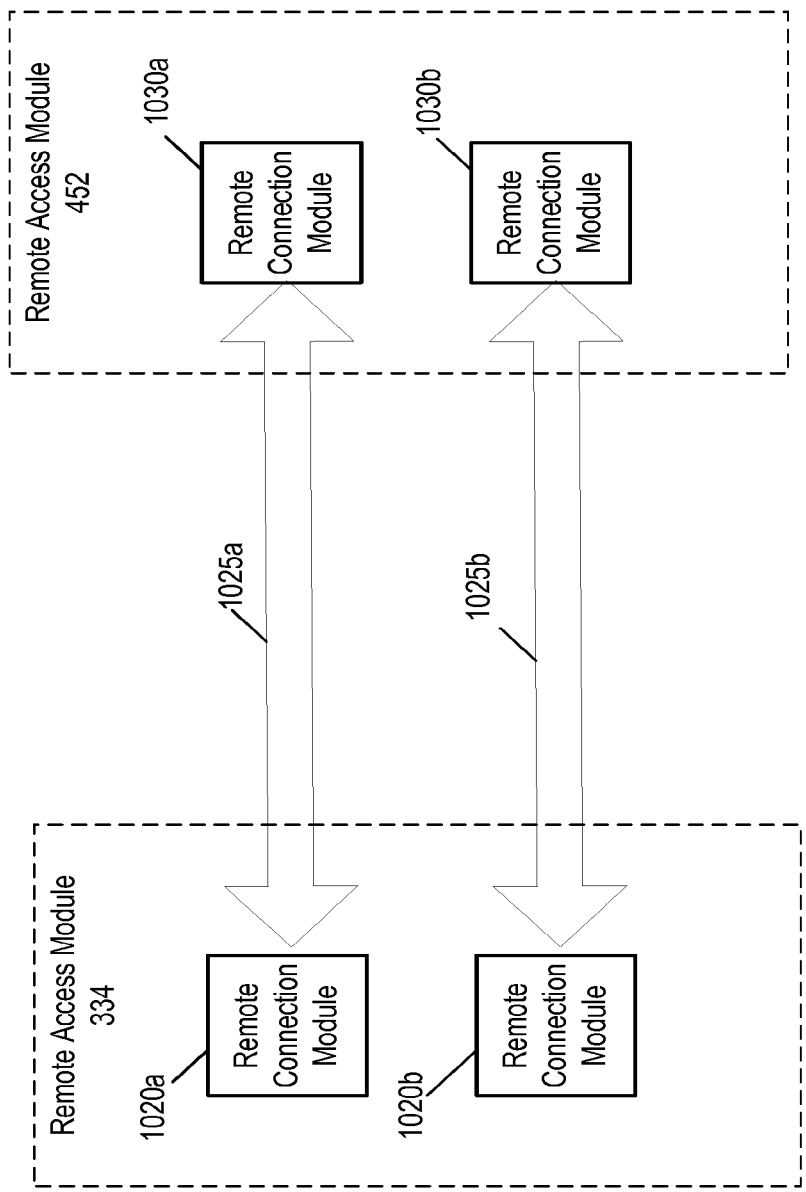
FIG. 10 is a conceptual block diagram of server and client remote access modules according to certain aspects of the present disclosure.

FIG. 10 is a conceptual block diagram illustrating a server remote access module 334 and a client remote access module 452 according to an aspect of the disclosure. In one aspect, a server remote access module 334 comprises first and second server remote connection modules 1020a and 1020b and the client remote access module 452 comprises first and second client remote connection modules 1030a and 1030b. The first server remote connection module 1020a and the first client remote connection module 1030a communicate over connection 1025a. The second server remote connection module 1020b and the second client remote connection module 1030b communicate over connection 1025b. The connections 1025a and 1025b may be established between the server 204 and the client device 202 over a network 206 using different sockets. In this aspect, different types of information may be communicated over the different connections 1025a and 1025b.

In one aspect of the disclosure, the first server remote connection module 1020a and the first client remote connection module 1030a are implemented using a remote access application (e.g., RDP application) for communicating display output data and user inputs between the server 204 and the client device 202. The connection 1025a may comprise a plurality of virtual channels with different virtual channels carrying display output data (e.g., images or audio output of a remote application) and user inputs (e.g., pointer and keyboard inputs from a user at a client device) between the server 204 and the client device 202.

The second server remote connection module 1020b and the second client remote connection module 1030b may be configured to communicate command messages over the connection 1025b. In this aspect, the second client remote connection module 1030b sends command messages from the local view module 540 to the server 204 over the connection 1025b. The second client remote connection module 1020b communicates the received command messages to the agent module 322. In this aspect, the agent module 322 may manage the connection 1025b. In one aspect, the second remote connection module 1020b may be integrated with the agent module 322. Thus, in this aspect, the command messages are communicated over a different connection than the display data and user inputs. An advantage of this aspect is that the command messages may be communicated using a different protocol than the display data and user inputs. For example, the display output data and user inputs may be communicated using a remote access protocol (e.g., RDP) while the command messages are communicated using a different protocol. For example, the command messages may be communicated using a protocol having different encryption, compression and/or security features than the remote access protocol.

Figure 11:
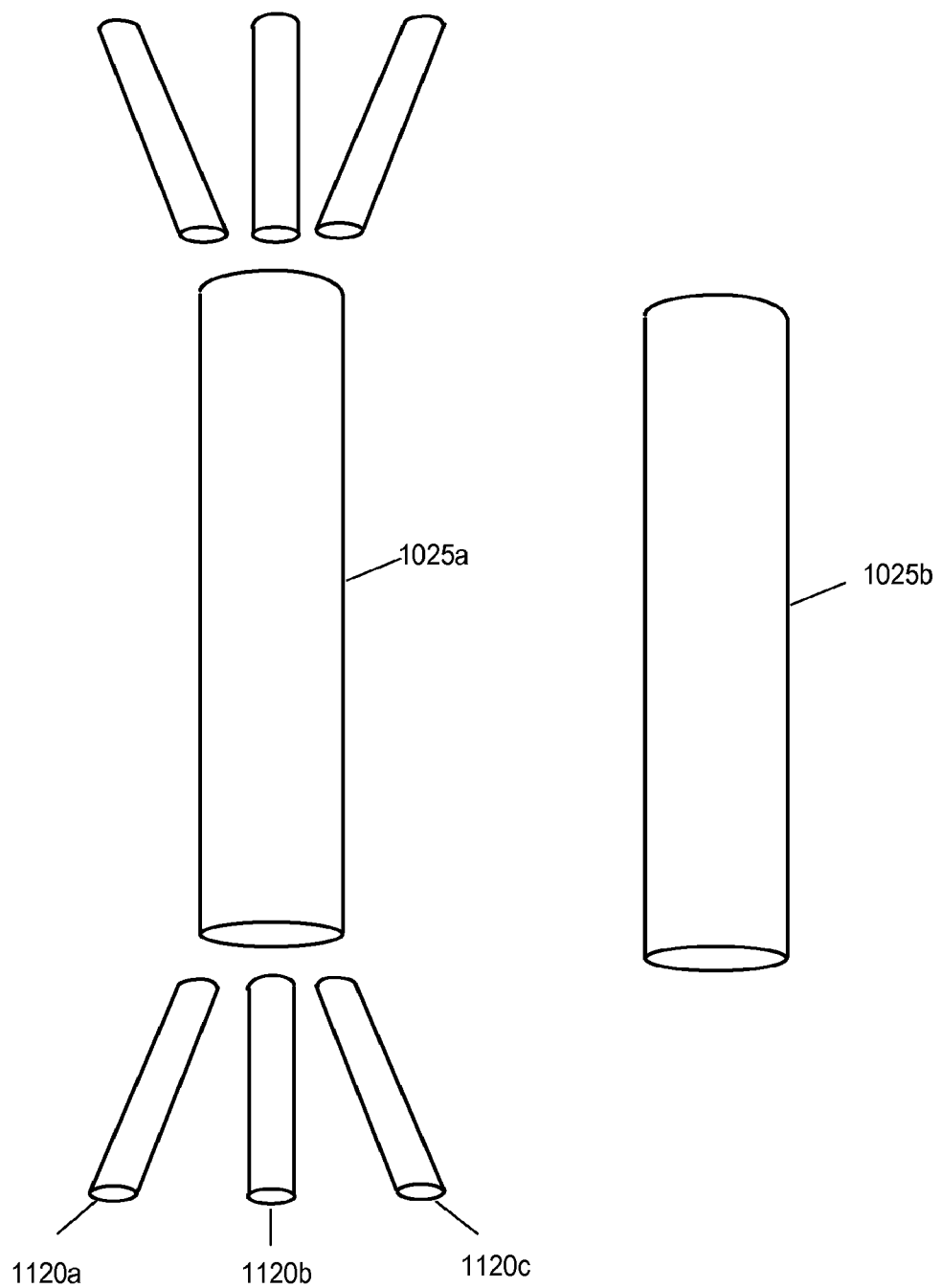
FIG. 11 illustrates an example of a plurality of connections between the server and the client device.

FIG. 11 depicts an example of the connection 1025a comprising multiple virtual channels 1120a to 1120c and the connection 1025b. In this example, the connection 1025a may be based on a remote access protocol (e.g., RDP) for communicating display output data and user inputs on different virtual channels 1120a to 1120c. The connection 1025b is used to communicate command messages. Alternatively, the command messages may be sent over the connection 1025a, in which case the second remote connection modules 1020b and 1030b may be omitted. For example, the command messages may be sent on a virtual channel of the connection 1025a established for command messages. In an aspect, a command message may include a flag or other indicator identifying the message as a command message.

FIGS. 10 and 11 illustrate merely examples of communications between a server and a client device. A server may include one or more remote connection modules (e.g., one, two, three or more), and a client device include one or more remote connection modules (e.g., one, two, three or more).

Figure 12:
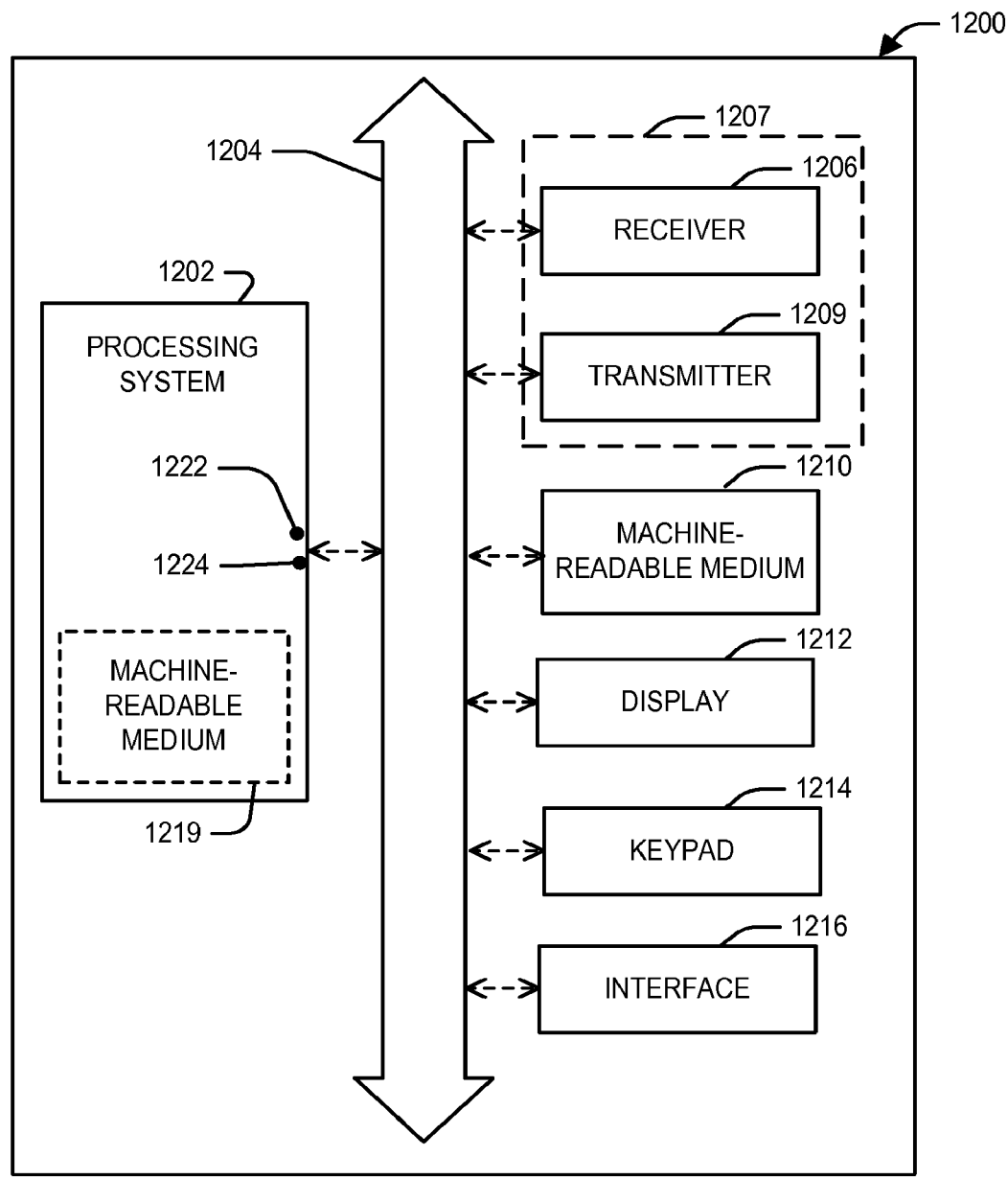
FIG. 12 is a block diagram that illustrates an exemplary computing system in accordance with certain embodiments of the present disclosure.
Figure 13A:
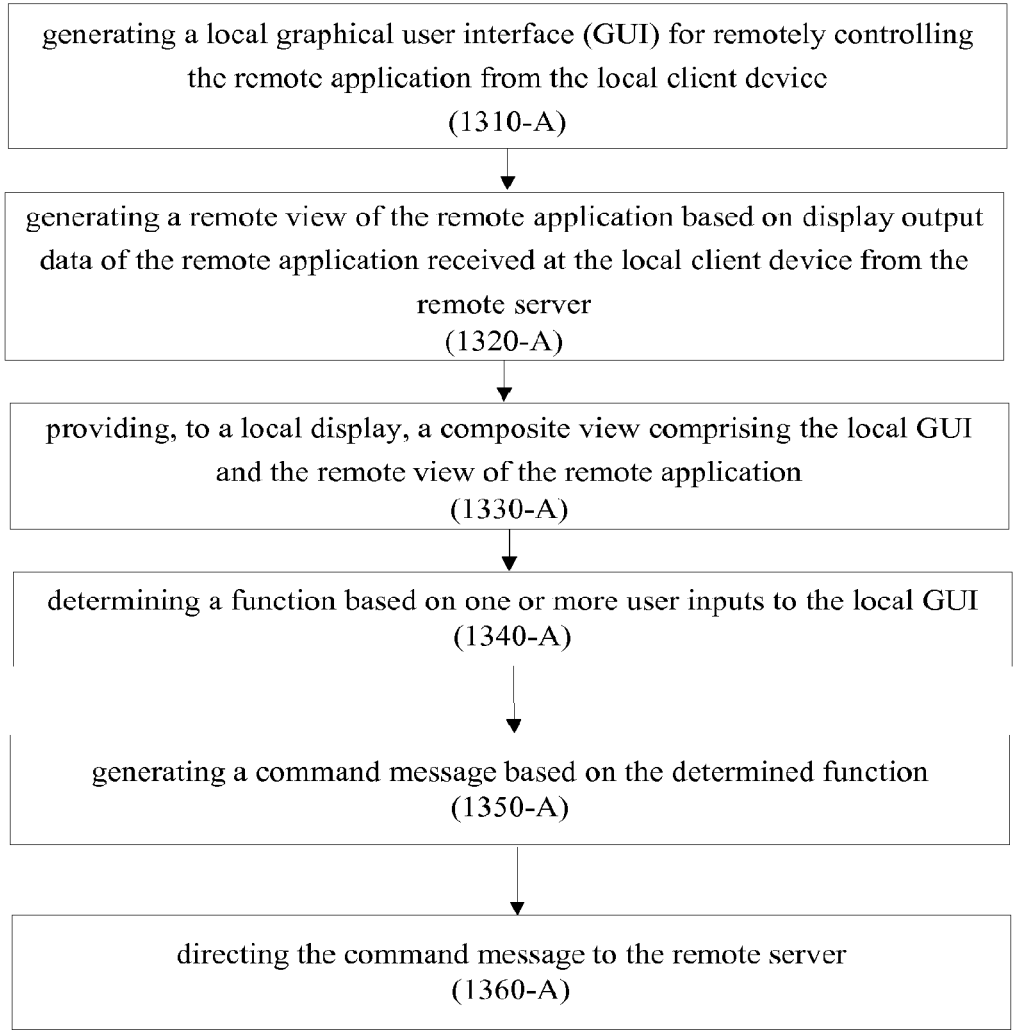
FIG. 13A illustrates an example of an operation of a system according to one aspect of the present disclosure.
Figure 13B:
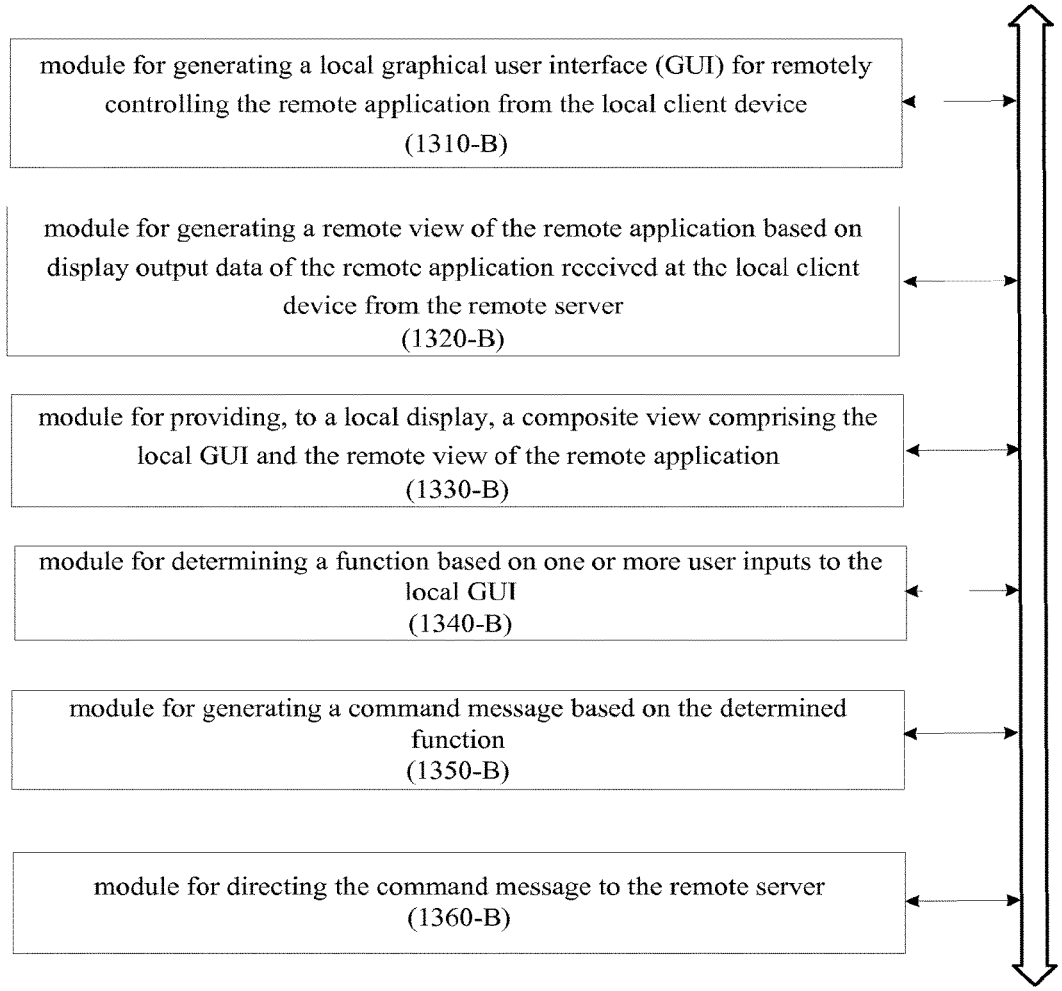
FIG. 13B illustrates an example of a configuration of an apparatus according to one aspect of the present disclosure.

FIG. 12 is a conceptual block diagram illustrating an example of a system.

A system 1200 may be, for example, a client device or a server. The system 1200 includes a processing system 1202. The processing system 1202 is capable of communication with a receiver 1206 and a transmitter 1209 through a bus 1204 or other structures or devices. It should be understood that communication means other than busses can be utilized with the disclosed configurations. The processing system 1202 can generate audio, video, multimedia, and/or other types of data to be provided to the transmitter 1209 for communication. In addition, audio, video, multimedia, and/or other types of data can be received at the receiver 1206, and processed by the processing system 1202.

The processing system 1202 may include a general-purpose processor or a specific-purpose processor for executing instructions and may further include a machine-readable medium 1219, such as a volatile or non-volatile memory, for storing data and/or instructions for software programs. The instructions, which may be stored in a machine-readable medium 1210 and/or 1219, may be executed by the processing system 1202 to control and manage access to the various networks, as well as provide other communication and processing functions. The instructions may also include instructions executed by the processing system 1202 for various user interface devices, such as a display 1212 and a keypad 1214. The processing system 1202 may include an input port 1222 and an output port 1224. Each of the input port 1222 and the output port 1224 may include one or more ports. The input port 1222 and the output port 1224 may be the same port (e.g., a bi-directional port) or may be different ports.

The processing system 1202 may be implemented using software, hardware, or a combination of both. By way of example, the processing system 102 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1219) may include storage integrated into a processing system, such as might be the case with an ASIC. Machine-readable media (e.g., 1210) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 1202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client device or server or by a processing system of a client device or server. Instructions can be, for example, a computer program including code.

An interface 1216 may be any type of interface and may reside between any of the components shown in FIG. 12. An interface 1216 may also be, for example, an interface to the outside world (e.g., an Internet network interface). A transceiver block 1207 may represent one or more transceivers, and each transceiver may include a receiver 1206 and a transmitter 1209. A functionality implemented in a processing system 1202 may be implemented in a portion of a receiver 1206, a portion of a transmitter 1209, a portion of a machine-readable medium 1210, a portion of a display 1212, a portion of a keypad 1214, or a portion of an interface 1216, and vice versa.

Referring back to FIGS. 2 through 5B and 8B, in one aspect of the disclosure, the agent module 322 may be configured to receive notification of events that occur at the server 204 from the OS module 324. For example, the OS module 324 may report certain events to the agent module 322 including when the client device 202 has logged onto the server 204, when an application is launched on the desktop, when a dialog box or new window is opened, when a textbox field is clicked, pointer movements, clicks (e.g., mouse clicks), and/or other events. To receive notification of events, the agent module 322 may register as an events handler with the OS module 324 to receive reports of certain events.

In one aspect of the disclosure, the agent module 322 may determine an action to be taken at the client device 202 based on the reported event. The agent module 322 may then generate a message based on the determined action and send the message to the client device 202 (e.g., via the server remote access module 334). For example, when the event is a click on a textbox, the agent module 322 may determine that a graphical keyboard is to be activated on the client device 202 and send a message to the client device 202 to activate the graphical keyboard 820a. At the client device 202, the local view module 540 receives the message from the agent module 322 and performs an action based on the received message, as discussed further below. In the above example, the local view module 540 may bring up the graphical keyboard 820a on the display 560 in response to the message.

Examples of events that may be reported to the agent module 322 and messages generated by the agent module 322 for the client device 202 based on the reported events are discussed further below.

In one aspect of the disclosure, the OS module 324 may report a click on a textbox to the agent module 322. This may occur, for example, when user inputs (e.g., pointer movements and a click) received from the client device 202 result in a textbox of the application 327 being clicked on. When this event occurs, the agent module 322 may determine that a graphical keyboard is to be activated on the client device 202 for the user at the client device 202 to enter text. The agent module 322 may then generate a message for the client device 202 including a command to bring up the graphical keyboard 820a on the display 560 of the client device 202, and send the message to the client device 202 (e.g., via the server remote access module 334).

On the client side, the client remote access module 452 receives the message and sends the received message to the local view module 540. Upon reading the received message, the local view module 540 brings up the graphical keyboard 820a on the display 560 of the client device 202 to allow the user at the client device 202 to enter text. An example of this is illustrated in FIGS. 14A and 14B.

Figure 14A:
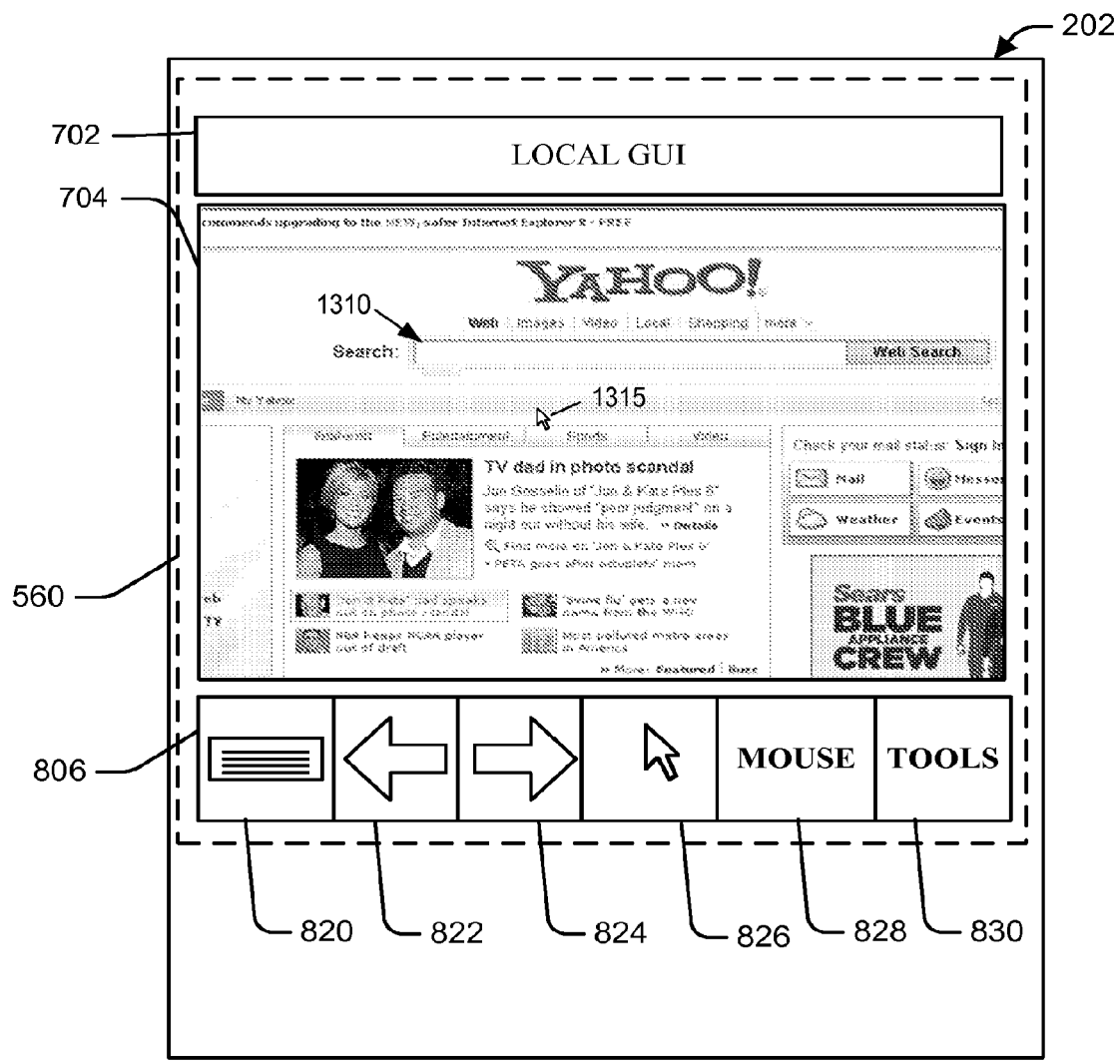
FIG. 14A illustrates an example of a remote application displayed at a client device.
Figure 14B:
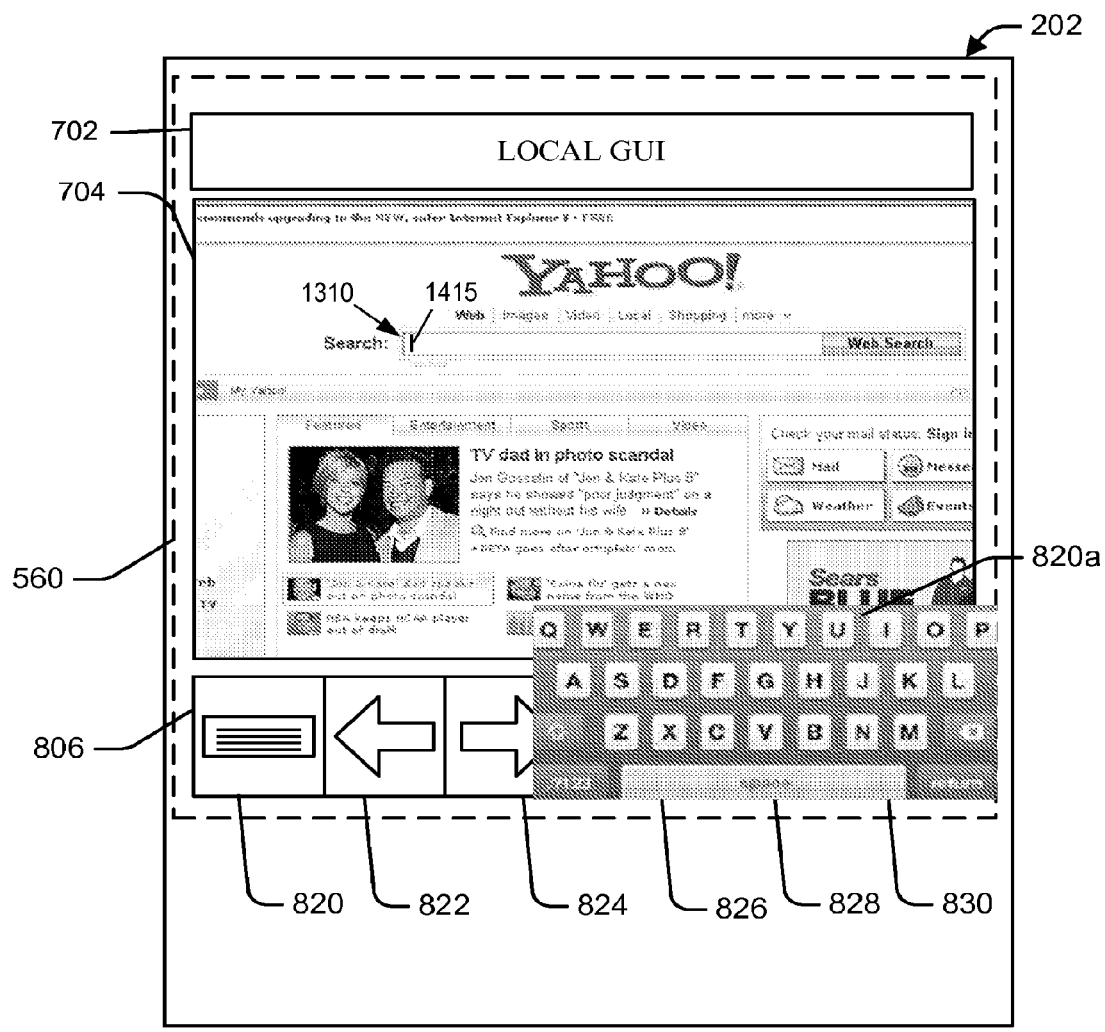
FIG. 14B illustrates an example of a graphical keyboard displayed at the client device for entering text for the remote application.

FIG. 14A shows a display 560 at the client device 202, in which the remote application view 704 displays a web page of a remote web browser application 327. The web page includes a textbox 1310 (e.g., search textbox). In this example, the user at the client device 202 inputs user inputs (e.g., pointer movements and clicks) using a touch screen or other pointer input device at the client device 202. The remote view module 535 sends the user inputs to the server 202 (e.g., via the client remote access module 452). On the server side, the application control module 325 controls the web browser application 327 based on the received user inputs. Updated display output data of the web browser application 327 in response to the user inputs are sent to the client device 202. On the client side, the remote view module 535 updates the image in the remote application view 704 based on the received updated display output data.

On the server side, if a received pointer movement and click result in a textbox being click on, then the OS module 324 reports this event to the agent module 322. The agent module 322 determines that a graphical keyboard 802a is to be activated at the client device 202 and generates a message for the client device 202 including a command to activate the graphical keyboard 820a. The agent module 322 then sends the message to the client device 202. On the client side, the local view module 540 receives the message and brings up the graphical keyboard 820a on the display 560 in response to the message. FIG. 14B shows the display 560 at the client device 202, in which the graphical keyboard 820a is brought up on the display 560 after the textbox 1310 has been click on. An I-beam 1415 or other type of cursor may appear in the textbox 1310 to indicate that text will be entered into the textbox 1310.

As the user at the client device 202 inputs text using the graphical keyboard 820a, the text inputs to the graphical keyboard 820a may be directed to the remote view module 535, for example, as if the user had entered the text using a physical keyboard. The remote view module 535 may then send the user text inputs to the server 204 (e.g., using a RDP/ICA or other remote access protocol). On the server side, the application control module 325 enters the received text into the textbox. Updated display output data showing the inputted text in the textbox is then sent back to the client device 202. In this aspect, when the user at the client device 202 hits the enter button on the graphical keyboard 820a after entering text, the local view module 540 may automatically deactivate the graphical keyboard 820a.

An advantage of this aspect is that the graphical keyboard 820a is automatically brought up on the display 560 when the textbox 1310 is clicked on without requiring the user at the client device 202 to hit the keyboard button 820. This is not possible in other approaches in which only display output data of the remote application 327 is sent to the client device 202. In these approaches, the client device 202 simply displays the display output of the remote application 327 and receives no information about when a textbox of the remote application is clicked on. By contrast, in the above aspect, the agent module 322 determines when the textbox has been clicked on and sends a message to the client device 202 to bring up the graphical keyboard 820a.

In one aspect, the local view module 540 keeps track of the area of the display output of the remote application 327 that is currently displayed in the remote application view 704. FIG. ISA shows an exemplary area 1510 of the display output 1520 that may be displayed in the remote application view 704. In this example, the total area of the display output 1520 may represent what a user at the server 204 might see on a large display at the server 204. In this example, the server 202 may send the entire display output of the remote application 327 to the client device 204, and the client device 204 may store the entire display output in a machine-readable medium (e.g., cache memory).

Figure 15A:
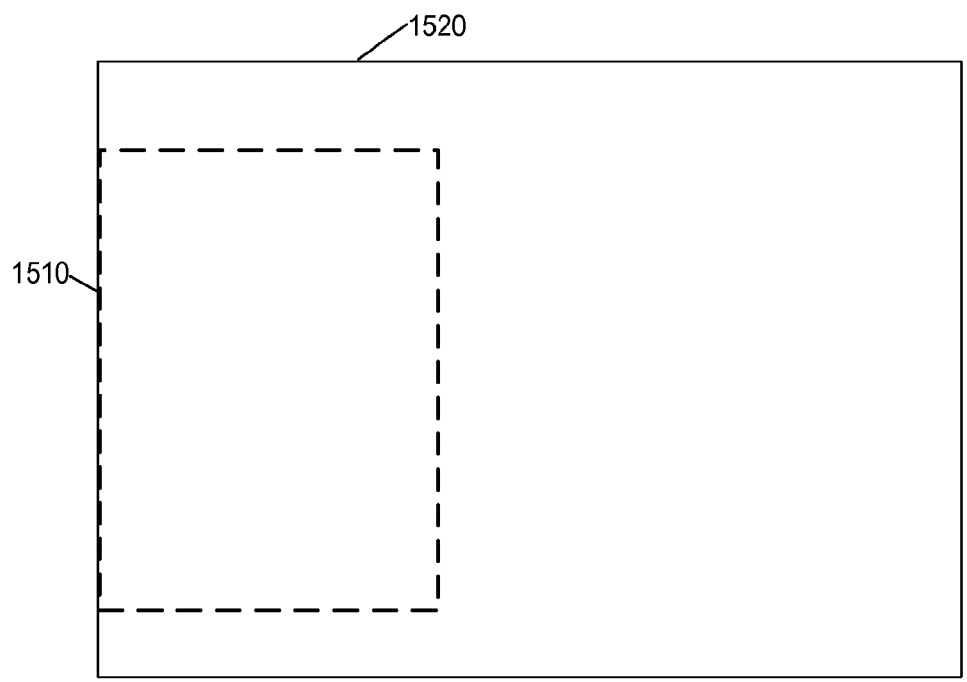
FIG. 15A illustrates an example of an area of the display output of a remote application that is displayed in a remote application view of a client device.
Figure 15B:
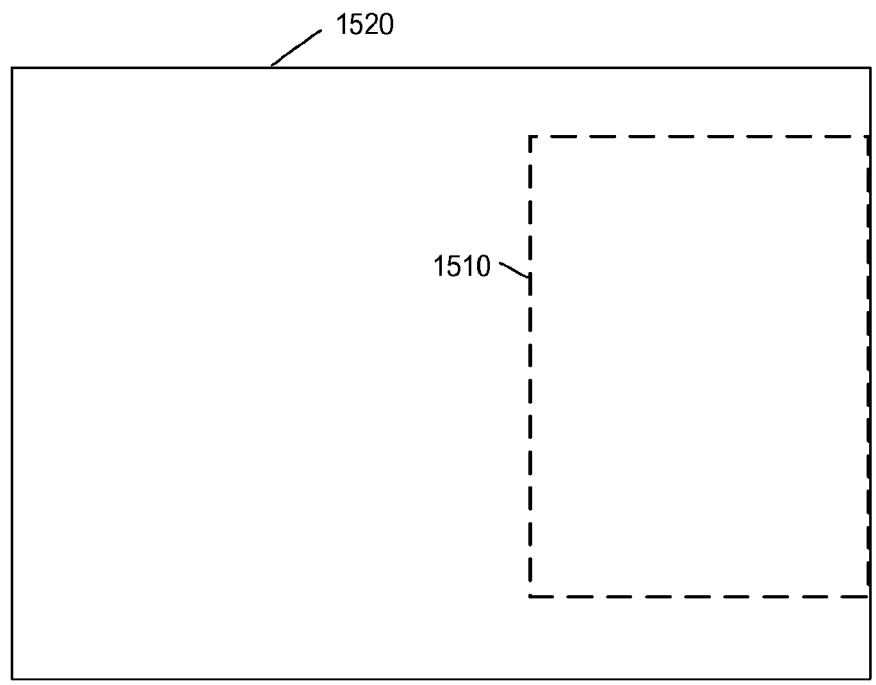
FIG. 15B illustrates an example in which the area of the display output in FIG. 15A is scrolled to the right.

The local view module 540 may then allow the user to manipulate the area 1510 of the display output that is displayed in the remote application view 704. For example, the local view module 540 may allow the user to zoom in by moving two fingers away from each other on a touch screen 565 starting at a desired zoom in location. The local view module 540 may also include zoom in and zoom out buttons on the local GUI 702 and 706. The local view module 540 may also display scrollbars on the display 560 that allow the user to scroll (up, down, left, right) the area 1510 of the display output 1520 displayed in the remote application view 704. FIG. 15B shows an example in which the area 1510 of the display output 1520 displayed in the remote application view 704 has been scrolled to the right. In this aspect, the local view module 540 may send a command to the remote view module 535 specifying which area 1510 of the display output 1520 to display in the remote application view 704 based on inputs from the user. The command may include coordinates and dimensions of the area 1510 to be displayed in the remote application view 704.

As discussed further below, the local view module 540 may keep track of the area 1510 of the display output 1520 displayed in the remote application view 704 to determine whether the user at the client device 202 can view certain events (e.g., a dialog box popup) communicated to the local view module 540 by the agent module 322.

In one aspect of the disclosure, the OS module 324 may report to the agent module 322 when a dialog box and/or window opens as a result of user inputs (e.g., pointer movements and clicks) received from the client device 202. For example, a dialog box may open when a pointer is moved over an object (e.g., icon) and/or when an object is clicked on. The dialog box may display information to the user and/or request information from the user. For an example of a web browser application 327, a new browser window may open when the user clicks on a link.

When the OS module 324 reports that a dialog box and/or window has opened, the agent module 322 may determine that the dialog box and/or window is to be displayed to the user at the client device 202. In this aspect, the OS module 324 may also communicate the coordinates and dimensions of the dialog box or window to the agent module 322. The agent module 322 may then generate a message for the client device 202 including the coordinates and dimensions of the dialog box or window. The agent module 322 may then send the message to the client device 202 (e.g., via the server remote access module 334).

On the client side, the client remote access module 452 receives the message and sends the received message to the local view module 540. Upon reading the received message, the local view module 540 may determine whether the newly opened dialog box or window is currently shown in the remote application view 704. The local view module 540 may do this, for example, by comparing the coordinates and dimensions of the dialog box or window with the coordinates and dimensions of the area 1510 of the display output 1520 displayed in the remote application view 704. If the dialog box or window is not currently shown in the remote application view 704, then the local view module 540 may command the remote view module 535 to scroll and/or zoom out the remote application view 704 by a certain amount so that the dialog box or window is shown in the remote application view 704. The local view module 540 may determine the amount that the remote application view 704 needs to be scrolled and/or zoomed out based on differences between the coordinates and/or dimensions of the dialog box or window and the coordinates and/or dimensions of the area 1510 of the remote application view 704. An example of this is shown in FIGS. 16A and 16B.

Figure 16A:
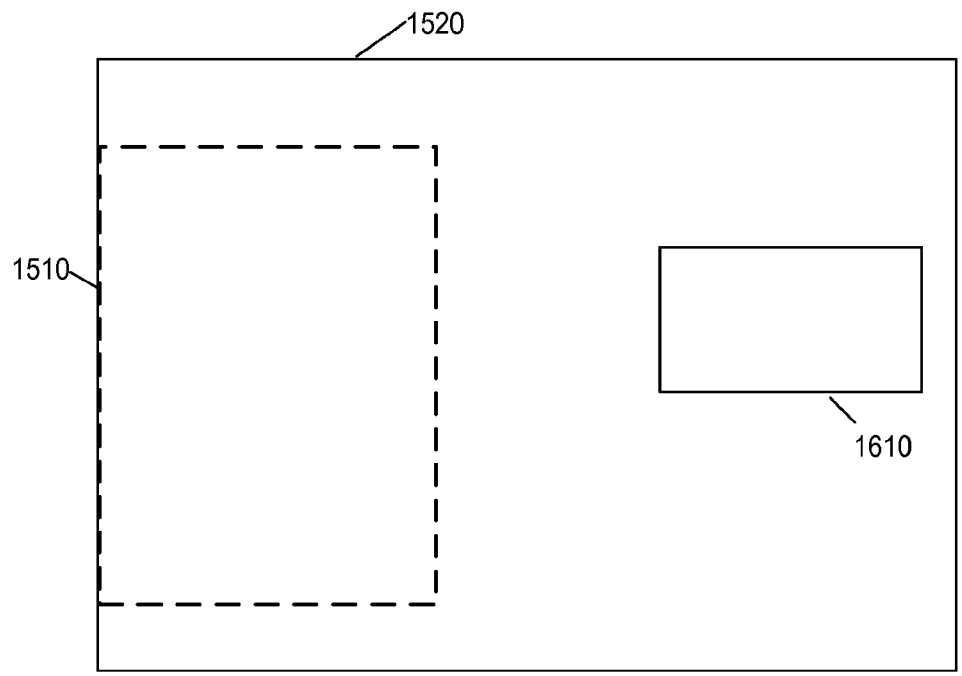
FIG. 16A illustrates an example in which a dialog box or window is located outside the area of the display output displayed in the remote application view.
Figure 16B:
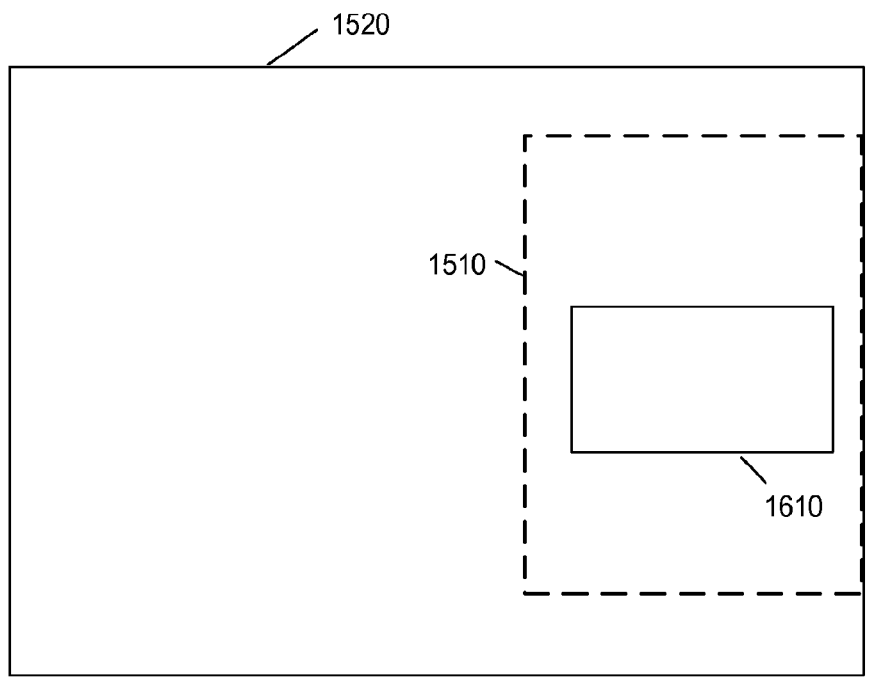
FIG. 16B illustrates an example in which the area of the display output displayed in the remote application view is scrolled to the right to encompass the dialog box or window.

FIG. 16A shows an example in which a dialog box or window 1610 opens outside the area 1510 of the remote application view 704. As a result, the user at the client device 202 cannot see the dialog box or window 1610. For example, the dialog box 1610 may require certain information (e.g., billing information) from the user to continue with a transaction (e.g., purchase). In this example, if the user cannot see the dialog box 1610 at the client device 204, then the user may be unaware that information is being requested.

In this example, the agent module 322 may send the coordinates and dimensions of the dialog box 1610 to the local view module 540 on the client side. The local view module 540 may then determine that the dialog box 1610 is not displayed in the remote application view 704. After making this determination, the local view module 540 may command the remote view module 535 to scroll the remote application view 704 so that the dialog box 1610 is shown in the remote application view 704. FIG. 16B shows an example in which the area 1510 of the remote application view 704 has been scrolled to the right so that the dialog box 1610 is shown in the remote application view 704. The local view module 540 may also command the remote view module 535 to zoom out the remote application view 704 so that the dialog box 1610 is shown in the remote application view 704. This advantageously allows the user at the client 204 to view the dialog box 1610 in order to receive information in the dialog box 1610 and/or enter information requested by the dialog box 1610.

In one aspect, the local view module 540 may notify the user at the client device 202 when a dialog box or window 1610 opens outside the area 1510 of the remote application view 704. In this aspect, the local view module 540 may display an arrow or other indicator on the display 560 indicating the direction of the dialog box or window 1610. The user may then choose whether to scroll the remote view application 704 in the indicated direction to view the dialog box or window 1610.

In one aspect, the OS module 324 may also report to the agent module 322 when the dialog box or window closes. For example, a dialog box may close when the user has entered information requested by the dialog box. In this aspect, the agent module 322 may send a message to the local view module 540 indicating that the dialog box or window has closed. The local view module 540 may then command the remote view module 535 to return the area 1510 of the remote application view 704 back to its original location before the dialog box or window was opened. In other words, the local view module 540 may undo the scrolling and/or zooming when the dialog box or window closes.

In one aspect, the OS module 324 may also report to the agent module 322 when a new web page is loaded in a web browser application 327. The agent module 322 may then send a message to the local view module 540 informing the local view module 540 that a new web page has been loaded. The local view module 540 may then command the remote view module 535 to zoom out the remote application view 704 to show substantially the entire display output 1520. This aspect automatically gives the user at the client device 202 an overview of content in the newly loaded web page. The user may then decide to zoom and/or scroll the remote application view 704 to focus on a desired portion of the new web page.

In one aspect, the OS module 324 may report the current coordinates (e.g., x-y coordinates) of the pointer to the agent module 322. The coordinates of the pointer may refer to coordinates of a pointer moved by the user at the client device 202 using a pointer input device or coordinates of a location where the user touches a display 560 at the client device 202 (e.g., using a touch screen overlaying the display 560). The agent module 322 may use the current coordinates of the pointer to determine whether the pointer is on an object (e.g., picture) in the application 327. The agent module 322 may do this, for example, by determining the coordinates and dimensions of objects in the application 327 and comparing the coordinates and dimensions of the objects with the reported coordinates of the pointer.

For an example of a web browser application 327, the agent module 322 may determine the coordinates (e.g., x-y coordinates) and dimensions (e.g., width and height) of objects (e.g., pictures, icons, animations, banners, etc.) in a web page by analyzing markup language code (e.g., HTML, XML, etc.) for the web page. The agent module 322 may receive the markup language code from the application control module 325. The markup language code for the web page may identify objects in the web page and their locations in the web page. The markup language code may also provide attributes for each object including object type (e.g., picture) and dimensions (e.g., height and width) of the object. The agent module 322 may use this information to determine the types of objects in the web page and the coordinates and dimensions of the objects in the web page. The agent module 322 may make this determination each time a new web page is loaded into the web browser application 327.

In this aspect, when the agent module 322 determines that the pointer is on an object in the application, then the agent module 322 may determine that substantially the entire object is to be displayed at the client device 202. The agent module 322 may then send a message to the client device 202 including information of the object. The information may include object type (e.g., picture) and the coordinates and dimensions of the object. On the client side, the local view module 540 may receive the coordinates and dimensions of the object and use the received coordinates and dimensions of the object to determine whether substantially the entire object is shown in the remote application view 704. The local view module 540 may do this, for example, by comparing the coordinates and dimensions of the object with the coordinates and dimensions of the area 1510 of the remote application view 704.

If the local view module 540 determines that substantially the entire object is not shown in the remote application view 704, then the local view module 540 may command the remote view module 535 to scroll and/or zoom the remote application view module 535 by a certain amount to show substantially the entire object. The local view module 540 may determine the amount based on differences between the coordinates and dimensions of the object and the coordinates and dimensions of the area 1510 of the remote application view 704. An example of this is illustrated in FIGS. 17 and 18.

Figure 17:
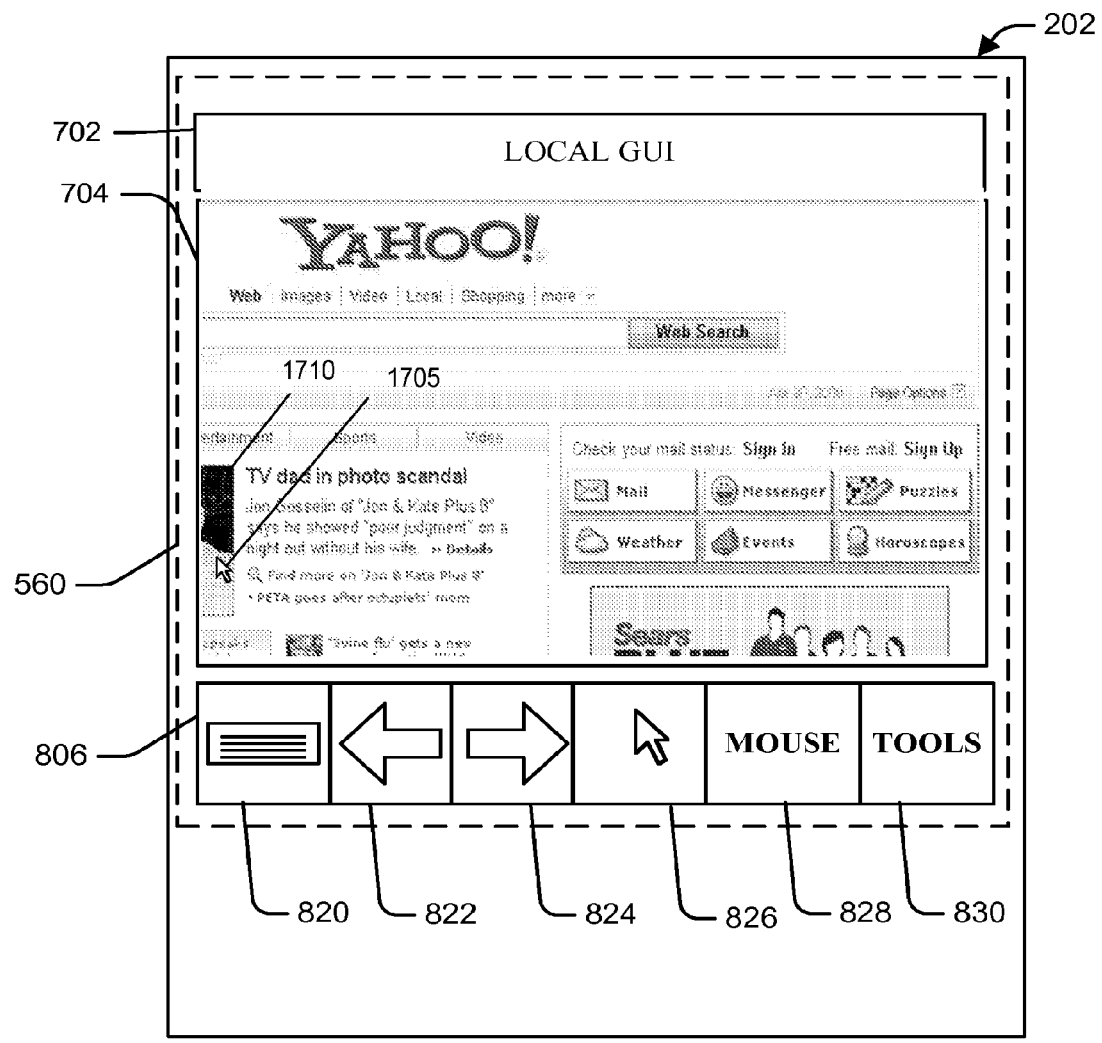
FIG. 17 illustrates an example in which a portion of an object of a remote application is displayed at a client device.
Figure 18:
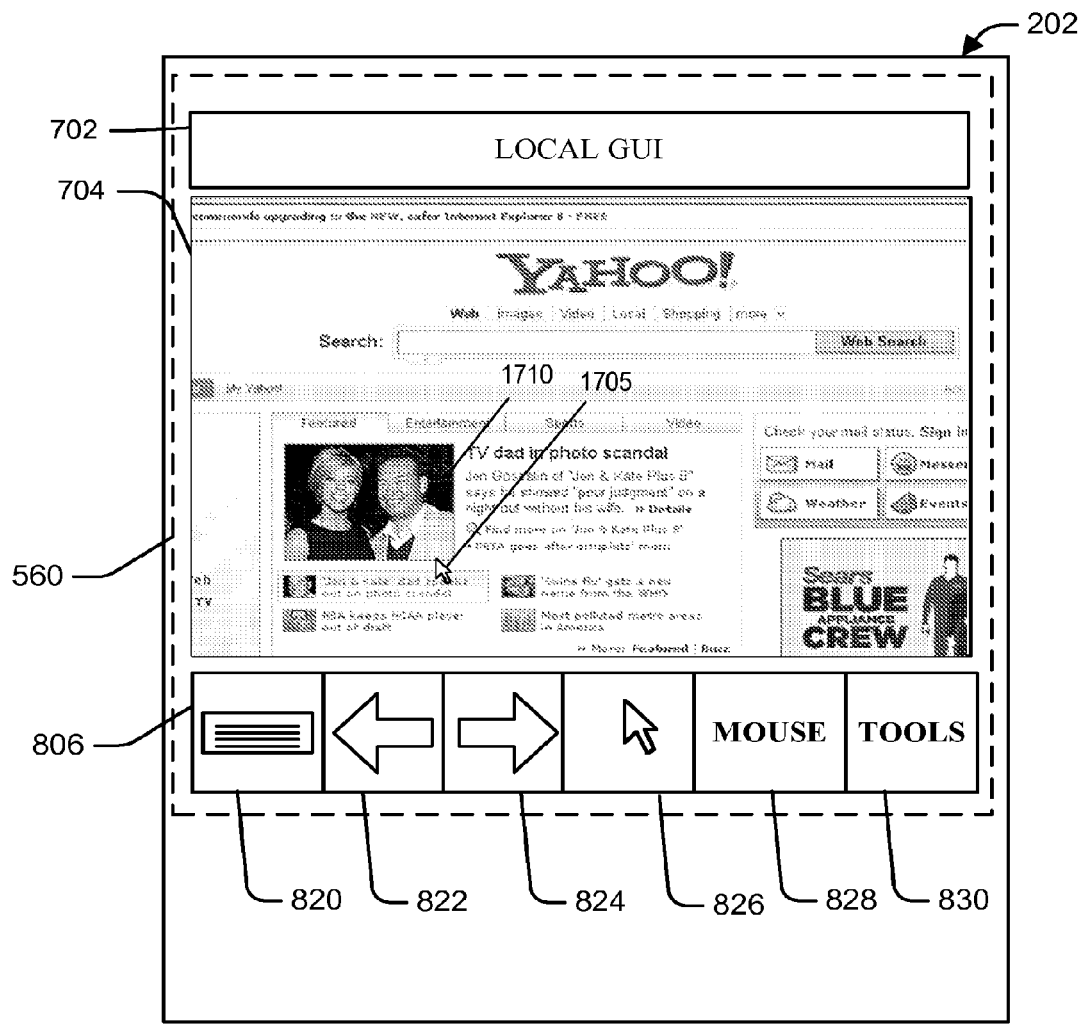
FIG. 18 illustrates an example in which a remote application view of the client device is scrolled to the right to reveal the entire object of the remote application.
Figure 19A:
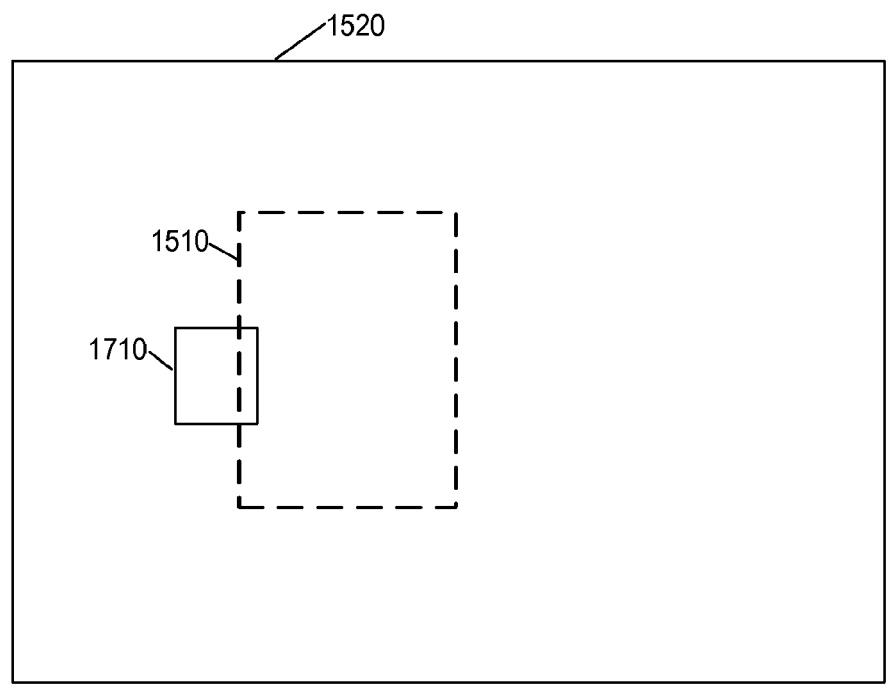
FIG. 19A illustrates an example in which a portion of an object is located within an area of the display output displayed in the remote application view.

FIG. 17 shows an example of a display 560 at the client device 202, in which the remote application view 704 displays a web page on the remote web browser application 327. The web page includes an object 1710 (e.g., a picture). In this example, only a small portion of the object 1720 is shown in the remote application view 704 and a pointer 1705 is placed on the object 1710. FIG. 19A shows the portions of the object 1710 that are within and outside the area 1510 of the remote application view 704.

On the server side, the agent module 322 determines that the pointer 1705 is on the object 1720 based on the coordinates of the pointer reported from the OS module 324 and the coordinates and dimensions of objects in the web page. The agent module 322 then generates a message for the client device 202 including the coordinates and dimensions of the object 1710, and sends the message to the client device 202.

Figure 19B:
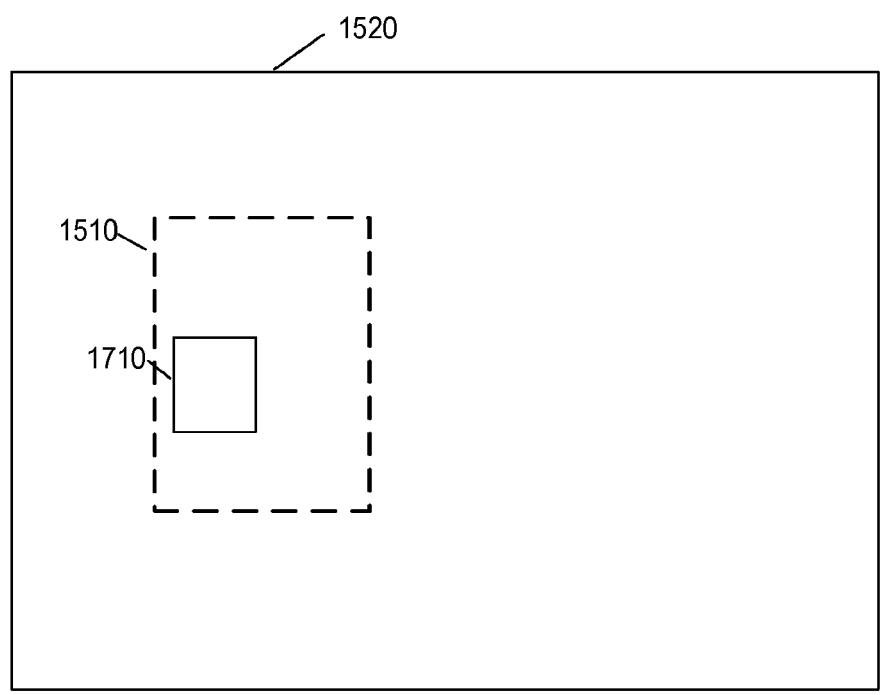
FIG. 19B illustrates an example in which the entire object is located within the area of the display output displayed in the remote application view.

On the client side, the local view module 540 receives the message and determines whether substantially the entire object 1710 is shown in the remote application view 704. In this example, the local view module 540 determines that only a small portion of the object 1710 is shown in the remote application view 704. The local view module 540 then commands the remote view module 535 to scroll the remote application view 704 to the left so that substantially the entire object 1710 is shown the remote application view 704. FIG. 18 shows an example of the display 560 after the remote application view 704 has been scrolled to the left to show the entire object 1710 in the remote application view 704. FIG. 19B shows that, after scrolling to the left, the entire object 1710 is within the area 1510 of the remote application view 704.

In one aspect, the local view module 540 may also zoom in on the object 1710. For example, the local view module 540 may also command the remote view module 535 to zoom in on the object 1710 in the remote application view 704. For example, the local view module 540 may center the object 1710 in the remote application view 704 and maximize the size of the object 1710 in the remote application view 704.

An advantage of this aspect is that, when the user shows an interest in an object by moving a pointer to the object or touching the object using a touch screen, substantially the entire object is automatically shown in the remote application view 704. Thus, the user does not have to scroll and/or zoom out to see the rest of the object of interest.

In another example, the object 1710 may be a video. In this example, the video file for the object 1710 may be downloaded from a uniform resource locator (URL) and played using a media player application. The URL for the video file may be included in markup language code for a web page or other source.

In this example, the agent module 322 on the server side may determine when the pointer is on the object 1710 and/or clicks on the object 1710 based on coordinates of the pointer and/or pointer clicks reported from the OS module 324. The agent module 322 may then generate a message including the URL for the video file, and send the message to the client device 202.

On the client side, the local view module 540 receives the message, retrieves the URL for the video file from the message, and downloads the video file onto the client device 202 from the URL. In this example, the client remote access module 452 may establish a connection with the Internet or other network, and the local view module 540 may download the video file from the URL through the connection. After the video file is downloaded or while the video file is downloading, the local view module 540 may launch a local media player application on the client device 202 and play the video file using the local media player application. The local view module 540 may then display the output of the local media player application on the display 650. For example, the local view module 540 may display the output of the local view module 540 over the remote application view 704.

A process for establishing a remote session on the server 204 for a user at the client device 202 will now be discussed according to an aspect of the disclosure. When the user at the client device 202 desires to remotely access a remote server, the local view module 540 may display a plurality of remote servers from which the user can select on the display 560. For each available remote server, the client device 202 may store an address (e.g., IP address) and user credentials (e.g., login name and password) for the server. The user may then select one of the remote servers on the display 560, for example, using a touch screen overlaying the display 560.

When the user selects a remote server, the client remote access module 452 may initiate a remote access connection 525 with the server remote access module 334 of the server 204. To do this, the client remote access module 452 may send a request for remote access to the server 204 (e.g., over a TCP/IP network connection using an IP address of the server 204). The request may include user credentials (e.g., login name and password). If the user credentials are accepted, then the server remote access module 334 of the server 204 establishes a remote session for the client device 202, providing the client device 202 with remote access to the server 204.

In one aspect, the OS module 324 may notify the agent module 322 that a remote session has been established for the client device 202. The agent module 322 may then send a message to the client device 202, via the server remote access module 334, informing the client device 202 that the agent module 322 is active and ready to accept command messages from the client device 202. On the client side, the client remote access module 452 may send the message to the local view module 540. Upon receiving the message, the local view module 540 may send an acknowledgement to the server 204. On the server side, the server remote access module 334 may send the acknowledgement to the agent module 322. This process may be used to initialize communication between the agent module 322 and the local view module 540.

Figure 20:
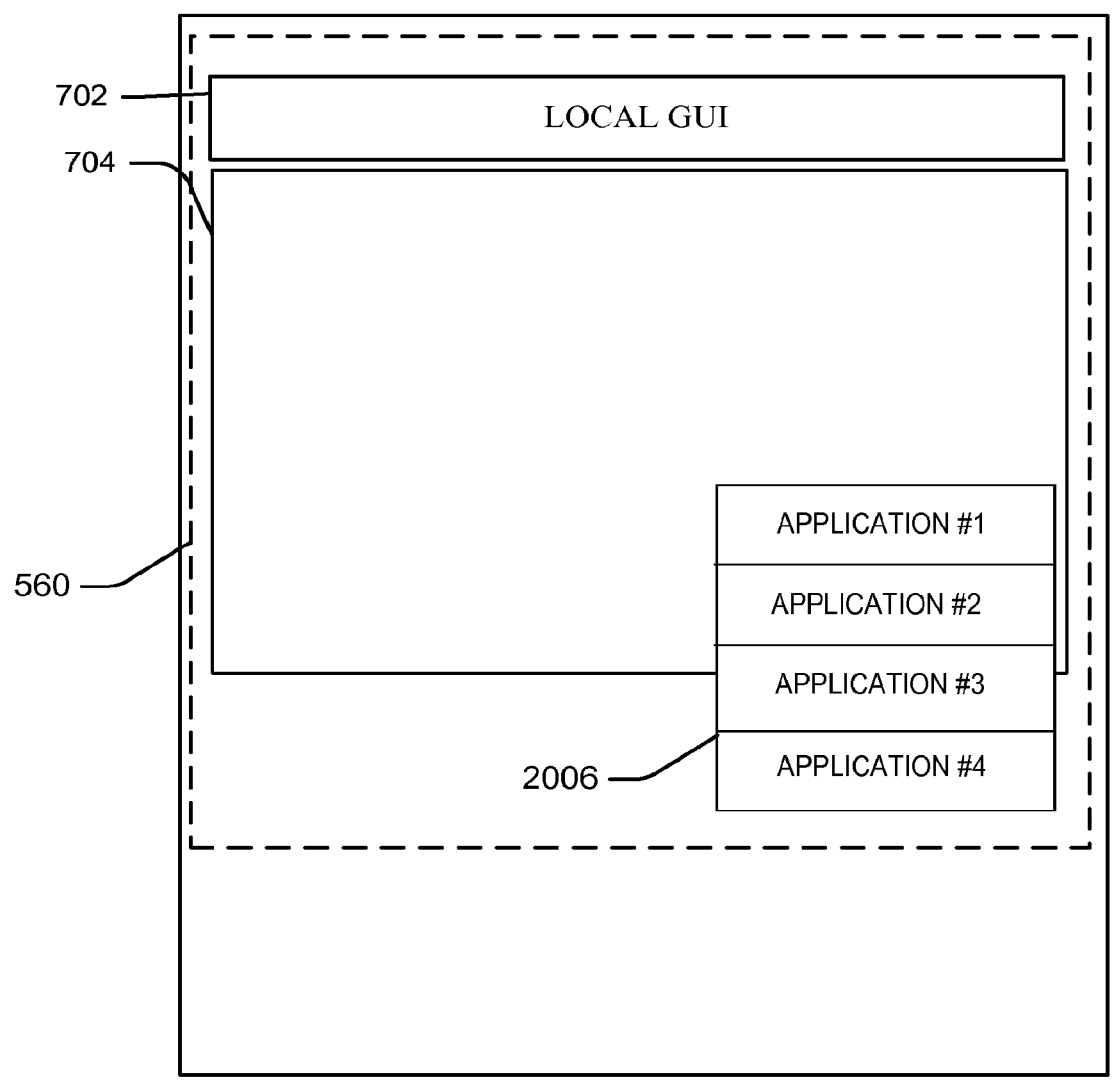
FIG. 20 illustrates an example of a local GUI at a client device listing applications that are available at a remote server.

After initializing communication with the agent module 322, the local view module 540 may display a plurality of applications that are available on the server 204. The local view module 540 may display a list of the available applications in a menu on the display 560 and the user may select a desired one of the applications, for example, using a touch screen. FIG. 20 shows an example of a local GUI 2006 listing applications that are available on the server 204. The local GUI 2006 is locally generated and not generated from display output data from the server 204.

When the user selects an application, the local view module 540 may generate a command message identifying the selected application and send the command message to the server 204 via the client remote access module 452. On the server side, the server remote access module 334 may send the command to the agent module 322. The agent module 322 may then issue a command to the OS module 324 to launch the identified application 327 on the server 204. The agent module 322 may also command the application control module 325 to maximize the size of the display output of the application 327.

The server remote access module 334 may then send display output data of the application 327 to the client device 202. On the client side, the local view module 540 may display a local GUI 702 and 706 for the selected application on the display 560. The local view module 540 may also translate user inputs to the local GUI 702 and 706 into corresponding command messages and send the command message to the agent module 322, as discussed above.

In one aspect of the disclosure, the desktop module 328 may generate a desktop on the server 204. The desktop may include icons of available applications that can be selected and launched on the server 204. In one aspect, the desktop module 328 may be integrated with the operating system 330 (e.g., Windows-based operating system).

Figure 21:
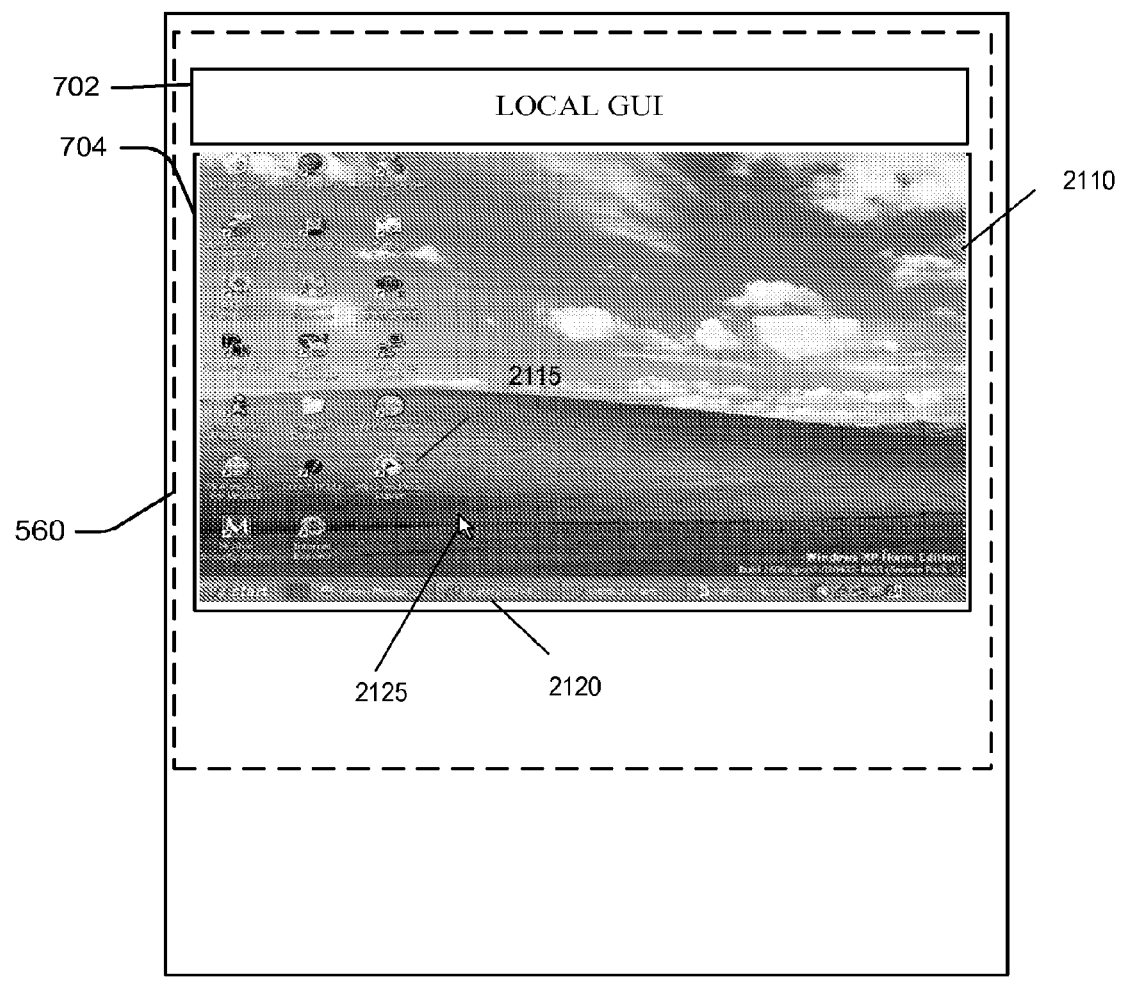
FIG. 21 illustrates an example of a remote desktop displayed at a client device.

In this aspect, the server remote access module 334 may send display output data of the desktop to the client device 202. On the client side, the remote view module 535 may display the remote desktop in the remote application view 704 on the display 560. FIG. 21 shows an example of a remote desktop 2110 displayed in the remote application view 704 at the client device 202. The remote desktop 2110 includes icons 2115 of applications that can be launched on the server 204 and a taskbar 2120.

In this aspect, the user at the client device 202 may select an application on the remote desktop displayed in the remote application view 704, for example, by moving a pointer 2125 to the icon 2115 of a desired application and clicking on the icon 2115 using a pointer input device. The remote view module 535 may then send the entered user inputs (e.g., pointer movements and clicks) to the server 202. On the server side, the server remote access module 334 may input the received user inputs to the desktop module 328. When received user inputs to the desktop result in an application being launched on the server 204, the OS module 324 may inform the agent module 322. The agent module 322 may then generate a message identifying the launched application and send the message to the client device 204 (e.g., via the server remote access module 334).

On the client side, the client remote access module 452 may send the message to the local view module 540. The local view module 540 may then display a local GUI 702 and 706 for the identified application on the display 560. For example, the client device 202 may store configuration files for a plurality of local GUIs for different applications. The local view module 540 may then retrieve the configuration file 451 for the local GUI 702 and 706 corresponding to the application identified in the received message and generate the local GUI based on the retrieved configuration file 451. The local view module 540 may then display the local GUI 702 and 706 on the display 560 to allow the user to remotely control the application 327 on the server 204, as discussed above.

In this aspect, the local view module 540 may also generate a local GUI for the user at the client device 202 to control the remote desktop at the server 204. For example, the local GUI for the remote desktop may allow the user to select a background for the desktop, hide a taskbar of the desktop, and other functions. In another example, the local GUI for the remote desktop may allow the user to minimize, resize, hide and/or move a window for an application on the remote desktop. When the user enters user inputs to the local GUI for the remote desktop, then the local view module 540 may translate the user inputs into a command message for the remote desktop. For example, the local view module 540 may translate user inputs to a graphical control object (e.g., hide taskbar button) on the local GUI into a command message to hide the taskbar. The local view module 540 may send the command message to the server 204 via the client remote access module 452. On the server side, the server remote access module 334 may send the command message to the agent module 322. The agent module 322 may then issue a command to the desktop module 328 based on the received command message. For example, when the received command message is to hide the taskbar, then the agent module 322 may issue a command to the desktop module 328 to hide the taskbar.

Figure 22:
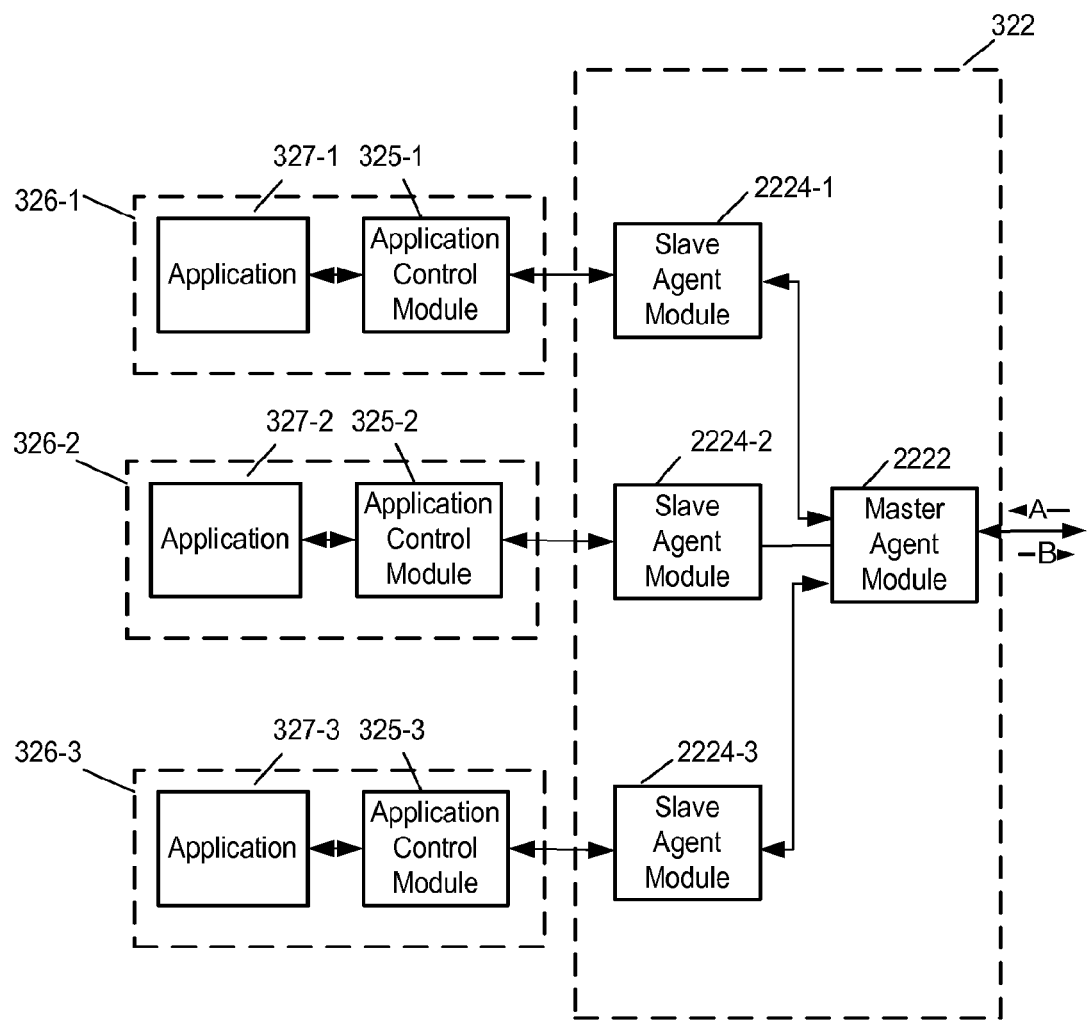
FIG. 22 is a conceptual block diagram of an agent module according to certain aspects of the present disclosure.
Figure 23A:
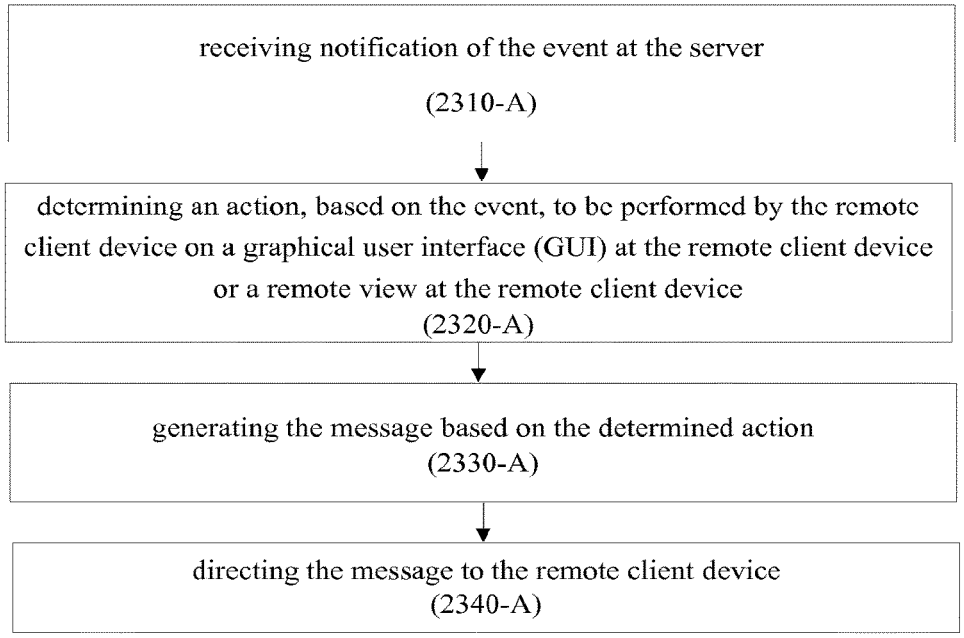
FIG. 23A illustrates an example of an operation of an apparatus according to one aspect of the present disclosure.
Figure 23B:
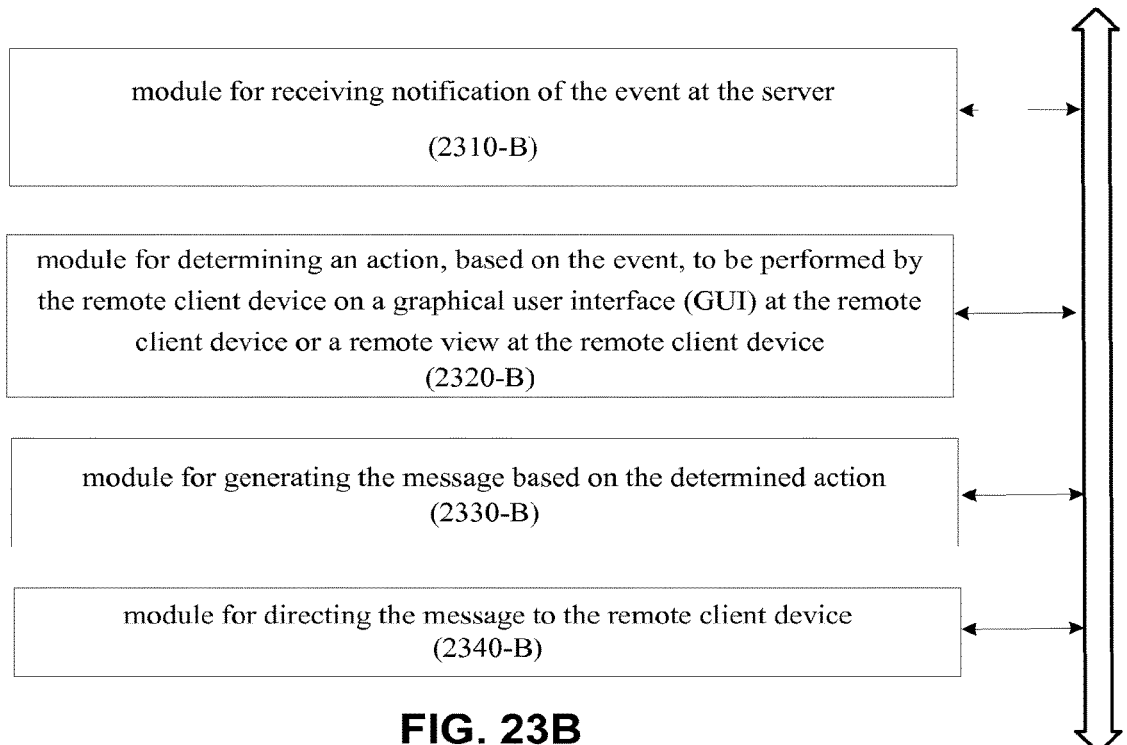
FIG. 23B illustrates an example of a configuration of an apparatus according to one aspect of the present disclosure.
Figure 24A:
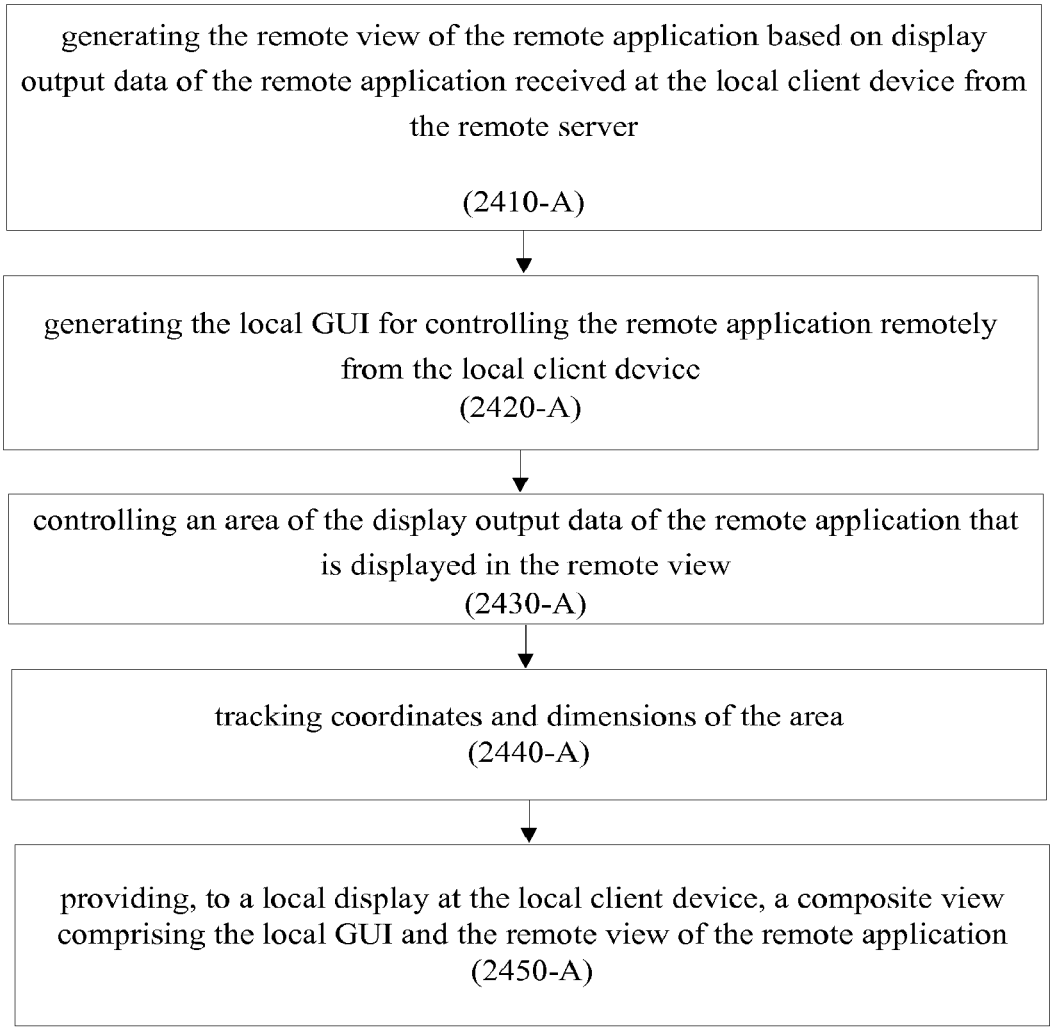
FIG. 24A illustrates an example of an operation of an apparatus according to one aspect of the present disclosure.
Figure 24B:
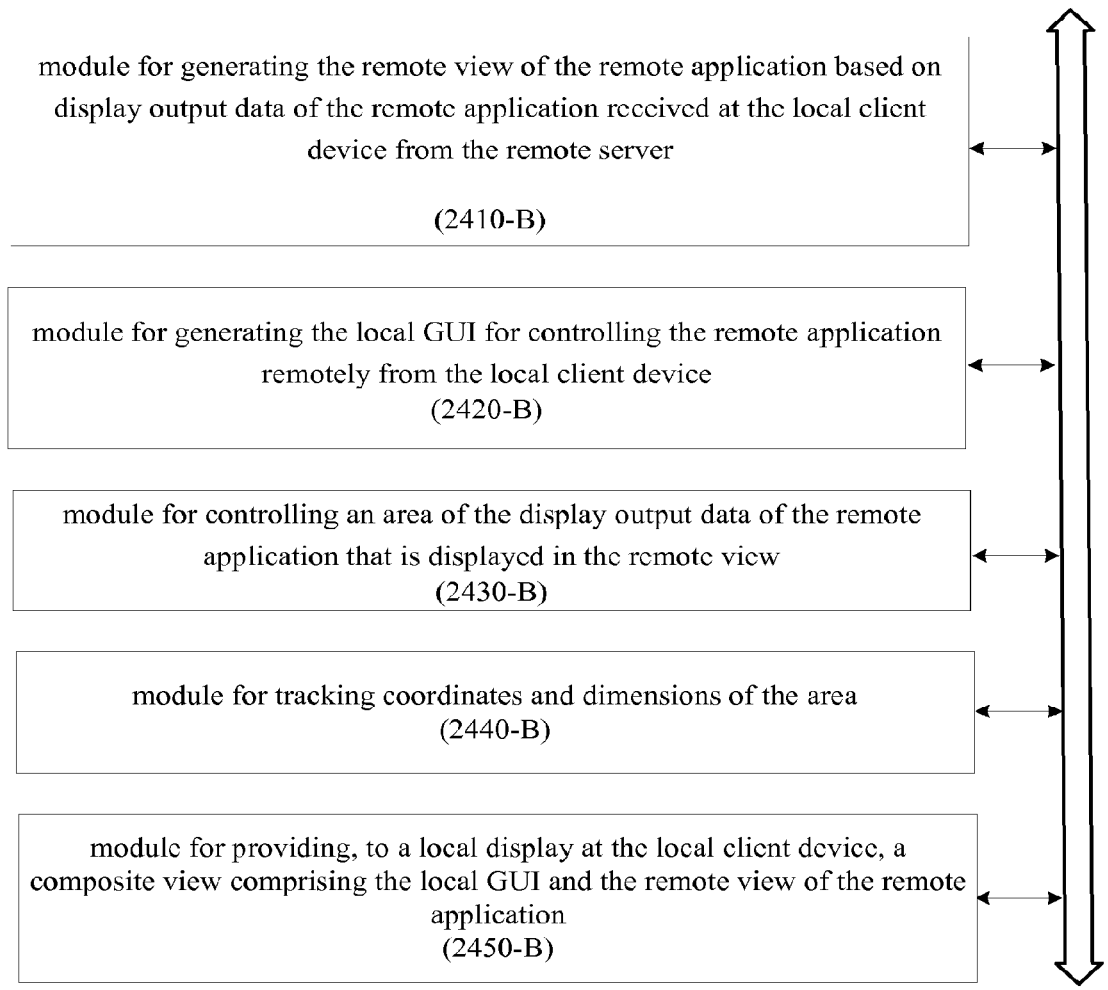
FIG. 24B illustrates an example of a configuration of an apparatus according to one aspect of the present disclosure.

FIG. 22 is a conceptual block diagram of the agent module 322 according to an aspect of the disclosure. In this aspect, the agent module 322 comprising a master agent module 2222 and a plurality of slave agent modules 2224-1 to 2224-3. The agent module 322 may include any number of slave agent modules 2224-1 to 2224-3. In this aspect, each slave module agent 2224-1 to 2224-3 may be configured to control a particular application module 326-1 to 326-3 based on command messages from the client device 202. The master agent module 2222 may be configured to receive a command message from the client device 202 (via the server remote access module 334) and direct the command message to one of the slave agent modules 2224-1 to 2224-3.

In one aspect, there may be a number of applications 327-1 to 327-3 running on the server 204, in which each of the corresponding application modules 326-1 to 326-3 is controlled by one of the slave agent modules 2224-1 to 2224-2. In this aspect, the OS module 324 may notify the master agent module 2222 which one of the applications 327-1 to 327-3 is currently in focus on the server 204. For example, an application 327-2 to 327-3 may be in focus when an active pointer, cursor or I-beam appears in the window of the application 327-2 to 327-3. The master agent module 2222 may then direct command messages from the client device 202 to the slave agent module 2224-1 to 2224-3 corresponding to the application 327-1 to 327-3 currently in focus.

In one aspect, the user the client device 202 may indicate which one of a plurality of applications 327-1 to 327-3 currently running on the server 202 he or she desires to access at a given time. For example, the local view module 540 may display a taskbar in the local GUI 702 and 704 indicating which application are currently running on the server 204. In this aspect, the OS module 324 may notify the master agent module 2222 which applications are running on the server 204 and the master agent may send a message to the client device 202 identifying these applications. The local view module 540 may then generate a local taskbar identifying these applications based on the message. When the user selects an application from the taskbar (e.g., using a touch screen), the local view module 540 may send a command message to the server 204 identifying the application.

On the server side, the server remote access module 334 may send the command message to the master agent module 2222. The master agent module 2222 may then send a command to the desktop module 328 to maximize the selected application and minimize or hide the other applications running on the server 204 so that the display output from the sever 204 to the client device 202 only shows the selected application. The master agent module 2222 may then direct subsequent command messages from the client device 202 to the slave agent module 2224-1 to 224-3 corresponding to the selected application 327-1 to 327-3.

Portability of a remote desktop session may be desirable to a user for several reasons. For example, a user may want to forward a live remote session from a phone to her computer or vice versa, or a user may want to use a display device, such as a projector, display a live session from a small-screen device such as a mobile phone. While some techniques (e.g., the remote desktop protocol or RDP) facilitate portability by preserving a remote desktop session and allowing a user to log out from one client device and log back into the preserved remote desktop session from another client device, these techniques fail to provide a comprehensive solution for authentication and portability of remote desktop sessions. For example, the session hand-off is cumbersome and time-consuming because it requires a user to submit to another biometric scan and/or go through the additional operations of logging into a new session.

In one aspect of the disclosure, a configuration of the subject technology enables the secure passing of user credentials and remote desktop sessions between a client device (e.g., a smartphone such as a Blackberry or iPhone) and a host device (e.g., a thin client or a workstation).

Figure 25:
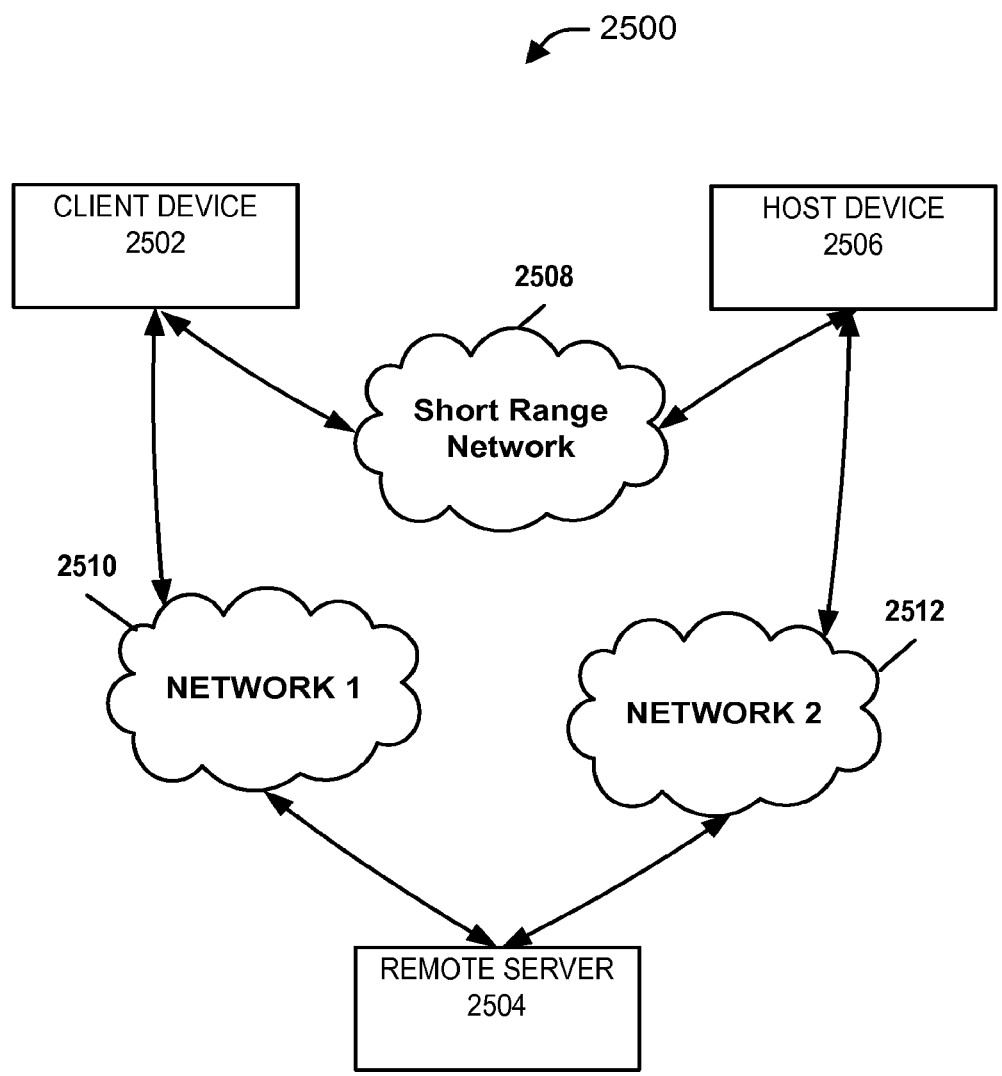
FIG. 25 is a block diagram of a communication network in accordance with certain configurations of the present disclosure.

FIG. 25 illustrates a simplified diagram of a system 2500 in accordance with one configuration of the present disclosure. The system 2500 may include one or more client devices 2502 in communication with a remote server 2504 over a first communication network 2510. The remote server 2504 is also communicatively coupled with a host device 2506 via a second communication network 2512. The host device 2506 and the client device 2502 may be able to communicatively couple over a third communication network 2508.

By way of illustration and not limitation, a client device 2502, a host device 2506 and a remote server 2504 can represent a computer, a mobile phone, a laptop computer, a thin client device, a personal digital assistant (PDA), a portable computing device, or a suitable device with a processor. In one example, a client device 2502 is a smartphone (e.g., iPhone, Android phone, Blackberry, etc.), a host device 2506 is a thin client device and a remote server 2504 is a server computer. In certain configurations, a client device 2502, a remote server 2504 and a host device 2506 can each represent an audio player, a game console, a camera, a camcorder, an audio device, a video device, a multimedia device, or a device capable of supporting a connection to a remote server. In one example, a client device 2502, a remote server 2504 and a host device 2506 can be mobile. In another example, a client device 2502, a remote server 2504 and a host device 2506 can be stationary.

By way of illustration and not limitation, each of communication networks 2510 and 2512 may be wired or wireless communication networks and may have any geographic reach (e.g., a personal area network, a local area network, or a wide area network). The networks 2510 and/or 2512 may use the internet protocol (IP) packet format or any other format for data communication. The networks 2510 and/or 2512 may comprise one or more heterogeneous networks communicating on different physical media, and may be managed by one or more network operators. In one example, communication networks 2510 and/or 2512 may be a wireless wide area network comprising a cellular telephony network such as a code division multiple access (CDMA) or a Global System for Mobile Communication (GSM) network. In one example, communication networks 2510 and/or 2512 may be the Internet.

By way of illustration and not limitation, a communication network 2508 may be a wired or wireless short range communication network such as one of the family of Institute of Electrical and Electronics Engineers (IEEE) 802.x communication networks, a Bluetooth network, a universal serial bus (USB) connection, a near-field communication (NFC) network, a FireWire connection, or another type of connection or network. In one example, communication network 2508 may be a connection or network within a distance of 1 foot, 5 feet, 10 feet, 15 feet, 20 feet, 50 feet or 100 feet (e.g., devices 2502 and 2506 are located within 1 foot, 5 feet, 10 feet, 15 feet, 20 feet, 50 feet or 100 feet of each other). In certain configurations, network 2508 may be of a type as described above for a communication network 2510 or 2512.

In one aspect, the term "network" may, for example, refer to a connection or vice versa. In one aspect, the term "a network" may, for example, refer to one or more networks, and the term "a connection" may, for example, refer to one or more connections.

Figure 26A:
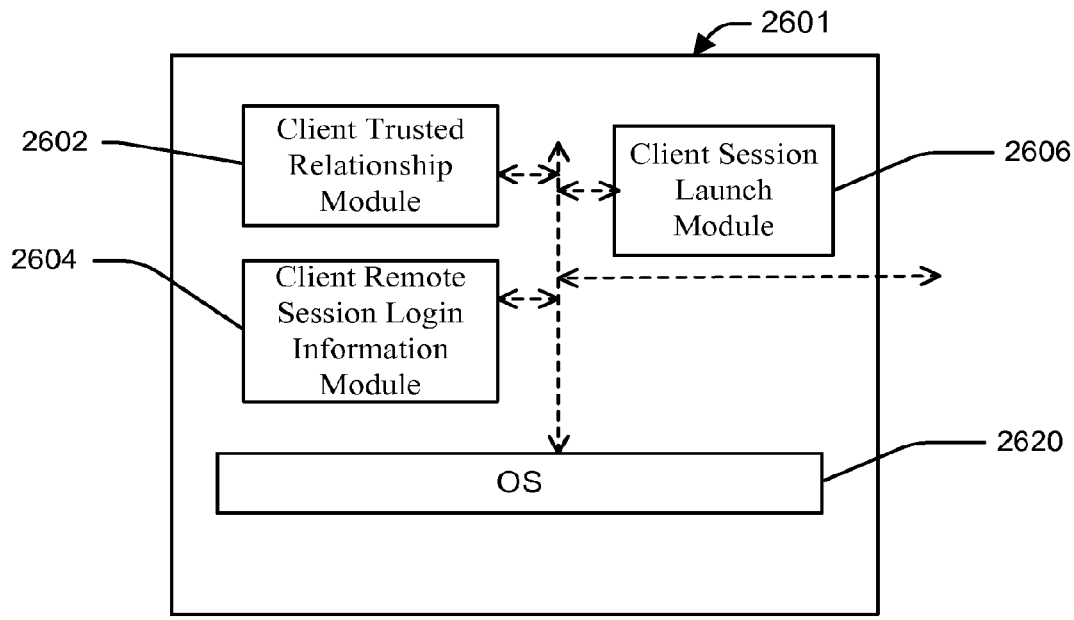
FIG. 26A is a conceptual block diagram that illustrates exemplary modules implemented at a client device in accordance with certain configurations of the present disclosure.

FIG. 26A illustrates a simplified block diagram of an embodiment 2601 of a client device 2502 in accordance with certain embodiments of the present disclosure. The operating system (OS) 2620 is in communication with a client trusted relationship module 2602, a client remote session login information module 2604 and a client session launch module 2606. Features and functions of these modules according to certain embodiments of the present disclosure may be implemented in software, in hardware and/or in combination and are further described in the disclosure.

Figure 26B:
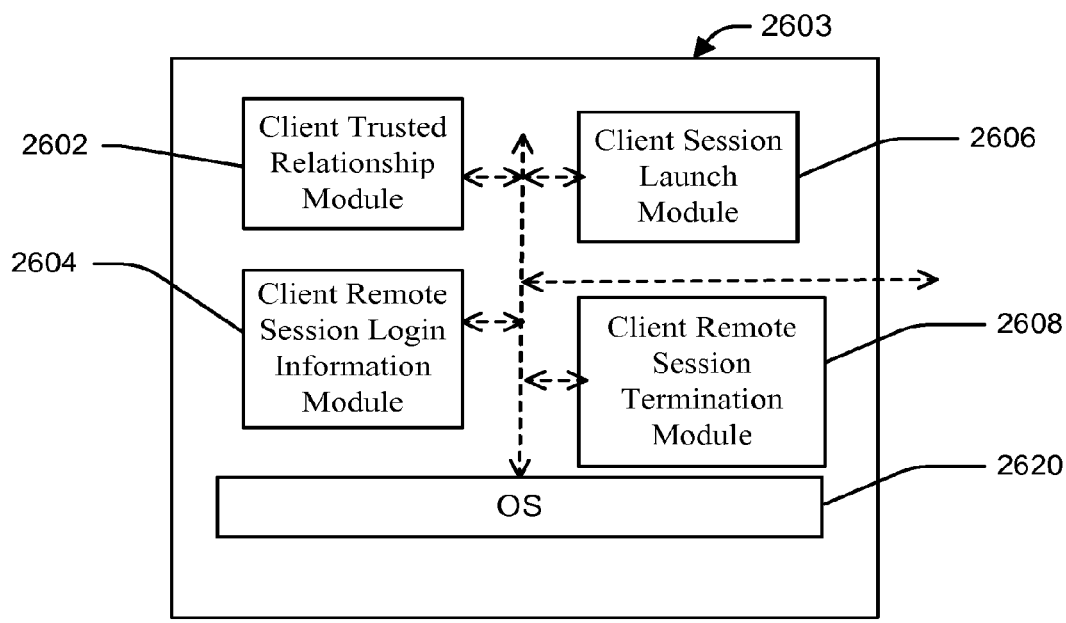
FIG. 26B is a conceptual block diagram that illustrates exemplary modules implemented at a client device in accordance with certain configurations of the present disclosure.

FIG. 26B illustrates a simplified block diagram of a configuration 2603 of a client device 2502 in accordance with certain embodiments of the present disclosure. The operating system (OS) 2620 is in communication with a client trusted relationship module 2602, a client remote session login information module 2604, a client session launch module 2606 and a client remote session termination module 2608. Features and functions of these modules according to certain embodiments of the present disclosure may be implemented in software, in hardware and/or in combination and are further described in the disclosure.

Figure 26C:
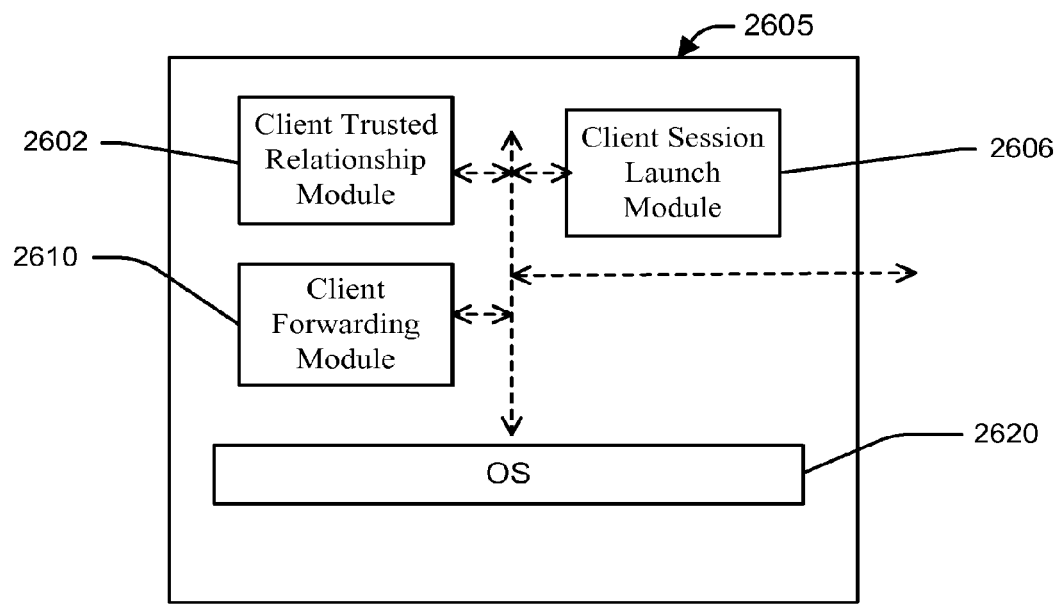
FIG. 26C is a conceptual block diagram that illustrates exemplary modules implemented at a client device in accordance with certain configurations of the present disclosure.

FIG. 26C illustrates a simplified block diagram of a configuration 2605 of a client device 2502 in accordance with certain embodiments of the present disclosure. The operating system (OS) 2620 is in communication with a client trusted relationship module 2602, a client forwarding module 2610 and a client session launch module 2606. Features and functions of these modules according to certain aspects of the present disclosure may be implemented in software, in hardware and/or in combination and are further described in the disclosure.

Figure 26D:
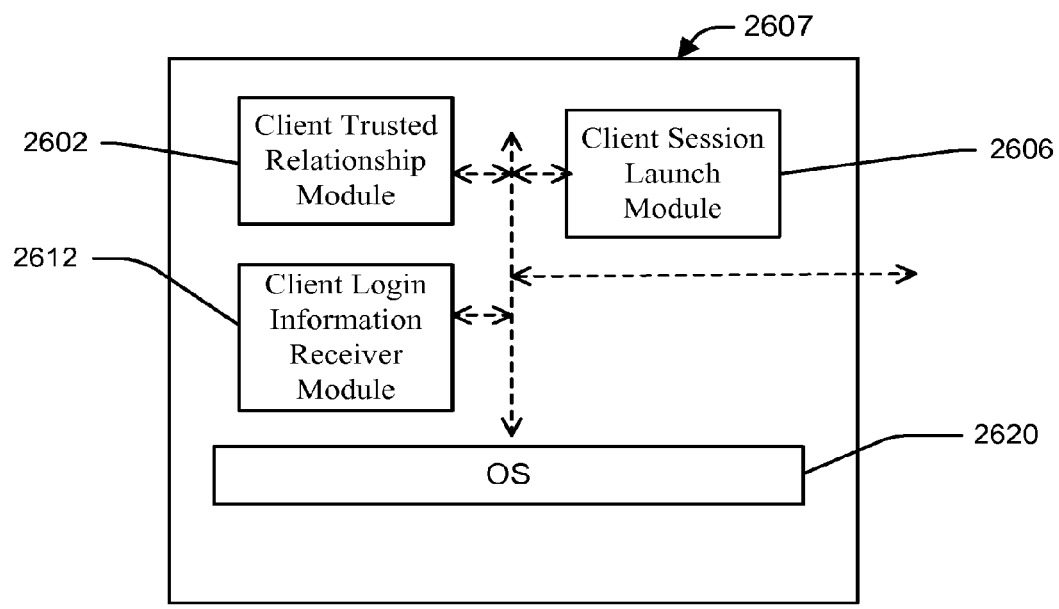
FIG. 26D is a conceptual block diagram that illustrates exemplary modules implemented at a client device in accordance with certain configurations of the present disclosure.

FIG. 26D illustrates a simplified block diagram of an embodiment 2607 of a client device 2502 in accordance with certain embodiments of the present disclosure. The operating system (OS) 2620 is in communication with a client trusted relationship module 2602, a client login credentials module 3212 and a client session launch module 2606. Features and functions of these modules according to certain embodiments of the present disclosure may be implemented in software, in hardware and/or in combination and are further described in the disclosure.

Figure 26E:
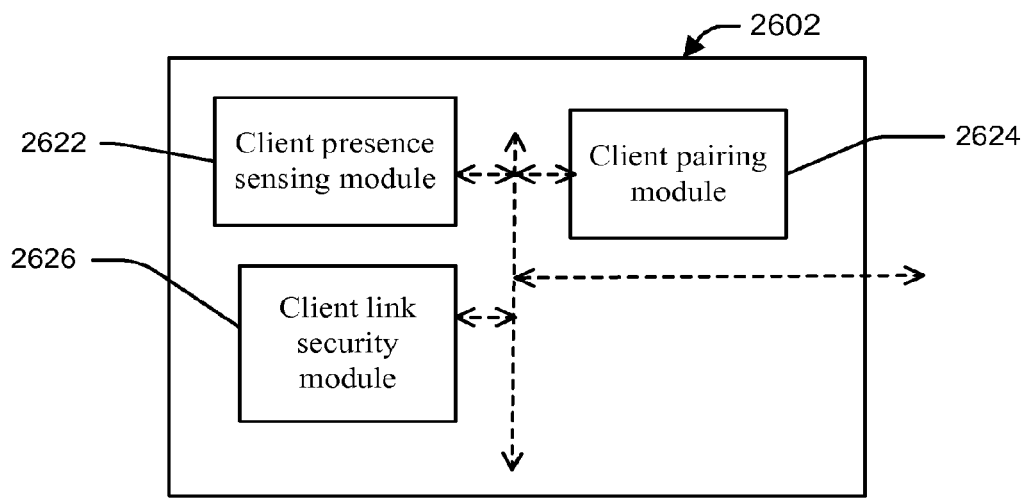
FIG. 26E is a conceptual block diagram that illustrates exemplary modules implemented at a client device in accordance with certain configurations of the present disclosure.

FIG. 26E illustrates a simplified block diagram of an embodiment of a client trusted relationship module 2602 in accordance with certain embodiments of the present disclosure. The illustrated configuration comprises a client trusted relationship module 2602, a client login credentials module 3212 and a client session launch module 2606. Features and functions of these modules according to certain embodiments of the present disclosure may be implemented in software, in hardware and/or in combination and are further described in the disclosure.

Figure 27A:
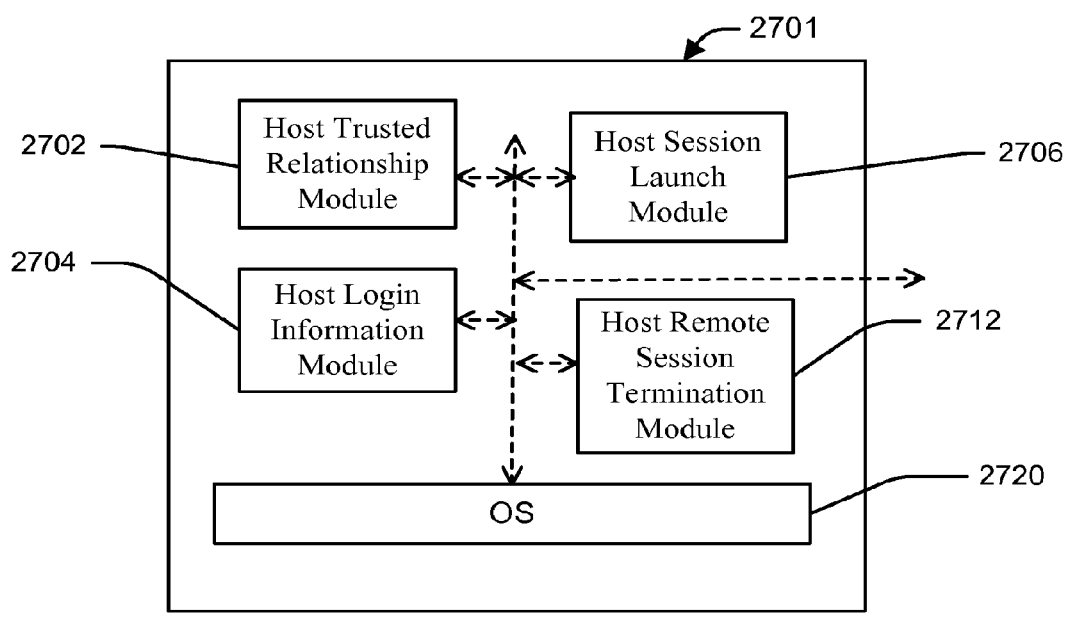
FIG. 27A is a conceptual block diagram that illustrates exemplary modules implemented at a host device in accordance with certain configurations of the present disclosure.

FIG. 27A illustrates a simplified block diagram of an embodiment 2701 of a host device 2506 in accordance with certain embodiments of the present disclosure. The operating system (OS) 2720 is in communication with a host trusted relationship module 2702, a host login information module 2704 and a host remote session module 2706. Features and functions of these modules according to certain embodiments of the present disclosure may be implemented in software, in hardware and/or in combination and are further described in the disclosure.

Figure 27B:
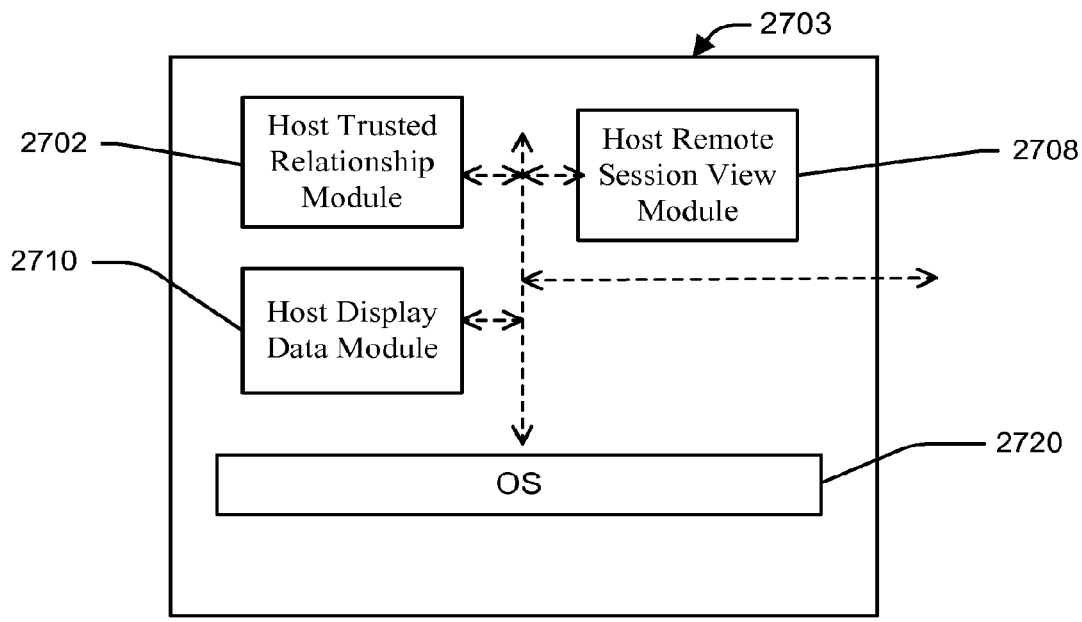
FIG. 27B is a conceptual block diagram that illustrates exemplary modules implemented at a host device in accordance with certain configurations of the present disclosure.

FIG. 27B illustrates a simplified block diagram of an embodiment 2703 of a host device 2506 in accordance with certain embodiments of the present disclosure. The operating system (OS) 2720 is in communication with a host trusted relationship module 2702, a host display data module 2710 and a host remote session view module 2706. Features and functions of these modules according to certain embodiments of the present disclosure may be implemented in software, in hardware and/or in combination and are further described in the disclosure.

Figure 27C:
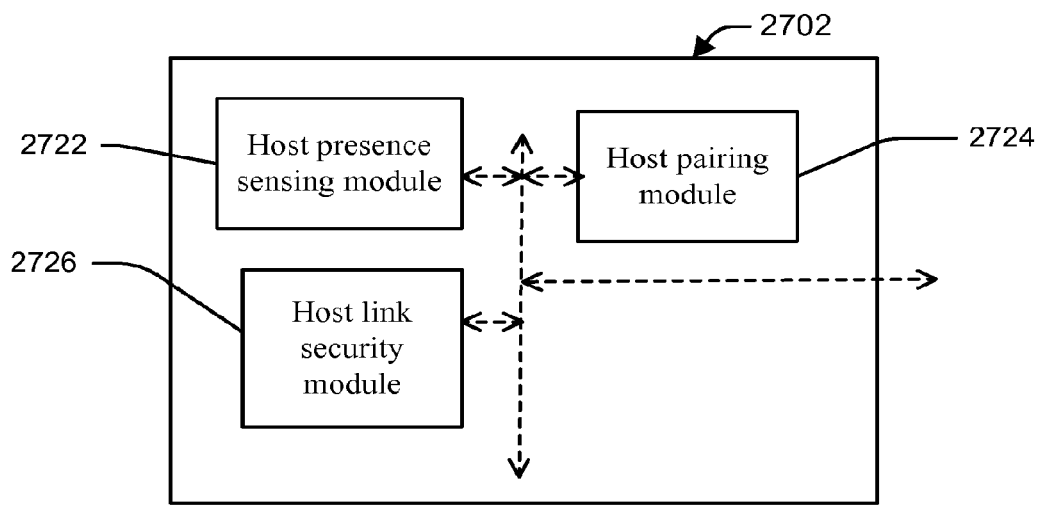
FIG. 27C is a conceptual block diagram that illustrates exemplary modules implemented at a host device in accordance with certain configurations of the present disclosure.

FIG. 27C illustrates a simplified block diagram of an embodiment 3305 of a host device 2506 in accordance with certain embodiments of the present disclosure. The operating system (OS) 2720 is in communication with a host trusted relationship module 2702, a host login information module 2704, a host remote session module 2706, and a host remote session termination module 2712. Features and functions of these modules according to certain embodiments of the present disclosure may be implemented in software, in hardware and/or in combination and are further described in the disclosure.

Figure 28:
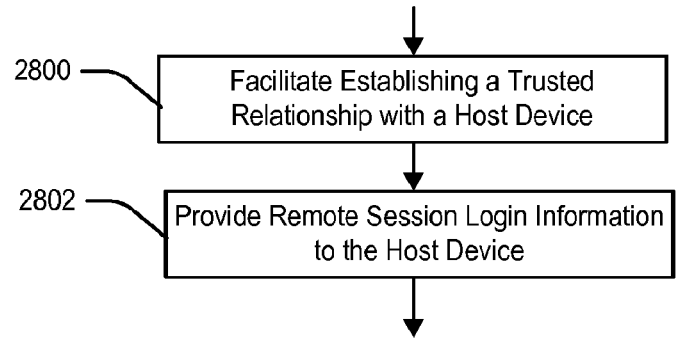
FIG. 28 is a flow chart illustrating an example of an operation of authenticating a host device for establishment of a remote session.

FIG. 28 shows an exemplary process implemented at a client device 2502. At operation 2800, the client trusted relationship module 2602 operating at a client device 2502 facilitates establishing a trusted relationship with a host device 2506. Upon establishment of a trusted relationship with a host device 2506, the client remote session login information module then, in operation 2802, provides remote session login information to the host device 2506. The remote session login information comprises information that would be used by the client device 2502 to establish a remote session with a remote server 2504. In one aspect, the remote session login information may contain an identity of the remote server 2504 such as a universal resource locater (URL) address or an internet protocol (IP) address. In another aspect, the remote session login information may comprise an identity of the user operating the client device 2502 and confidential information authenticating the user. The confidential information may be, for example, in the form of a password or a biometric signature of the user. The remote session login information may be encrypted or in the clear. When encrypted, the remote session login information may be encrypted such that the remote server 2504 may be able to decrypt and use it to establish a remote session, but the host device 2506 may not be able to decrypt the remote session login information. This may be achieved by, for example, encrypting the remote session login information using a public key of the remote server 2506 such that only the remote server 2506 that is in possession of the corresponding private key can decrypt a message encrypted using the public key. The remote session login information may also contain an identification of a remote session. Such identification may be used by the remote server 2504 to restore the state of a previously established remote session between the client device 2502. The remote session login information may also include information such as a client's custom session information such as size, color and font preference for the remote session graphical user interface (GUI).

Still referring to FIG. 28, in certain embodiments, the trusted relationship established at operation 2800 may be responsive to the type of physical layer connectivity between the client device 2502 with the host device 2506. For example, if the client device 2502 and the host device 2506 are coupled by a wired connection, such as a universal serial bus (USB) or a FireWire (IEEE-1394) connection, then the trusted relationship module 2602 may consider that a trusted relationship exists between the client device 2502 and the host device 2506. A practical reason for considering this to be a trusted relationship may be that because both USB and FireWire generally require a user to physically plug in the connection wire, the wired connection may indicate that a user is controlling both the client device 2502 and the host device 2506, thereby establishing the trusted relationship.

In certain configurations, the client trusted relationship module 2602 may, in addition to or in lieu of being responsive to the type of physical layer connectivity between the client device 2502 and the host device 2506, perform message exchanges with the host device 2506 to establish a trusted relationship with the host device 2506. By way of examples, such a need may arise when the communication between the client device 2502 and the host device 2506 may be accessible to other devices. The need to perform these message exchanges may arise for example, but not limited to, when the client device 2502 and the host device 2506 communicate via a wireless network (e.g., Bluetooth or 802.1 family of standards) or communicate on a shared wire (e.g., the Ethernet).

Accordingly, in certain configurations, the trusted relationship module 2602 may perform a digital handshake (e.g., paired message exchanges such as request/response or message/acknowledgement) with the host device 2506. For example, the client trusted relationship module 2602 may be configured to respond to a query message from the host device 2506. This query/response mechanism may be used by the client trusted relationship module 2602 to maintain the trusted relationship between the host device 2506 and the client device 2502. In one configuration, as illustrated in FIG. 26E, the client trusted relationship module 2602 may comprise a client presence sensing module 2622, a client pairing module 2624 and a client link security module 2626. The client presence sensing module 2622 may sense the presence of a host device 2506. In certain configurations, the client presence sensing module 2622 may achieve this by detecting physical connection of a cable at an input/output port of the client device 2502. The client presence sensing module 2622 may use any of several well-known techniques such as detecting impedance mismatch or signal detection. In certain configurations, the client presence sensing module 2622 may detect presence of a host device 2506 by transmitting a query message on the communication medium and listening for a response. In certain configurations, the client presence sensing module 2622 may detect presence of a host device 2506 by listening for a message transmission from the host device 2506.

In one aspect, the client presence sensing module 2622 may further estimate proximity of a host device 2506 to the client device 2502. In certain configurations, the client presence sensing module 2622 may determine the proximity responsive to a calculated a signal strength parameter. Accordingly, the client presence sensing module 2622 may estimate received signal strength of a transmission received from the host device 2506. In one aspect, the client presence sensing module 2622 may compare the calculated signal strength against a threshold value to make a determination of whether the hose device 2506 is in proximity of the client device 2502 or not. In certain configurations, the client presence sensing module 2622 may consider that a host device 2506 is in the proximity of the client device 2502 only if the received signal power from a host device 2506 is above the threshold value. In certain configurations, the client presence sensing module 2622 may compare the time difference between when a signal was sent and when a corresponding response was received to calculate a round trip delay time for communication with the host device 2506. In one aspect, the client presence sensing module may consider that a host device 2506 is in the proximity of the client device 2502 only if the round trip delay time is below a time threshold value.

The client pairing module 2624 facilitates performing message exchanges to pair of a client device 2502 with a host device 2506. In certain configuration, the client pairing module 2624 may check if the client device 2502 and the host device 2506 were connected to each other via a wired connection such as a USB connection and may deem the client device 2502 and the host device 2506 as being paired to each other. In certain configurations, the client pairing module 2624 may participate in a pairing operation involving exchange of messages facilitating encrypted communication between the client device 2502 and the host device 2506. As an example, when the short range network 2508 between the client device 2502 and the host device 2506 comprises a Bluetooth connection, the client pairing module 2624 may participate in a pairing operation wherein the client pairing module receives a challenge message from the host device 2506. The client pairing module 2624 decrypts the received challenge message using a locally stored private key and facilitates presenting the result of the decryption to a user on a display attached to the client device 2502. The user may then read the result and enter it on the host device 2506 to achieve pairing.

The client link security module 2626 may perform exchange of encryption information with the host device 2506 to further achieve secure communication. The exchange may include presenting a public key or digital certificate to the host device 2506, receiving, and validating a public key or a digital certificate from the host device 2506. After the exchange of encryption information, the client link security module 2626 may achieve link security by encrypting subsequent communication with the host device 2606. The client link security module 2626 may use a variety of well-known data encryption techniques, including, but not limited to, encryption using digital key based encryption and hashing.

Figure 29:
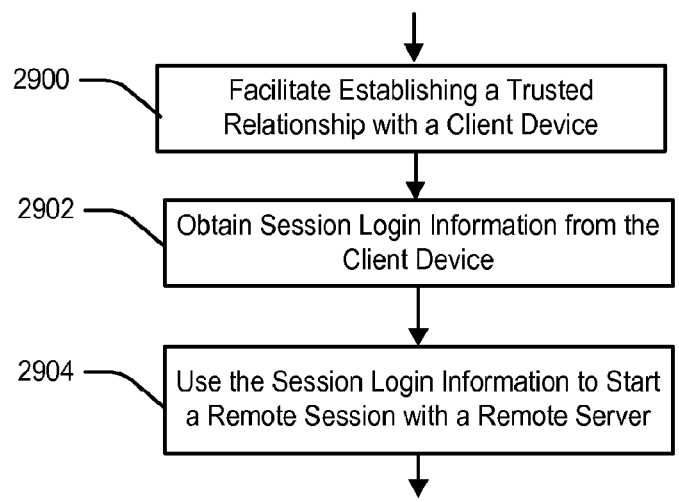
FIG. 29 is a flow chart illustrating an example of an operation of acquiring authentication from a client device and starting a remote session with a remote server.

FIG. 29 shows an exemplary process implemented at a host device 2506. In operation 2900, a host trusted relationship module 2702 establishes a trusted relationship with a client device 2502. In operation 2902, a host login information module 2704 obtains remote session login information from a client device 2502. In operation 2904, a host session launch module 2706 launches a remote session with a remote server 2504, using the remote session login information received from the client device 2502. In certain configurations, the host session launch module 2706 may launch a remote session automatically (i.e., without any user input). In certain configurations, the host session launch module 2706 may prompt a user to confirm launching a remote session.

Still referring to FIG. 29, in certain embodiments, the host trusted relationship established at operation 2900 may be responsive to the type of physical layer connectivity between the client device 2502 with the host device 2506. For example, if the client device 2502 and the host device 2506 are coupled by a wired connection, such as a universal serial bus (USB) or a FireWire (IEEE-1394) connection, then the host trusted relationship module 2702 may consider that a trusted relationship exists between the client device 2502 and the host device 2506. A practical reason for considering this to be a trusted relationship may be that because both USB and FireWire generally require a user to physically plug in the connection wire, the wired connection may indicate that a user is controlling both the client device 2502 and the host device 2506, thereby establishing the trust.

In certain configurations, the host trusted relationship module 2702 may, in addition to or in lieu of being responsive to the type of physical layer connectivity between the client device 2502 and the host device 2506, perform message exchanges with the client device 2502 to establish a trusted relationship with the client device 2502. By way of example, such a need may arise when the communication between the client device 2502 and the host device 2506 may be accessible to other devices. The need to perform these message exchanges may arise for example, but not limited to, when the client device 2502 and the host device 2506 communicate via a wireless network (e.g., Bluetooth or 802.1 family of standards) or communicate on a shared medium (e.g., the Ethernet) where other devices may be able to sense the signals communicating messages between the client device 2502 and the host device 2506.

Accordingly, in certain configurations, the host trusted relationship module 2702 may perform a digital handshake (e.g., paired message exchanges such as request/response or message/acknowledgement) with the client device 2502. In one configuration, as illustrated in FIG. 27C, the host trusted relationship module 2702 may comprise a host presence sensing module 2722, a host pairing module 2724 and a host link security module 2726. The host presence sensing module 2722 may sense the presence of a client device 2502. In certain configurations, the host presence sensing module 2722 may achieve this by detecting physical connection of a cable at an input/output port of the host device 2506. The host presence sensing module 2722 may use any of several well-known techniques such as detecting impedance mismatch or signal detection. In certain configurations, the host presence sensing module 2722 may detect the presence of a client device 2502 by transmitting a query message on the communication medium and listening for a response. In certain configurations, the host presence sensing module 2722 may detect presence of a client device 2502 by listening for a message transmission from the client device 2502.

In one aspect, the host presence sensing module 2722 may further estimate proximity of a client device 2502 to the host device 2506. In certain configurations, the host presence sensing module 2722 may determine the proximity responsive to a calculated signal strength parameter based on the signal power received from the client device 2502. In one aspect, the host presence sensing module 2722 may compare the calculated signal strength against a threshold value to make a determination of whether the client device 2502 is in proximity of the host device 2506. In certain configurations, the host presence sensing module 2722 may consider that a client device 2502 is in the proximity of the host device 2506 only if the received signal power from the client device 2502 is above the threshold value. In certain configurations, the host presence sensing module 2722 may compare the time difference between when a signal was sent and when a corresponding response was received to calculate a round trip delay time for communication with the client device 2502. In one aspect, the host presence sensing module may consider that a client device 2502 is in the proximity of the host device 2506 only if the round trip delay time is below a time threshold value.

The host pairing module 2724 facilitates pairing of a client device 2502 with a host device 2506. In certain configuration, the host pairing module 2724 may check if the client device 2502 and the host device 2506 were connected to each other via a wired connection such as a USB connection and may consider the client device 2502 and the host device 2506 as being paired to each other if they were connected via a wired connection. In certain configurations, the host pairing module 2724 may participate in a pairing operation involving exchange of messages facilitating encrypted communication between the client device 2502 and the host device 2506. As an example, when the short range network 2508 between the client device 2502 and the host device 2506 comprises a Bluetooth connection, the host pairing module 2724 may participate in a pairing operation wherein the host pairing module 2724 generates a challenge message and sends the challenge message to a client device 2502. The client device 2502 may display a decrypted version of the challenge message to a user on a display attached to the client device 2502. The user may then read the result and enter the result on the host device 2506. When a user enters the result, the host pairing module 2724 then verifies if the entered result matches the seed used to generate the challenge message, and if there is a match, the host pairing module 2724 may then indicate that the host and client devices 2506, 2502 were paired. Once the host device 2506 and the client device 2502 are thus paired, the host device then may allow further communication with the client device.

The host link security module 2726 may perform exchange encryption information with the client device 2502 to further achieve a secure communication link by encrypting communication to the client device 2602. The host link security module 2726 may use a variety of well-known data encryption techniques, including, but not limited to, encryption using digital key based encryption and hashing.

Figure 30:
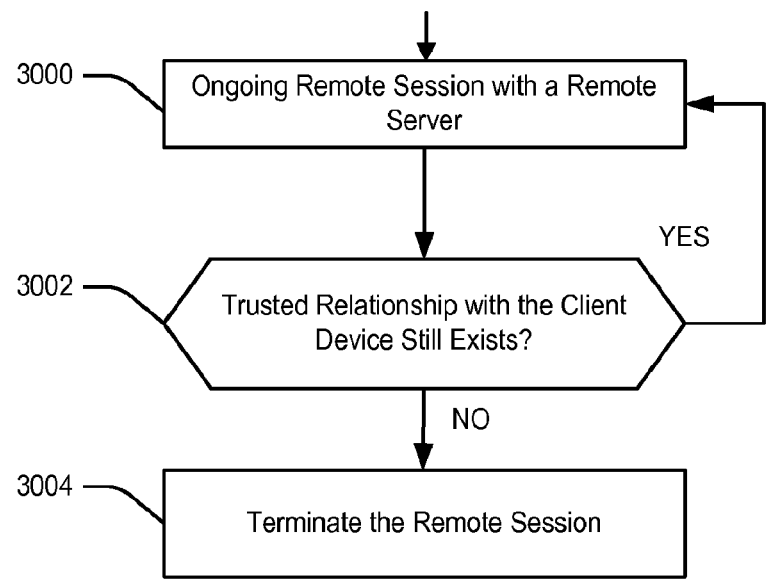
FIG. 30 is a flow chart illustrating an example of an operation of sustaining a remote session with a remote server.

FIG. 30 shows an exemplary process implemented at a host device 2506. After a host session launch module 2706 establishes a remote session with a remote server 2504, using the remote session login information received from a client device 2502, during the operation 3000 of the remote session, the host trusted relationship module may 2702 monitor, at operation 3002, if the trusted relationship still exits with the client device 2502 from whom the remote session login information was received. The host trusted relationship module 2502 allows the remote session to continue if a trusted relationship exits ("YES" branch of operation 3002). If the host trusted relationship module 2702 determines that trusted relationship with the client device 2502 does not exist ("NO" branch of operation 3002), then the host trusted relationship module 2702 may signal the host remote session termination module 2712 to facilitate termination of the remote session with the remote server 2504.

Figure 31:
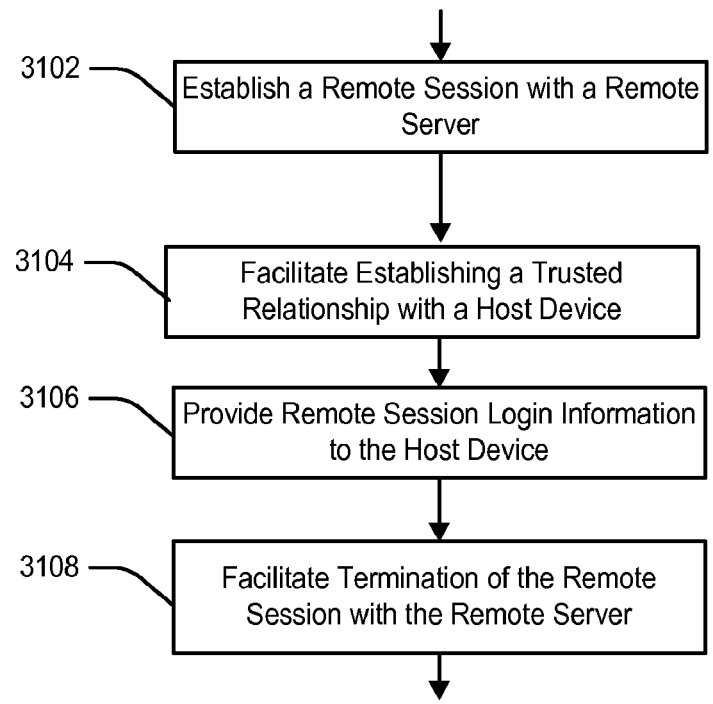
FIG. 31 is a flow chart illustrating an example of an operation of hand-off of a remote session to a host device.

FIG. 31 shows an exemplary process implemented at a client device 2502. In operation 3102, a client session launch module 2606 establishes a remote session with a remote server 2504. During the life time of the remote session, the client trusted relationship module 2602 may establish, at operation 3104, a trusted relationship with a host device 2506. After a trusted relationship is thus established, the client remote session login information module 2604, at operation 3106, provides remote session login information to the host device 2506. At operation 3108, the client session termination module terminates the remote session between the client device 2502 and the remote server 2504. In certain configurations, the client session termination module 2608 may perform operation 3108 without receiving any indication from the host device 2506 regarding whether the host device 2506 launched a remote session with the remote server, based on the remote session login information received. In another configurations, the client session termination module 2608 may perform operation 3108 after receiving an indication that the host device 2506 successfully started a remote session with the remote server 2504 based on the remote session login information received from the client device 2502.

Figure 32:
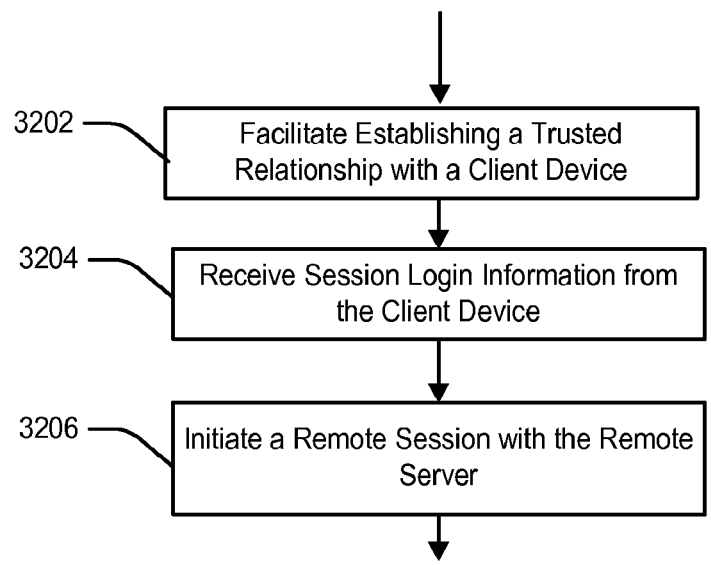
FIG. 32 is a flow chart illustrating an example of an operation of accepting a hand-off of a remote session from a client device.

FIG. 32 shows an exemplary process implemented at a host device 2506. In operation 3202, the host trusted relationship module 2702 may establish a trusted relationship with a client device 2504. The host device 2506 may perform operation 3202 substantially identically to operation 2900 described above. In operation 3204, the host login information module 2704 receives remote session login information from the client device 2504. The remote session login information may be substantially identical to the description provided above with relation to operation 2902. In operation 3206, the host session launch module 2706 may launch a remote session with the remote server 2504 using the received remote session login information. The host session launch module 2706 may implement operation 3806 substantially identical to operation 2904 described above.

Figure 33:
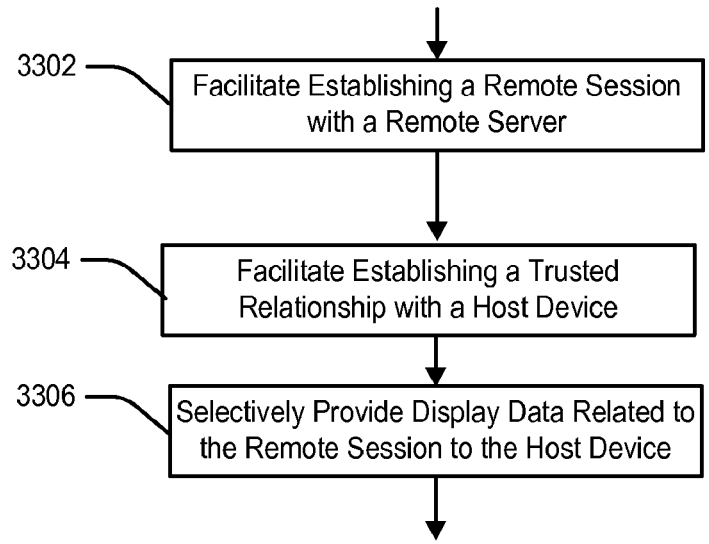
FIG. 33 is a flow chart illustrating an example of an operation of forwarding display data for a remote session to a host device.

FIG. 33 shows an exemplary process implemented at a client device 2502. In operation 3302, a client session launch module 2606 establishes a remote session with a remote server 2504. The client session launch module 2606 may perform operation 3302 substantially identical to operation 3102 described above. During the life time of the remote session, the client trusted relationship module 2602 may establish, at operation 3904, a trusted relationship with a host device 2506. The client trusted relationship module 2602 may implement operation 3304 substantially identical to operation 2800 described above. After a trusted relationship is thus established, the client forwarding module 2610, at operation 3306, selectively provides session display data for the session with the remote server 2504 to the host device 2506.

In one configuration, the client device 2502 may be configured to display a composite view of the remote session on the client device 2502. The composite view may include (a) a local graphical user information (GUI), displaying, for example, toolbars and headers, and (b) a remote application view, presenting, for example, information received from the remote server 2504 in the form of display data. In one configuration, the client forwarding module 2610 may filter out data related to local GUI and selectively forward the display data related to the remote session to the host device 2506 and display the local GUI on the client device 2502. In such configurations, a user may be able to control a remote session by interacting with local GUI controls from the client device 2502, and be able to display the remote application view on the host device's display. In another configuration, the client forwarding module 2610 may forward all information received from the remote server 2504, thereby providing a host computer 2506 with sufficient information to be able to display both the local GUI information and remote application view. In other configurations, the client forwarding module 2610 may be configured to send a subset of the received remote session information (e.g., only audio or only video information).

Figure 34:
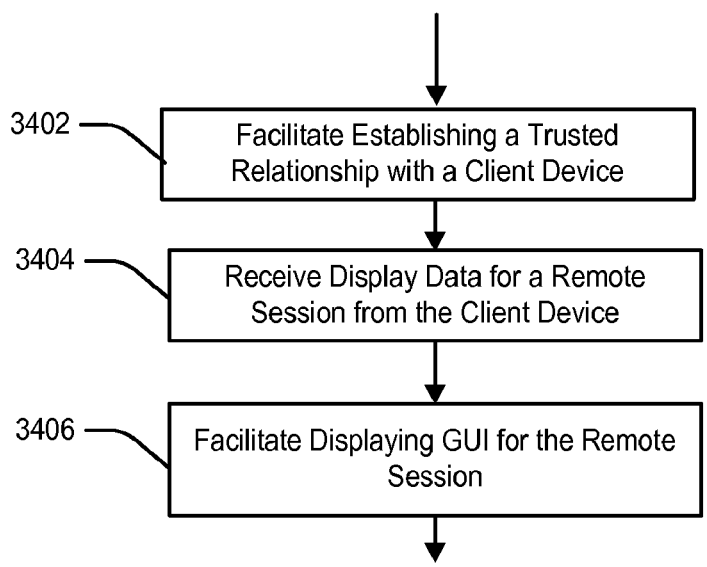
FIG. 34 is a flow chart illustrating an example of an operation of accepting forwarded display data for a remote session from a client device.

FIG. 34 shows an exemplary process implemented at a host device 2506. In operation 3402, the host trusted relationship module 2702 may establish a trusted relationship with a client device 2504. The host device 2506 may perform operation 3402 substantially identically to operation 2900 described above. In operation 4004, the host display data module 2710 receives display data information related to a remote session from the client device 2504. The display data information may comprise protocol commands for displaying on a monitor. For example, the display data information may include data in a remote desktop protocol (RDP) format. In operation 3406, the host remote session view module 2706 displays, in the form of a remote application view, the received display data on a local monitor. In certain configurations, the remote application view may include GUI control objects (e.g., toolbar and other menu items) for the application being run remotely at the remote server 2504. In such configurations, the host remote session view module 2706 may communicate any GUI events by a user of the host device 2506. For example, in one aspect, if a user scrolls the application GUI being displayed at the host device 2506, the host remote session view module may convey the corresponding control information to the client device 2502. In certain configurations, while the host device 2506 is able to display remote application view for an application running on a remote server 2504, the host device 2506 may not be directly able to communicate with the remote server 2504 regarding the remote session because the host device 2506 may not have information regarding identity of the remote server 2504 hosting the remote application. Therefore, in one aspect, the host device 2506 acts as a display device for the remotely running application, while the client device 2502 is used to remotely control the application running on the remote server 2504.

Figure 35:
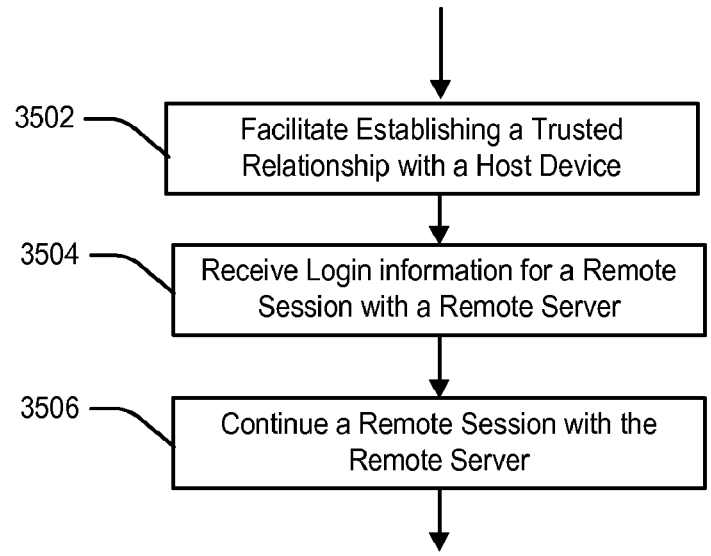
FIG. 35 is a flow chart illustrating an example of an operation of accepting a hand-off of a remote session from a host device.

FIG. 35 shows an exemplary process implemented at a client device 2502. In operation 3502, the client trusted relationship module 2602 establishes a trusted relationship with a host device 2506. The client trusted relationship module 2602 may implement operation 4102 substantially identical to the operation 2800 described above. After a trusted relationship is thus established, the client login information receiver module 2712 may receive, in operation 3504, remote session login information from the host device 2506. The remote session login information may be substantially as described with respect to operation 2802 above. The client session launch module 2606 may use the received remote session login information to facilitate launching a remote session, in operation 3506, with the remote server 2504 identified in the remote session login information. In certain configurations, the remote server 2504 may be configured to save a state of the remote session, and the user experience for operation 3506 may be that the user is continuing a previous remote session with the remote server 2504 from the client device 2502.

Figure 36:
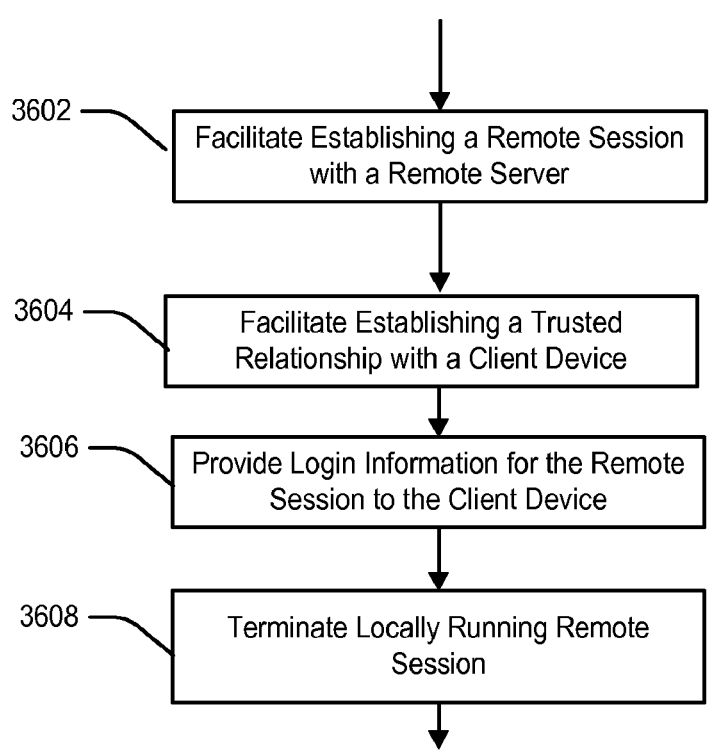
FIG. 36 is a flow chart illustrating an example of an operation of hand-off of a remote session to a client device.

FIG. 36 shows an exemplary process implemented at a host device 2506. In operation 3602, the host session launch module 2706 establishes a remote session with a remote server 2504. During the life time of the remote session, in operation 3604, the host trusted relationship module 2702 may establish a trusted relationship with a client device 2504. The host device 2506 may perform operation 3604 substantially identically to operation 2900 described above. In operation 3606, the host login information module 2704 may provide remote session login information for the remote session to the client device 2502. The remote session login information may be substantially as described with respect to operation 3204. In operation 3608, the host remote session termination module may then terminate the remote session with the remote server 2504. In certain configuration, the host remote session termination module may terminate the remote session after receiving an indication from the client device 2502 that the remote session was continued from the client device 2502 (e.g., as in operation 3606 described above). In other configurations, the termination operation 3608 may occur without an indication from the client device 2502.

Figure 37:
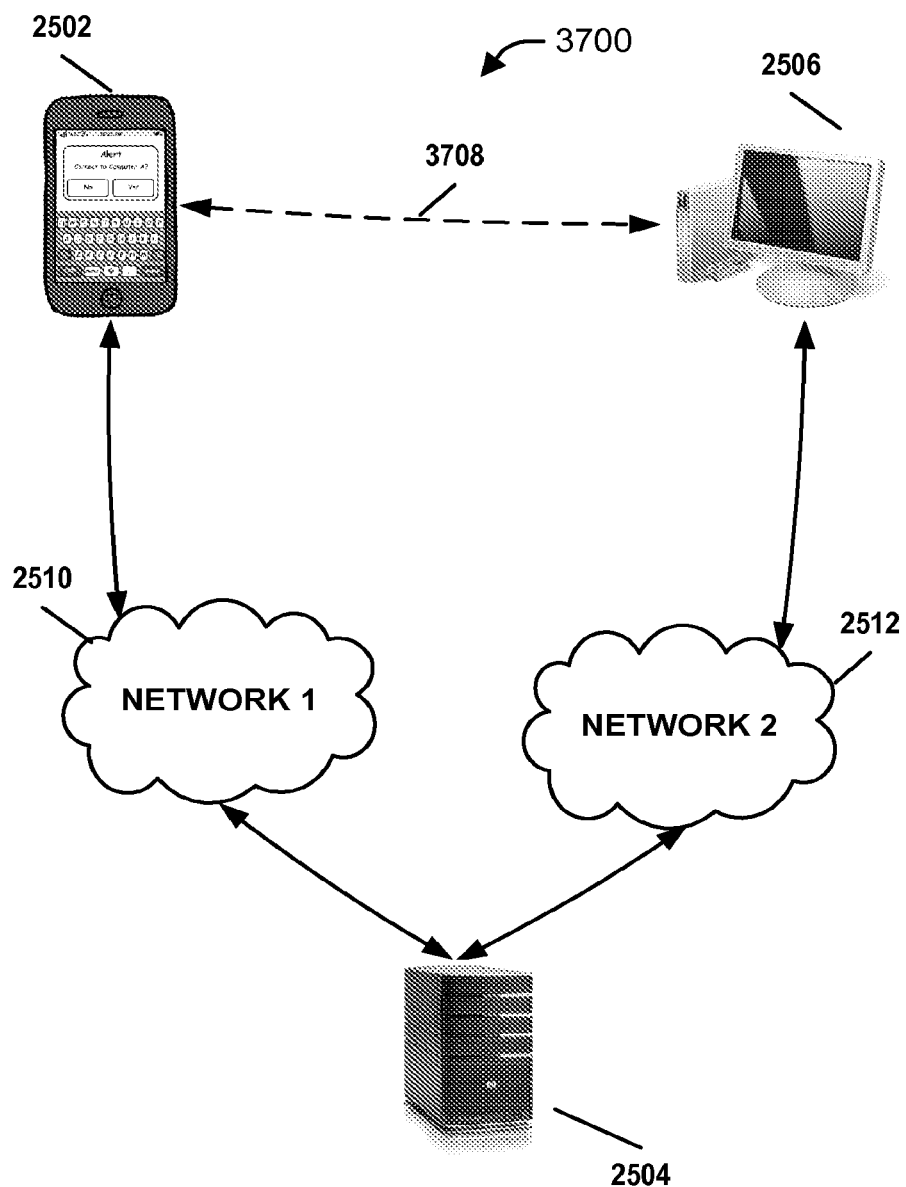
FIG. 37 is a block diagram of a communication network in accordance with certain embodiments of the present disclosure.

Referring to FIG. 37, exemplary aspects of the present disclosure are now provided below for a system 3700 wherein the client device 2502 is a Bluetooth-capable mobile phone, the remote server 2504 is an application server (e.g., a web server or a corporate application server), and the host device 2506 is a thin client device. The first network 2510 is a data network comprising cellular telephone network. The second network 2512 is the Internet. The short range network 3708 comprises the Bluetooth protocol. It will be understood by those skilled in the art that while the messages exchanged among entities in system 3700 are represented as single arrows between the entities, the arrows may represent one or more actual signal transmissions, and there may be other messages communicated between the entities performing other tasks during this time.

Example of Use Case A

Figure 38:
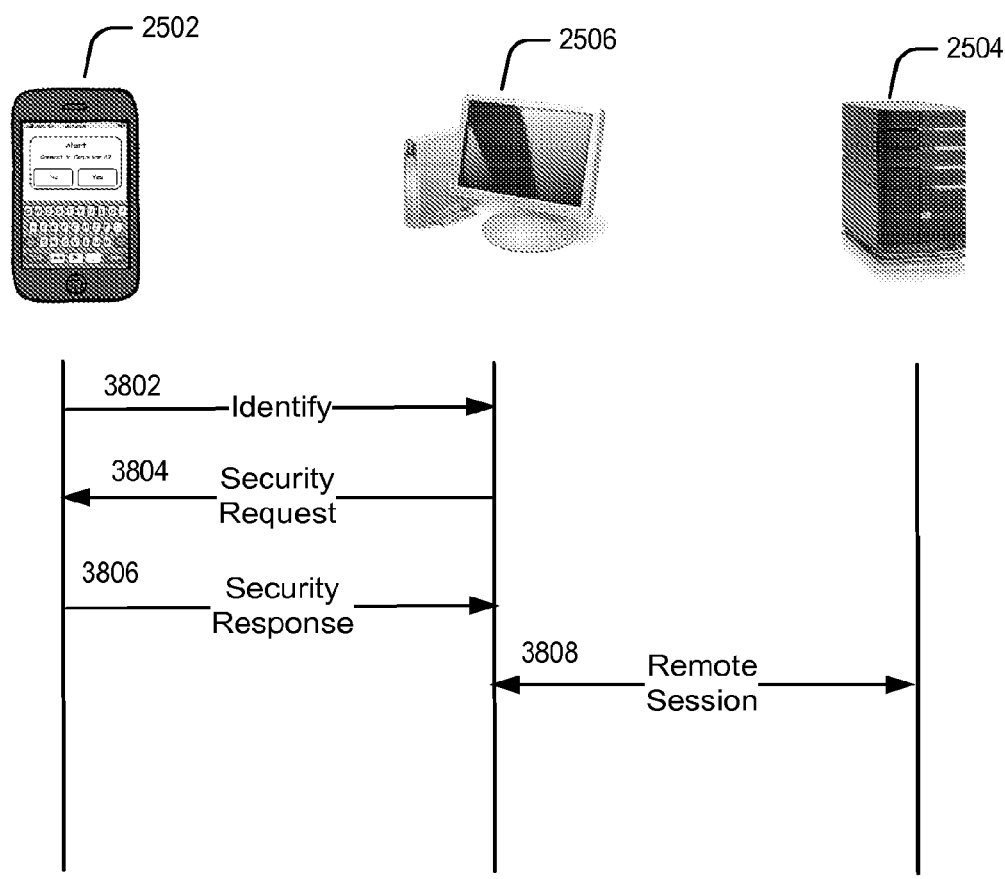
FIG. 38 is a message exchange diagram illustrating exemplary messages exchanged in authenticating a remote session.

FIG. 38 illustrates exemplary messages exchanged for a use case in which a host device 2506 establishes a remote session with a remote server 2504 using login information received from a client device 2502.

A message 3802 is from the client device 2502 to the host device 2506 via the network 3708 to authentication the user via a Bluetooth connection:

When the user carrying the client device 2502 is nearby the host device 2506, the two devices 2502, 2504 are paired (e.g., as described above in with respect to operation 2900). In message 3802, the client device 2502 identifies the user operating the client device 2502 to the host device 2506.

The host device 2506 then finds the user name login of the user identified by the client device 2502 in message 3802 and presents a login prompt to the user on the host device's display.

After the user successfully logs in the host device 2506, the host device 2506 then sends, in a security request message 3804, a code to the client device 2502, which can only be decrypted via the private key that is installed on the client device 2502.

The client device 2502 then displays the code on its screen and the user enters the code in the host device 2506 (security response 3806) and authentication occurs and the user logs in. The host device 2506 establishes a remote session 3808 with the remote server 2504.

The user has the option to terminate the remote session anytime from the client device 2502 (e.g., by ending the trusted relationship, as described in operation 3002) or the host device 2506 directly (e.g., by ending the remote session via GUI).

If the user walks away, then the remote session automatically is disconnected due to detection of lack of the presence of the client device 2502 (e.g., loss of proximity, as described with respect to operation 3002).

Example of Use Case B

Figure 39:
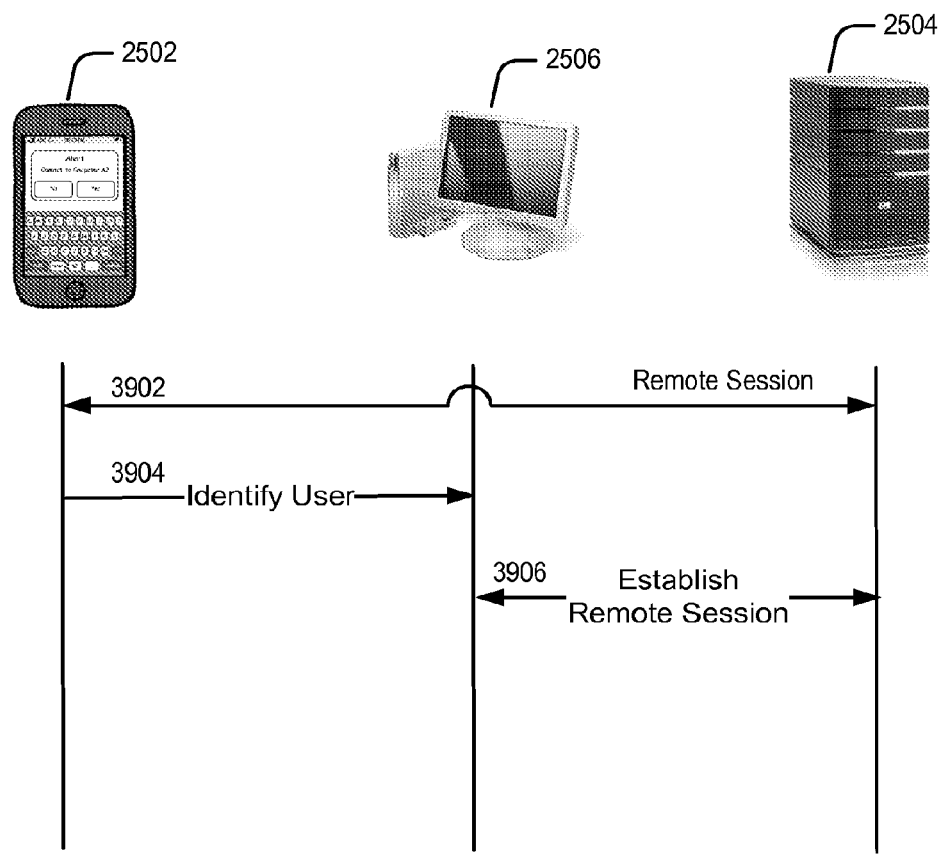
FIG. 39 is a message exchange diagram illustrating exemplary messages exchanged in operation of hand-off of a remote session to a host device.

FIG. 39 illustrates exemplary messages exchanged in which a user is able to forward a live remote session from the client device 2502 to the host device 2506 (passing on credentials) via the connection:

Message 3902 represents that the user has already started a remote session between the client device 2502 and the remote server 2504. In this example, the remote server 2504 executes (or runs) one or more applications during the remote session, and the client device 2502 does not execute the one or more applications.

When the user is close to the host device 2506, the client device 2502 identifies the user and forwards login information to the host device 2504, in message 3904, without any further interaction with the computer.

Using the login information received in message 3904, the host device 2506 creates a new remote session (message 3906) with the remote server 2504.

Example of Use Case C

Figure 40:
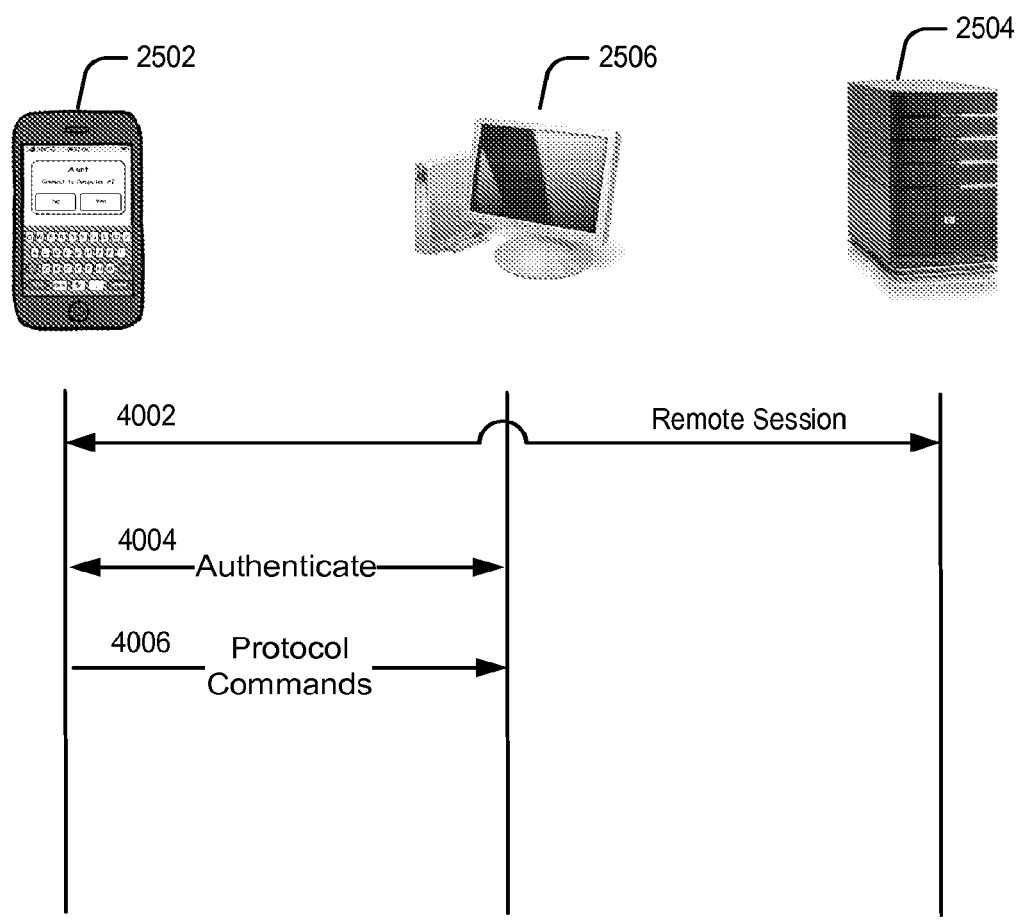
FIG. 40 is a message exchange diagram illustrating exemplary messages exchanged in displaying a remote session on a host device.

FIG. 40 illustrates exemplary messages exchanged when a user forwards a live remote session from the client device 2502 to the host device 2506 by passing on display data via the Bluetooth connection.

Message 4002 indicates that the user has already started a remote session between the client device 2502 and the remote server 2504 where applications are executed.

When the user is close to the host device 2506, the client device 2502 identifies the user and forwards login information to the host device 2504, in message 4004, without any further interaction with the computer.

The host device 2506 starts decoding the received display data (e.g., protocol commands when the remote session is implemented using the remote desktop protocol), indicated as message 4006, and starts displaying the results on the host device's display.

It will be appreciated by those skilled in the art that, in the illustrated example, the client device 2502 is the broker in between the host device 2506 and the remote server 2504 and essentially never passes on the user login information to the host device 2506 and functions as the gateway between the remote server 2504 and the host device 2506.

Example of Use Case D

Figure 41:
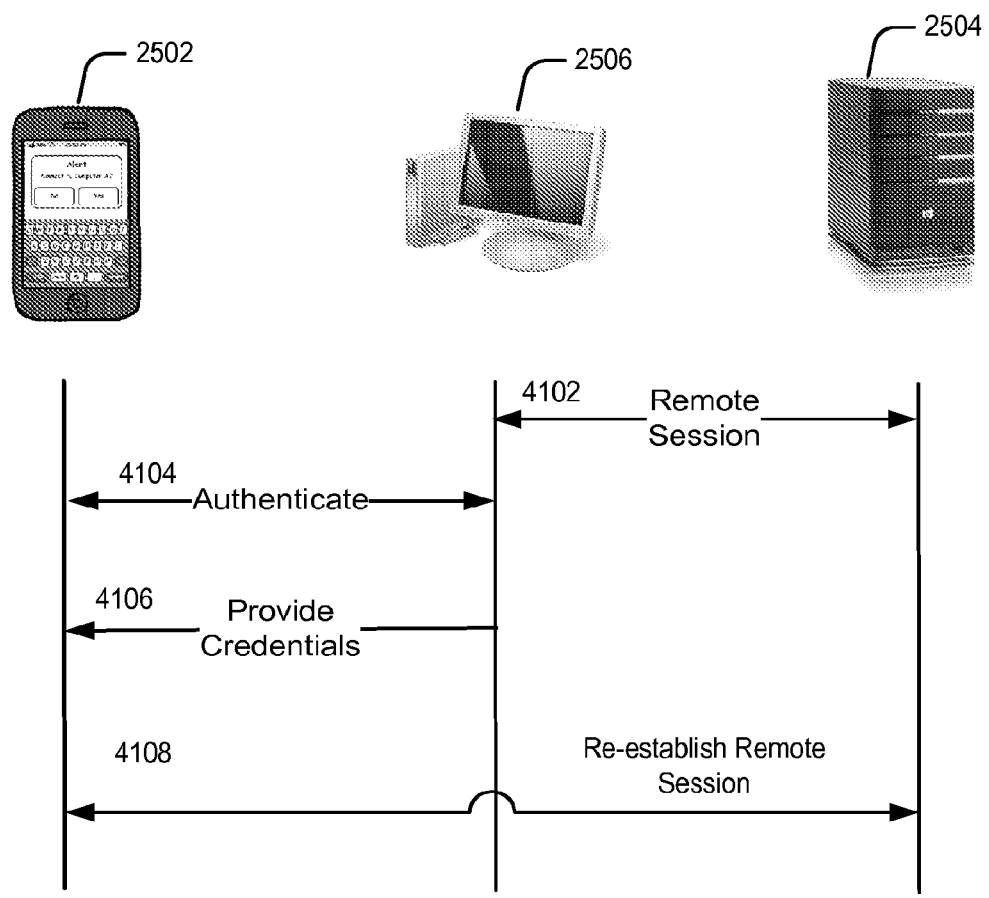
FIG. 41 is a message exchange diagram illustrating exemplary messages exchanged in operation of hand-off of a remote session to a client device.
Figure 42:
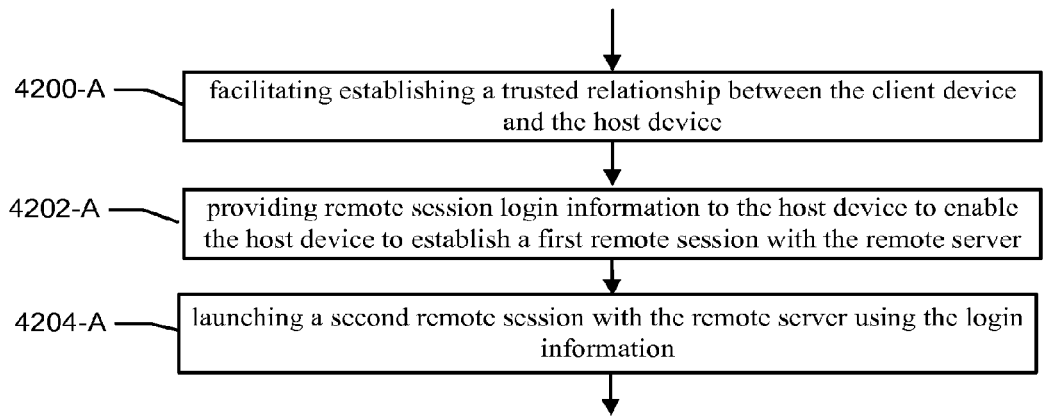
FIG. 42 illustrates an example of an operation of an apparatus according to one aspect of the present disclosure.
Figure 43:
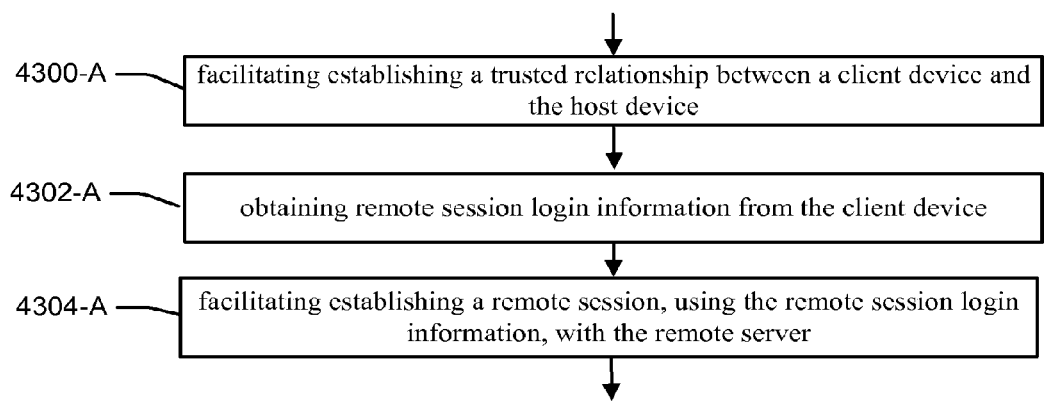
FIG. 43 illustrates an example of an operation of an apparatus according to one aspect of the present disclosure.
Figure 44:
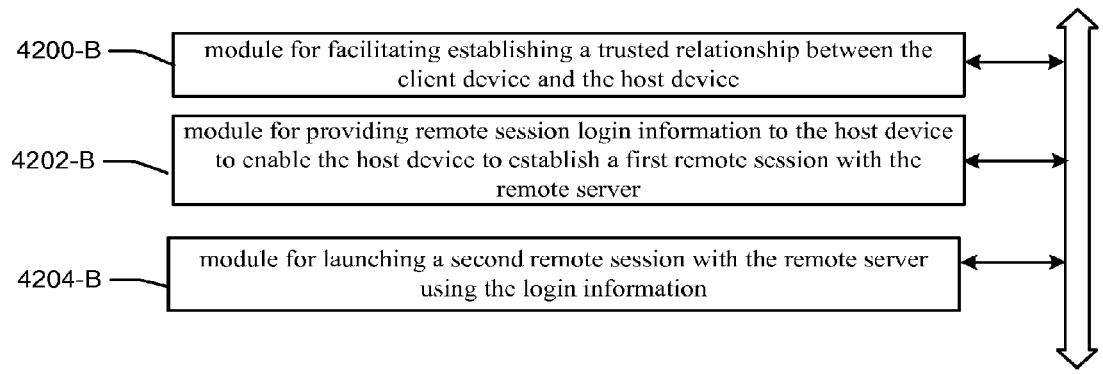
FIG. 44 illustrates an example of a configuration of an apparatus according to one aspect of the present disclosure.
Figure 45:
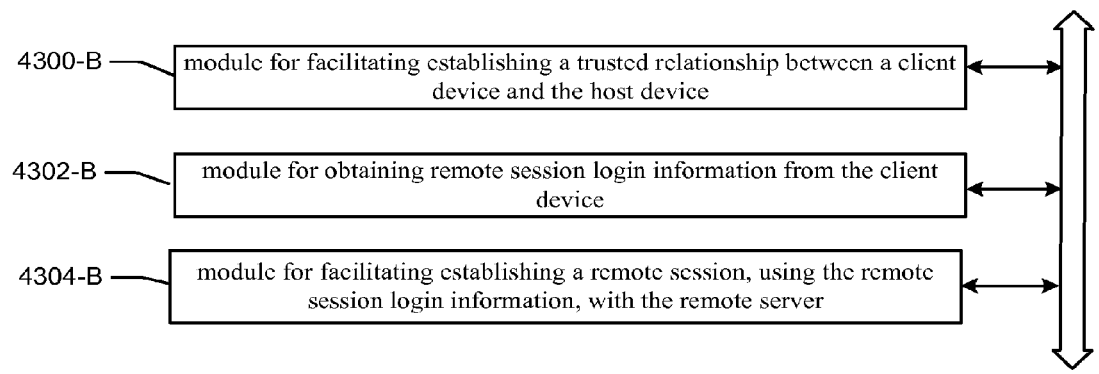
FIG. 45 illustrates an example of a configuration of an apparatus according to one aspect of the present disclosure.
Figure 46:
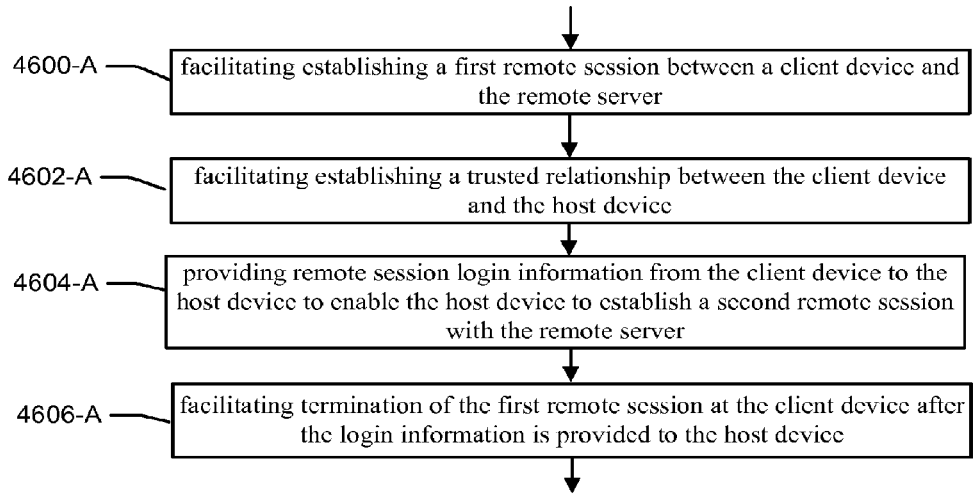
FIG. 46 illustrates an example of an operation of an apparatus according to one aspect of the present disclosure.
Figure 47:
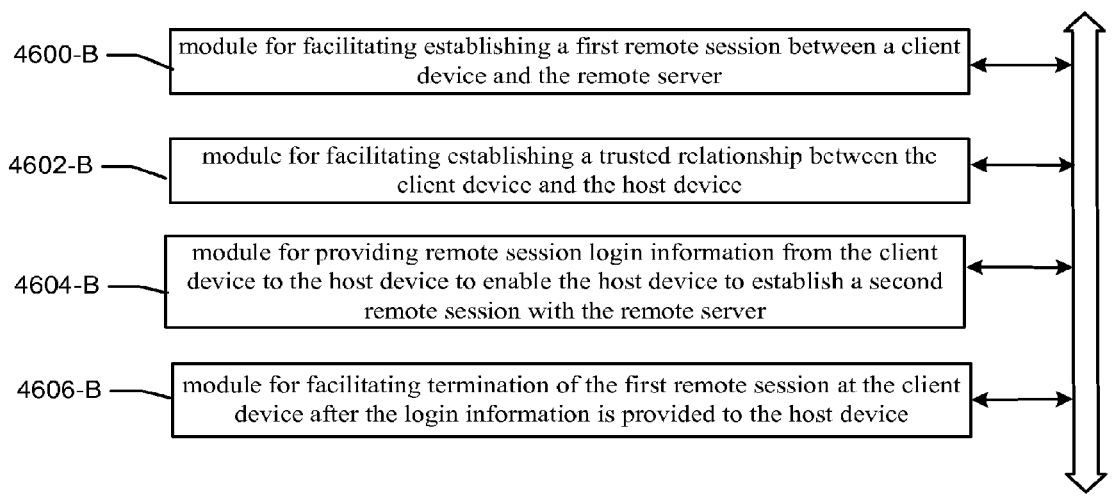
FIG. 47 illustrates an example of a configuration of an apparatus according to one aspect of the present disclosure.
Figure 48:
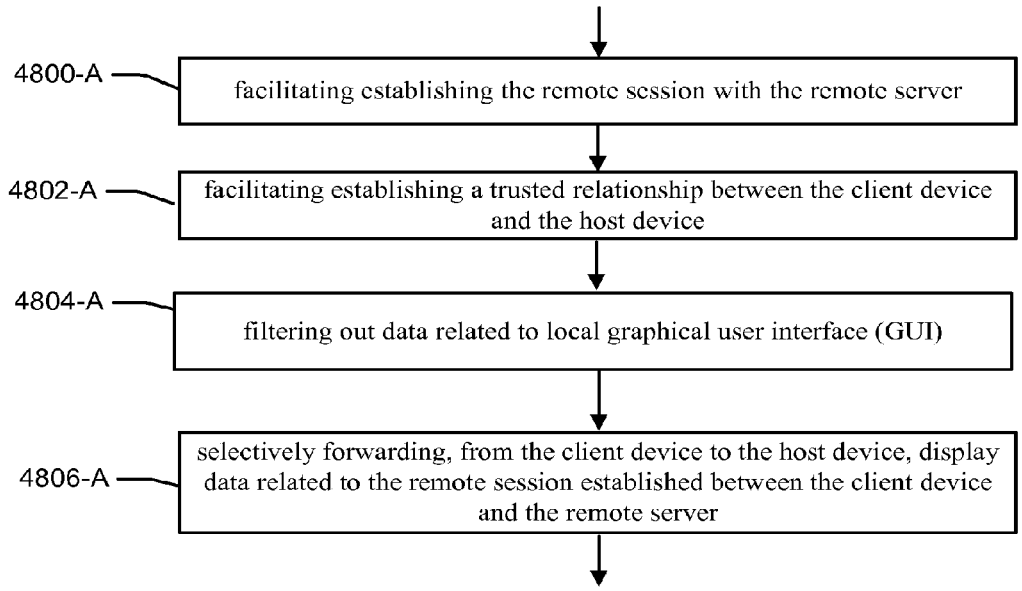
FIG. 48 illustrates an example of an operation of an apparatus according to one aspect of the present disclosure.
Figure 49:
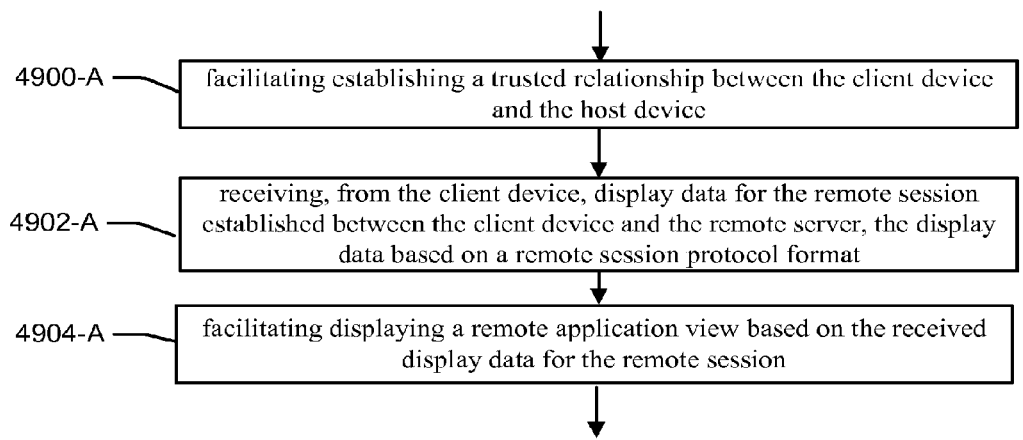
FIG. 49 illustrates an example of an operation of an apparatus according to one aspect of the present disclosure.
Figure 50:
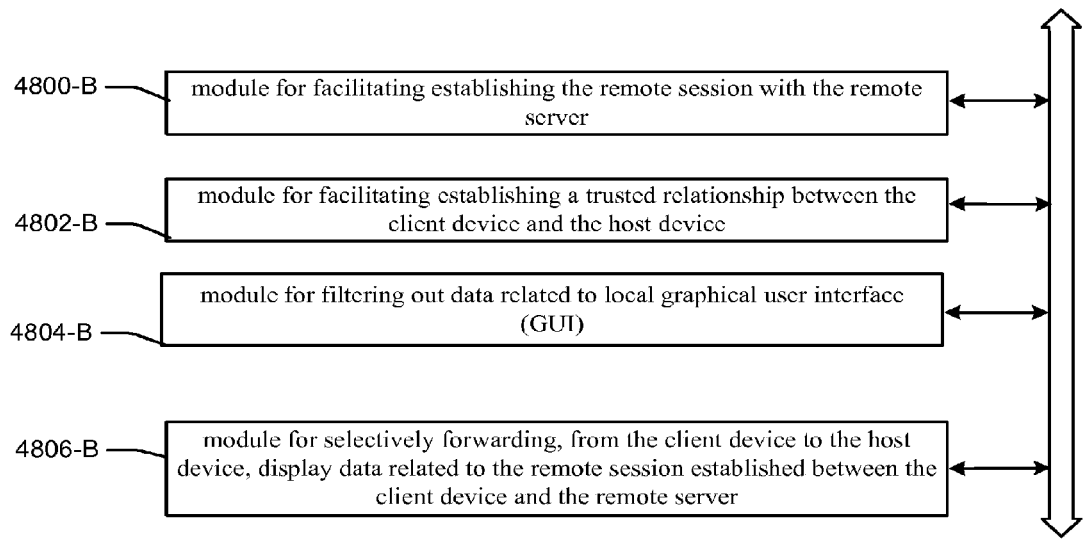
FIG. 50 illustrates an example of a configuration of an apparatus according to one aspect of the present disclosure.
Figure 51:
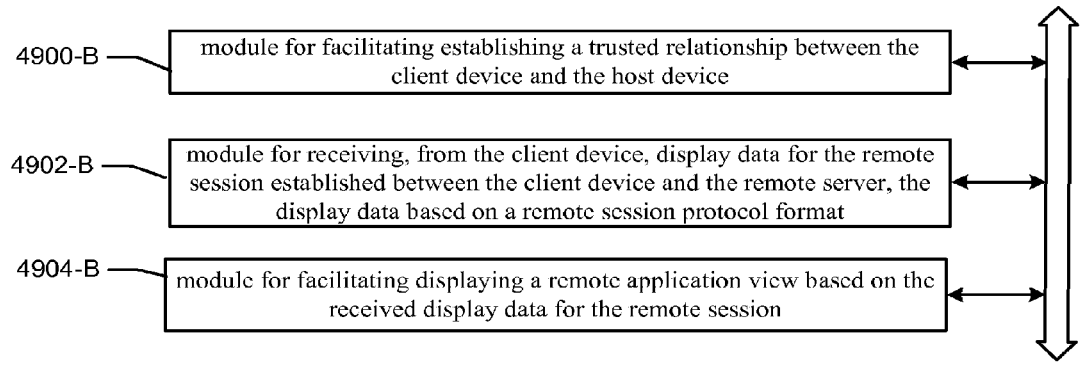
FIG. 51 illustrates an example of a configuration of an apparatus according to one aspect of the present disclosure.
Figure 52:
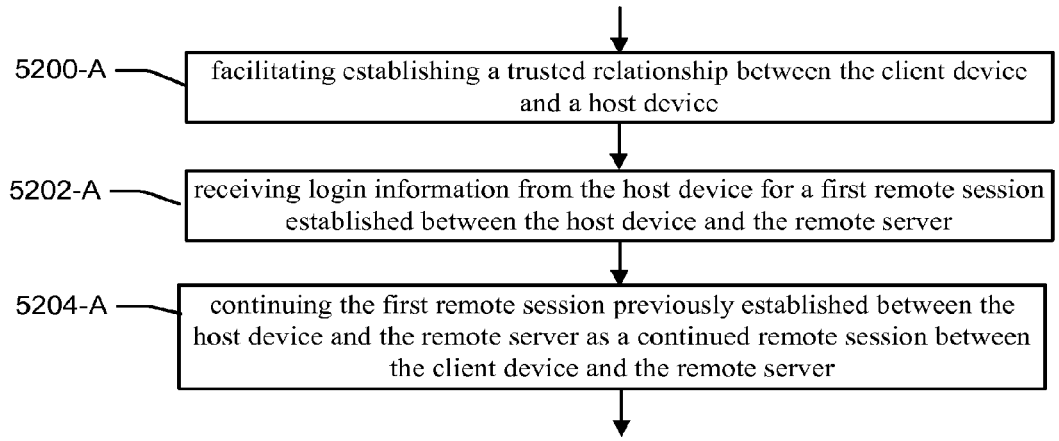
FIG. 52 illustrates an example of an operation of an apparatus according to one aspect of the present disclosure.
Figure 53:
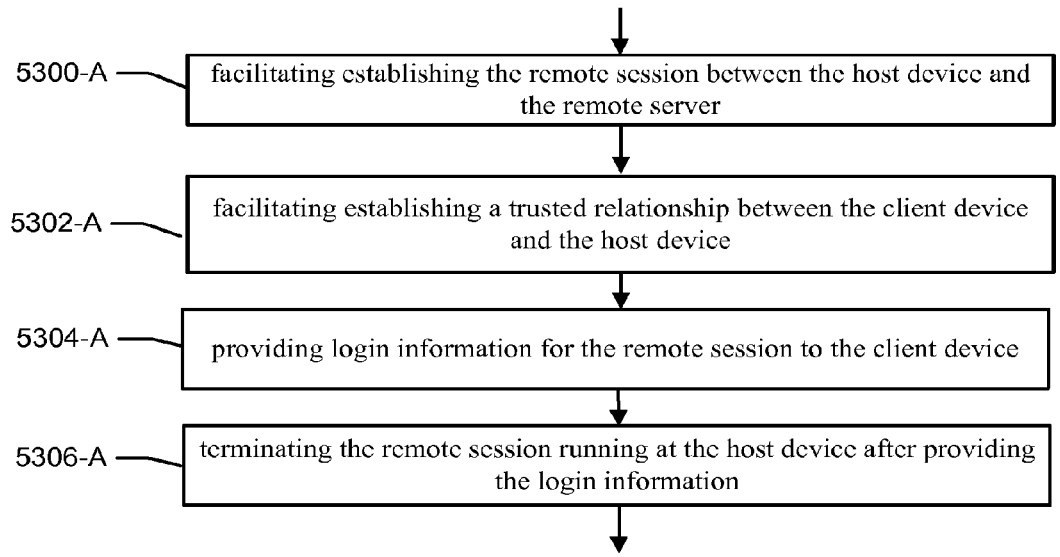
FIG. 53 illustrates an example of an operation of an apparatus according to one aspect of the present disclosure.
Figure 54:
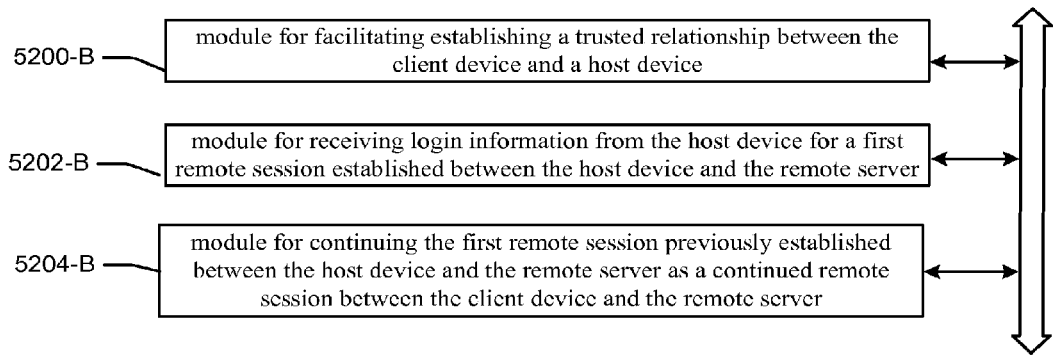
FIG. 54 illustrates an example of a configuration of an apparatus according to one aspect of the present disclosure.
Figure 55:
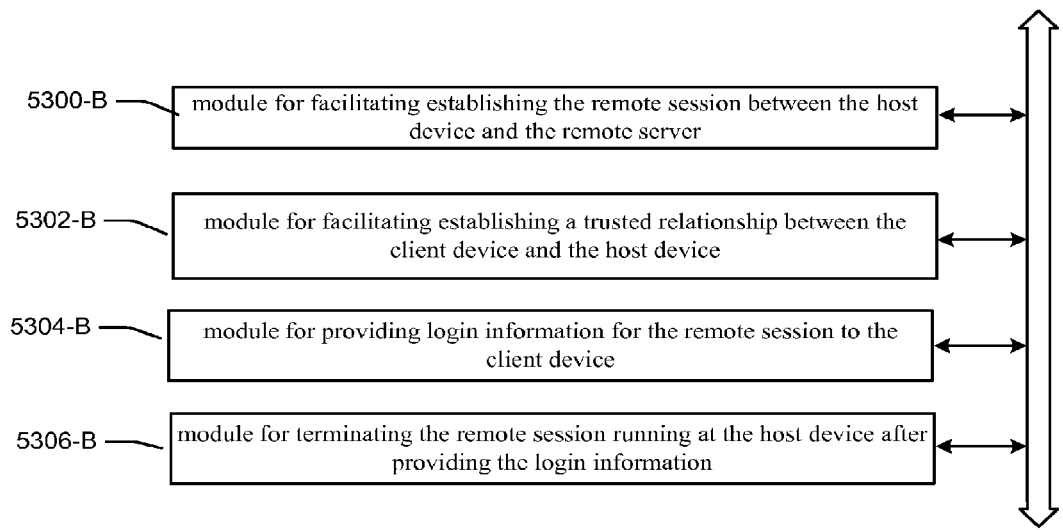
FIG. 55 illustrates an example of a configuration of an apparatus according to one aspect of the present disclosure.

FIG. 41 illustrates exemplary messages exchanged when a user forwards a live remote session from the host device 2506 to the client device 2502 by passing login information via the Bluetooth, connections so the user can receive the "remote session-to-go":

Message 4102 indicates that the user has already established a remote session between the remote server 2504 and the host device 2506.

Message 4104 indicates that the client device 2502 is paired with the host device 2506 via a Bluetooth connection Message 4106 indicates that the host device 2506 passes on the user login information to the client device 2502.

Message 4108 indicates that the client device 2502 re-establishes a remote session with the remote server 2504, using the login information received in message 4106, after the user disconnects or walks away from the host device 2506 and the live remote session runs on the client device 2502 and no additional authentication is needed from the user on the client device 2502.

Figure 56:
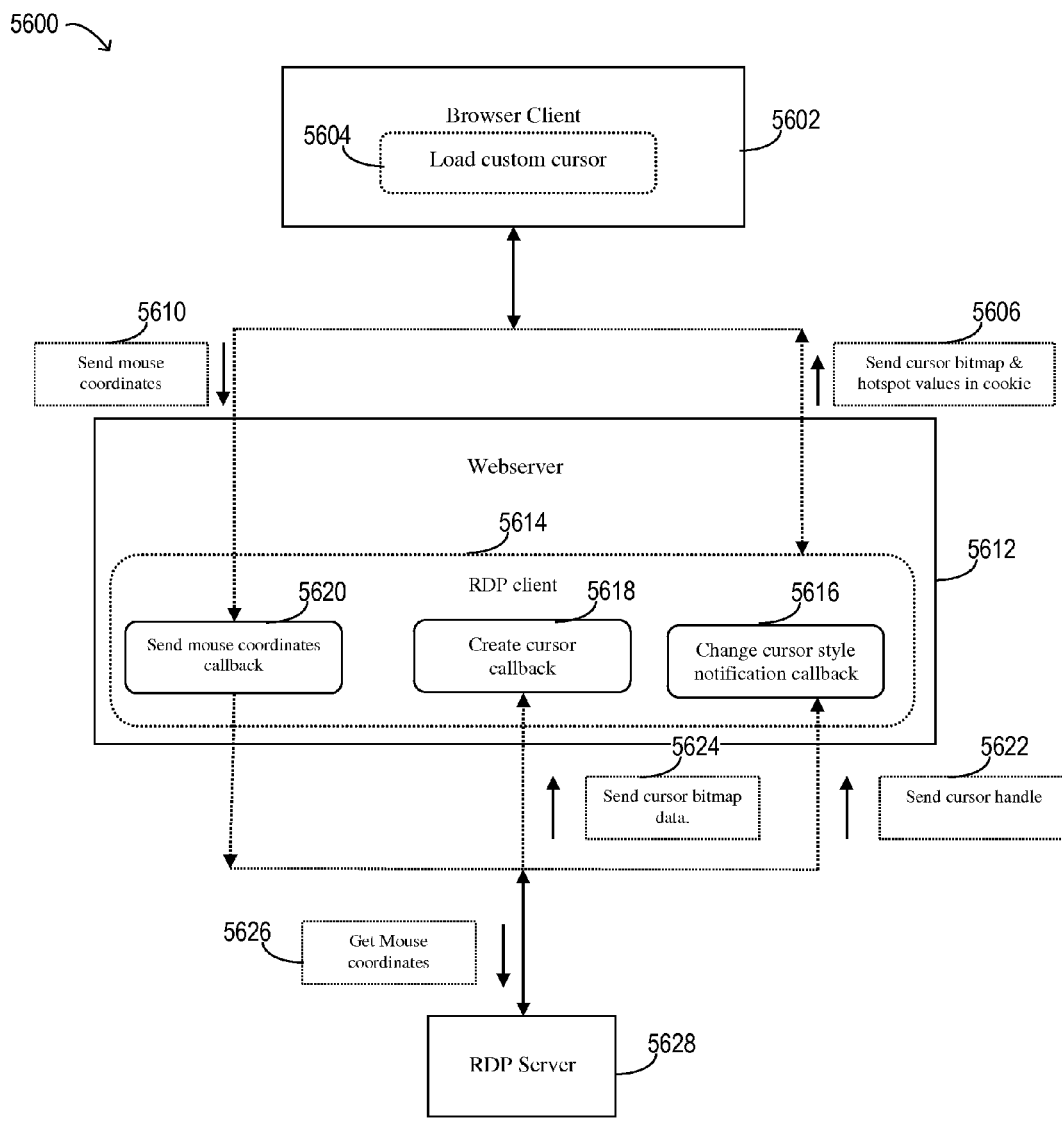
FIG. 56 illustrates an example of an operation of an apparatus according to one aspect of the present disclosure.

In particular embodiments, support for displaying or simulating a custom remote cursor (created in a remote RDP server session) in a browser client. In these embodiments, the server or webserver creates the custom cursor, which is read and displayed at the client browser without any client-side overhead. The webserver may comprise a memory in communication with a processor and other electronic components known to one of ordinary skill in the art. Referring to FIG. 56 and generally to 5600, a webserver 5612 utilizes components of an RDP client 5614 to interact with an RDP server 5628. The webserver 5612 is hosted on a server, such as an Internet Information Server ("IIS"), and it loads the RDP client. The webserver 5612 may be any type of webserver known to a person of ordinary skill in the art, for example, a Cirrus webserver or a Freezer webserver. The RDP client 5614 is responsible for communicating with the RDP server 5628 and getting the required details from the RDP server 5628.

In one embodiment, as illustrated in FIG. 56, an exemplary remote cursor process is shown. The webserver 5612 communicates with the RDP client 5614 via callback functions. For example, the RDP client may communicate using a send mouse coordinates callback function 5620, a create cursor callback function 5618, and change cursor style notification callback function 5616. A separate function exists to receive the cursor bitmap data 5624 at the RDP client 5614 from the RDP server 5628. A person of ordinary skill in the art would understand that any number of separate functions could exist for any number of desired functionalities. A separate function exists to retrieve the bitmap data and hotspot values 5606 of the cursor from the RDP client and to notify the RDP client that the cursor style has changed and that a different function is used. The bitmap data and hotspot values may be communicated, via a cookie or any other means known to one of ordinary skill in the art, to the browser client. A position of the mouse as denoted by its coordinates is communicated to the RDP client via a separate function 5610. The cursor handle is communicated to the RDP client via a separate function 5622.

The RDP client 5614 initiates a new connection to the RDP server 5628. The webserver 5612 initiates the new RDP connection via an RDP client 5614. The browser client 5602 sends the current position (or coordinates) of the remote cursor, such as the mouse pointer 5610, which is communicated to the RDP server 5628. The browser client 5602 loads the custom cursor via a separate function 5604.

Figure 57:
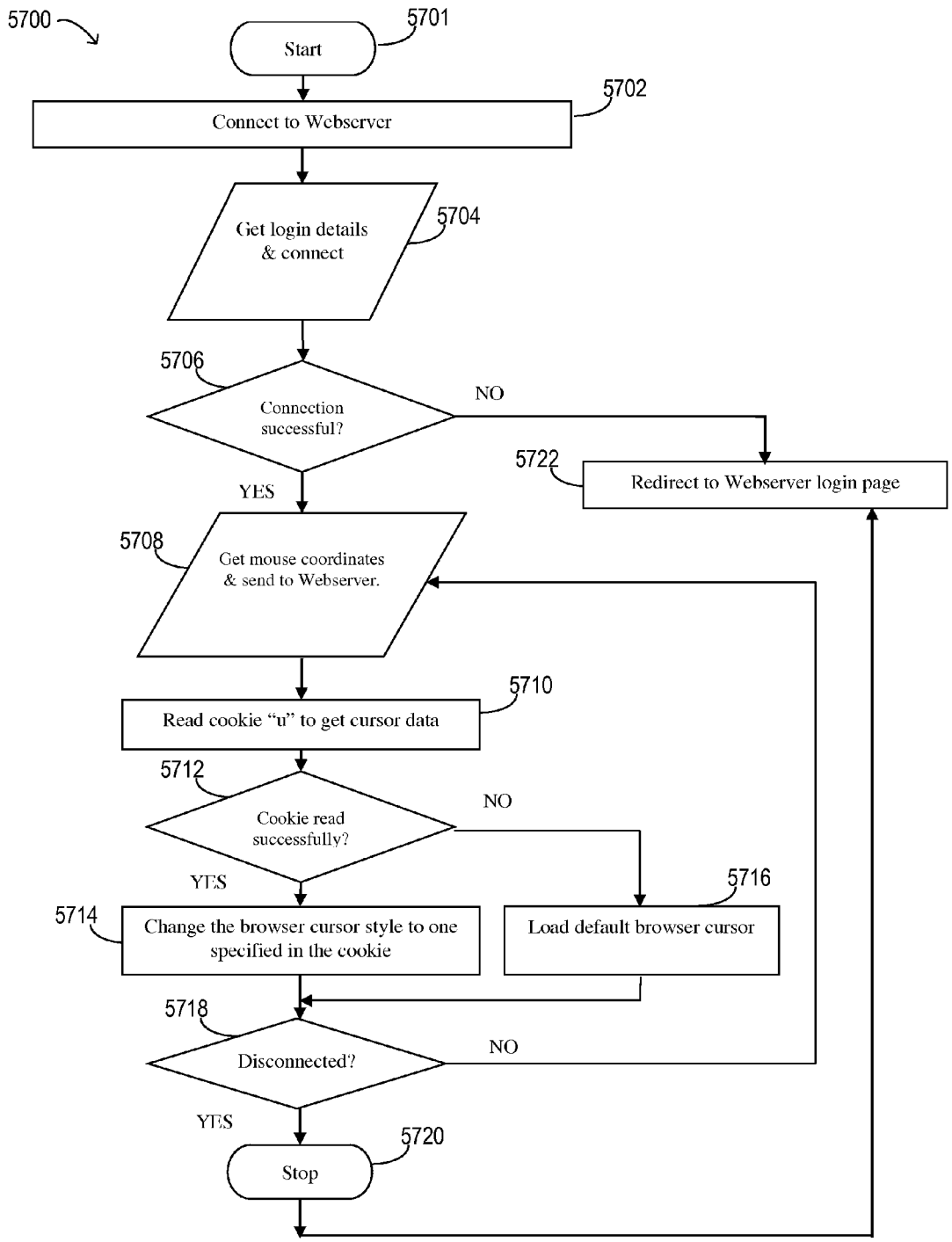
FIG. 57 illustrates an example of an operation of an apparatus according to one aspect of the present disclosure.

In one embodiment, as illustrated by FIG. 57 and generally by 5700, an exemplary process for changing a remote cursor begins at operation 5701. The browser client (such as browser client 5602) attempts to connect to the webserver (such as webserver 5612), operation 5702. For example, a connection could be established to a Freezer or Cirrus webserver via a specified URL such as a URL that follows the format of http://<IP Address>/Cirrus. The webserver may require a login or other connection negotiations. At operation 5704 the login details are received and a connection is attempted. The browser client determines if the connection is successful to the webserver was successful, operation 5706. If successful, the browser client gets and sends the remote cursor data, such as mouse coordinates, to the web server, operation 5708. Then the cursor data is read, for example the browser client reads the cursor data sent via the variable "u" in a cookie, operation 5710. If the cookie values are read successfully (5712), the browser cursor style is changed to the one specified in the cookie, operation 5714, and it is determined if the connection to the webserver is still active or if it has been disconnected, operation 5718. If the connection is still active, the browser client continues to processing at operation 5708. If the browser client is disconnected the processing stops (5720) and the browser client is redirected to the webserver login page, operation 5722. Also, if the original connection is not successful from operation 5706, the browser client is redirected to the webserver login page, operation 5722.

The steps described for implementing a change of a cursor type or creating a cursor type constitute one cycle of creation and display of the specified cursor. The steps may be repeated any number of times as necessary. The architecture behind the creation and display of specified cursors is such that the display of remote cursors is a smooth and efficient operation. This architecture makes sure no restrictions are placed on the style of the cursor to be displayed and that any styles the RDP server understands and creates may be recreated and displayed on the client browser side. Once the RDP session is terminated, for example, logged off or the connected system is disconnected or turned off, then all the saved cursor files are deleted from the storage device and associated resources are released. The browser cursor is restored to the default cursor. This approach ensures support for all types of cursors and that the cursors are created and displayed in an efficient manner.

Figure 58A:
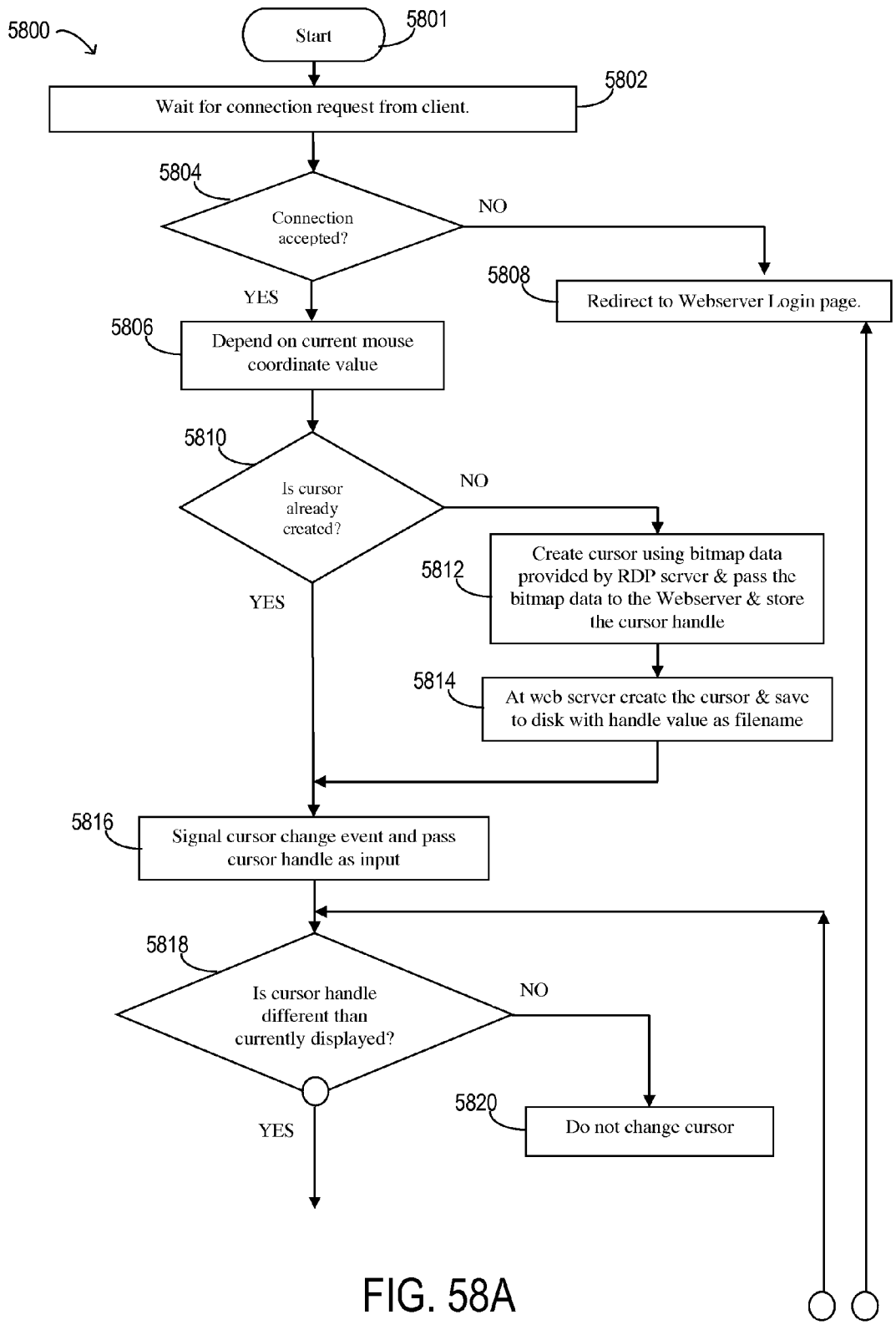
FIG. 58A and FIG. 58B illustrate an example of an operation of an apparatus according to one aspect of the present disclosure.
Figure 58B:
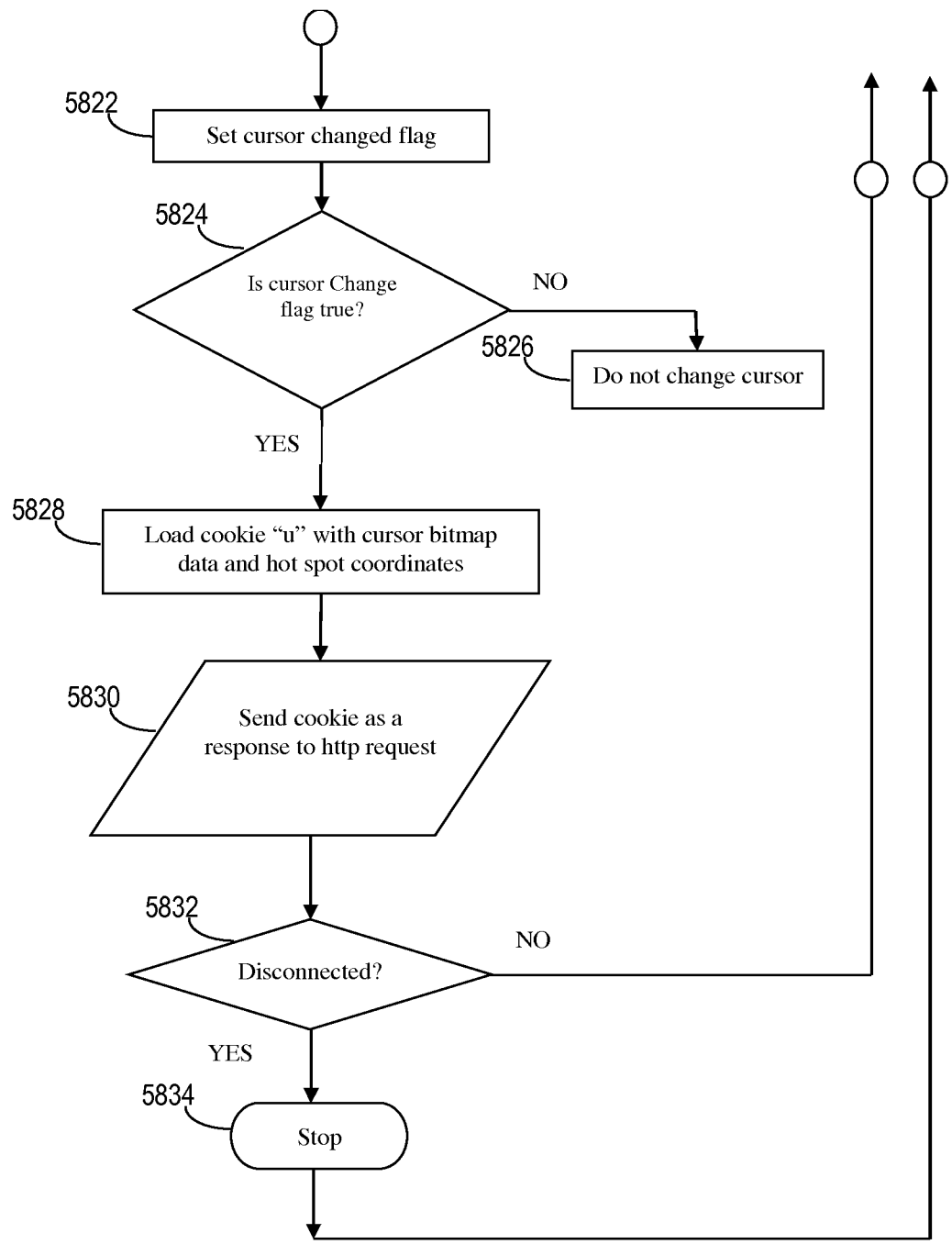

In one embodiment illustrated in FIG. 58A and FIG. 58B and generally as 5800, the process for a remote cursor begins at operation 5801. The webserver waits for a connection request from a client, such as a browser client, operation 5802. If the connection is not accepted or established, step S804, the browser client is redirected to the webserver login page, operation 5808. If the connection is accepted (5804) the process begins using the current remote cursor, or mouse, coordinate values, operation 5806. At operation 5810, for example, based, at least in part, on the current position (or coordinates) of the cursor sent by the browser client (5806), the RDP server determines if the cursor has been created. If the cursor has been created, the operation continues to 5816. If the cursor has not been created, the cursor is created at operation 5812 using the bitmap data provided by the RDP server. The bitmap data is passed to the webserver and the webserver stores the cursor handle. The cursor data may be shared and displayed. If the cursor has not been created, the RDP server determines what type of cursor should be created. For example, the RDP server may determine whether to create a 1-bit or 32-bit cursor. Once the type of cursor has been determined, the RDP server sends the bitmap details related to the cursor to be created to the RDP client component. The RDP client component then creates the cursor using bitmap data and returns the handle of the cursor which is stored in the internal data structure, operation 5814. If mask data is available in the cursor bitmap data from the RDP server then that mask data may be used to create the cursor. If mask data is not available in the cursor bitmap data, then mask data may first be constructed and then this newly constructed mask data is used to create the cursor.

The cursor is created on the RDP client component side so as to obtain a valid and unique cursor handle which may be useful when implementing a change in the cursor style. The cursor created on the RDP client component is not used anywhere else.

The RDP client component passes all the bitmap data and required parameters to the webserver component, for example, a Cirrus or Freezer webserver component. Depending on the cursor type, the webserver RDP client component creates the cursor and saves the cursor to a specific location in a storage device, for example, a specified path or address of a hard drive. The storage device may be any device known to one of ordinary skill in the art for the electronic storage of information.

The webserver component may have different logic for each type of cursor. For example, 1-bit types of cursors are created using XOR mask data and as icon types and 32-bit types of cursors are created as a bitmap and then converted to an icon format. As a result, transparency is achieved in both types of cursors.

After the cursor has been created and saved to disk (5814), resources associated with or allocated for the creation of the cursor are released. In one aspect, the RDP server ensures that each style of a cursor is created only once and is available for re-use whenever required. To provide greater efficiency and better performance in the cursor handling process, the cursor is saved with the handle value as its file name. Thus, when the cursor style is changed, the fetching of a specific corresponding cursor is easy as the file name is the specific cursor's handle value. The cursor may be saved in any file format known to one of ordinary skill in the art. For example, the cursor may be saved in a .cur file format which is a universal file format for cursors and is supported by most widely used browsers.

Once the cursor has been created and saved, the RDP server instructs the RDP client component to set the cursor to a specific style. The RDP server uses the cursor handle value as an input passes this input on to the webserver. The webserver constructs the physical file path for the cursor file and then sets an internal cursor flag that indicates that the cursor style has changed, operation 5816. If it is determined that the cursor handle is not different that the cursor handle of the currently displayed cursor (5818), the operation does not change the cursor (5820). If it is determined that the cursor handle indicates a different cursor is currently displayed (5818), the cursor changed flag is set (5822). If the cursor change flag has not been set to "TRUE" (5824) then the operation does not change the cursor, operation 5826. The main response thread of the webserver continuously polls for changes to the internal change cursor flag. If the cursor flag has changed or is "TRUE" then a cookie with a name "u", for example, is populated with the associated cursor file bitmap data along with hot spot coordinates, operation 5828. The cookie is passed as a response to a request, such as an HTTP request, operation 5830. The browser client reads the "u" cookie data and passes it to the cursor change function. The browser then loads the specific cursor instead of the default or standard cursor.

The cursor, along with corresponding bitmap data, has hot spot coordinate values, which provide the hot spot position for the specific cursor. The hot spot values received from the RDP server are passed on to the browser client via the same cookie "u" discussed with respect to the cursor flag. The hot spot values help maintain the cursor click precision and accuracy of mouse clicks. Then the client program, for example, a program written in JavaScript or any other software language known to one of ordinary skill in the art, specifies that the cursor file should be loaded and its hot spot position values may be considered by the API for changing the cursor. The displayed cursor has the attributes associated with the specified style and cookie data. The handling of the creation and display of the cursor is performed with respect to multiple instance environments, for example, multiple clients accessing a webserver, such as a Cirrus webserver or Freezer webserver, at the same time with error and with efficient performance. Next, it is determined if the connection to the webserver is still active or if it has been disconnected, operation 5832. If the connection is still active, the browser client continues to processing at operation 5818. If the browser client is disconnected the processing stops (5834) and the browser client is redirected to the webserver login page, operation 5808.

Figure 59:
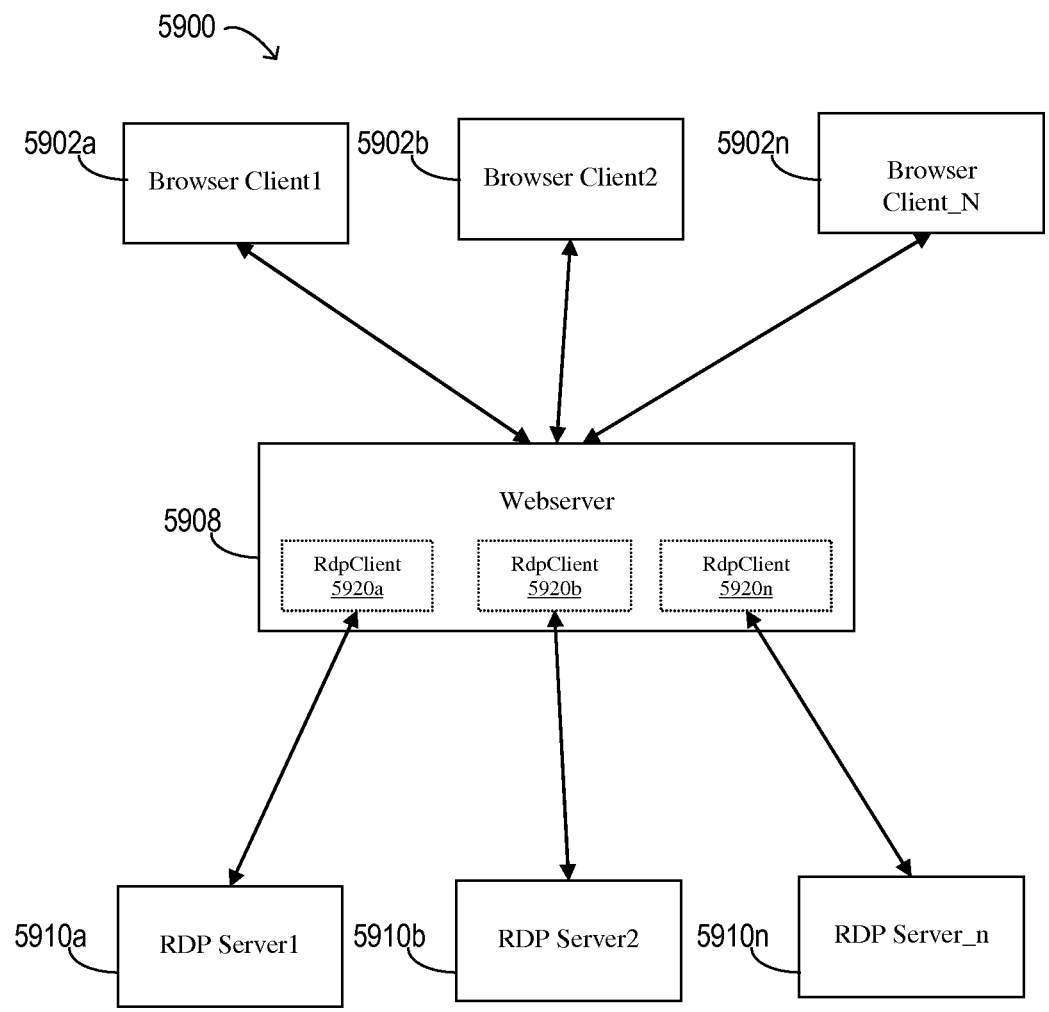
FIG. 59 illustrates an example of an operation of an apparatus according to one aspect of the present disclosure.

In one embodiment, a single session of RDP may be shared with multiple users where the multiple users may be at multiple different physical locations as illustrated in FIG. 59 and generally as 5900. Each user may operate a corresponding specific browser client represented as 5902*a*, 5902*b*, up to 5902*n*. Thus, any number of browser clients may communicate with the webserver 5908. Webserver 5918 may be Cirrus webserver or a Freezer webserver. The webserver 5908 may include multiple RDP Client components 5920*a*, 5920*b* through 5920*n* where n is any number of RDP Client components that would be supportable by the server 5908. Each RDP Client may interface with a corresponding RDP Server, 5910*a*, 5910*b* through 5910*n*. In other embodiments, multiple browser clients, 5902*a*, 5902*b* through 5902*n*, may communicate with webserver 5908 where webserver 5908 includes a single RDP Client 5920*a* and where RDP Client 5920*a* communicates with a single RDP server 5910*a*. Each browser client, 5902*a*, 5902*b*, through 5902*n*, may interact with a single session of RDP using each browser client's own respective inputs, such as mouse, keyboard or touchscreen inputs or any other inputs known to one of ordinary skill in the art. Such interaction allows users who are separated by geographical areas or physical locations to interact with each other by sharing the single RDP session. The ability of the user to interact with each other over a single RDP session extends the capability of the virtualization domain to support many features that are available in a normal desktop application. For example, a user's desktop may have different desktop sharing tools, and these tools may be used to share user's current desktop. Installing these desktop applications to achieve the same result on a thin client is not an efficient and economic option because such applications may need more resources to execute properly than may be available or even present at any given time.

Figure 60:
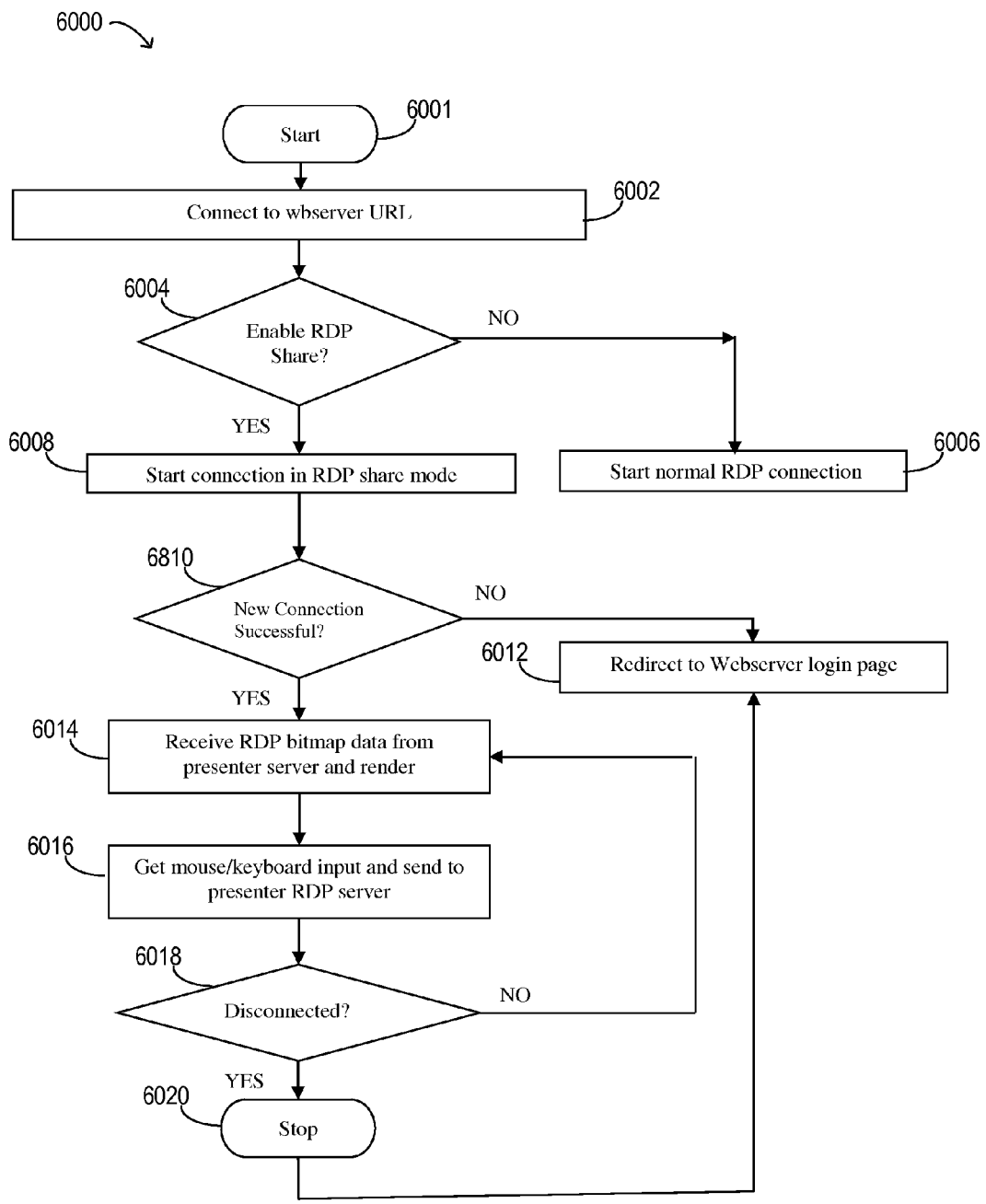
FIG. 60 illustrates an example of a configuration of an apparatus according to one aspect of the present disclosure.

The user may be provided with options that permit RDP sharing functionality to be enabled or disabled as illustrated in FIG. 60 and generally at 6000. The operation begins at 6001 and the browser client connects to the webserver via a URL as previously discussed, operation 6002. After a user starts a session with the RDP share option enabled, determined at operation 6004, the server initiates the first RDP connection in RDP share mode (6008) and sets internal flags. The internal flags may provide information that identify that the current RDP session is running in shared mode. If the RDP share is not enabled then processing continues as a normal RDP connection, operation 6006. Next, when the server receives a new connection request, it determines whether the RDP sharing flag is set to true. If the RDP sharing flag is set to true, the server bypasses the procedure of initiating a new RDP connection and begins operating in broadcast mode. For example, a single RDP session begins running on a server and more than one client may be connected to this same session. It is determined if the new connection is successful, operation 6010. If the new connection is not successful, the client browser is redirected to the webserver login page, operation 6012. If the connection is successful, then bitmap data received from this single RDP session is passed to each of the client browser connections, operation 6014. The inputs received from each of the client browsers are communicated to the single RDP session, operation 6016. At operation 6018 it is determined if the connection is still active. If disconnected or no longer active, the processing stops and the browser client is redirected to the webserver login page, operation 6012. If the connection is not disconnected, processing continues at operation 6014.

Figure 61:
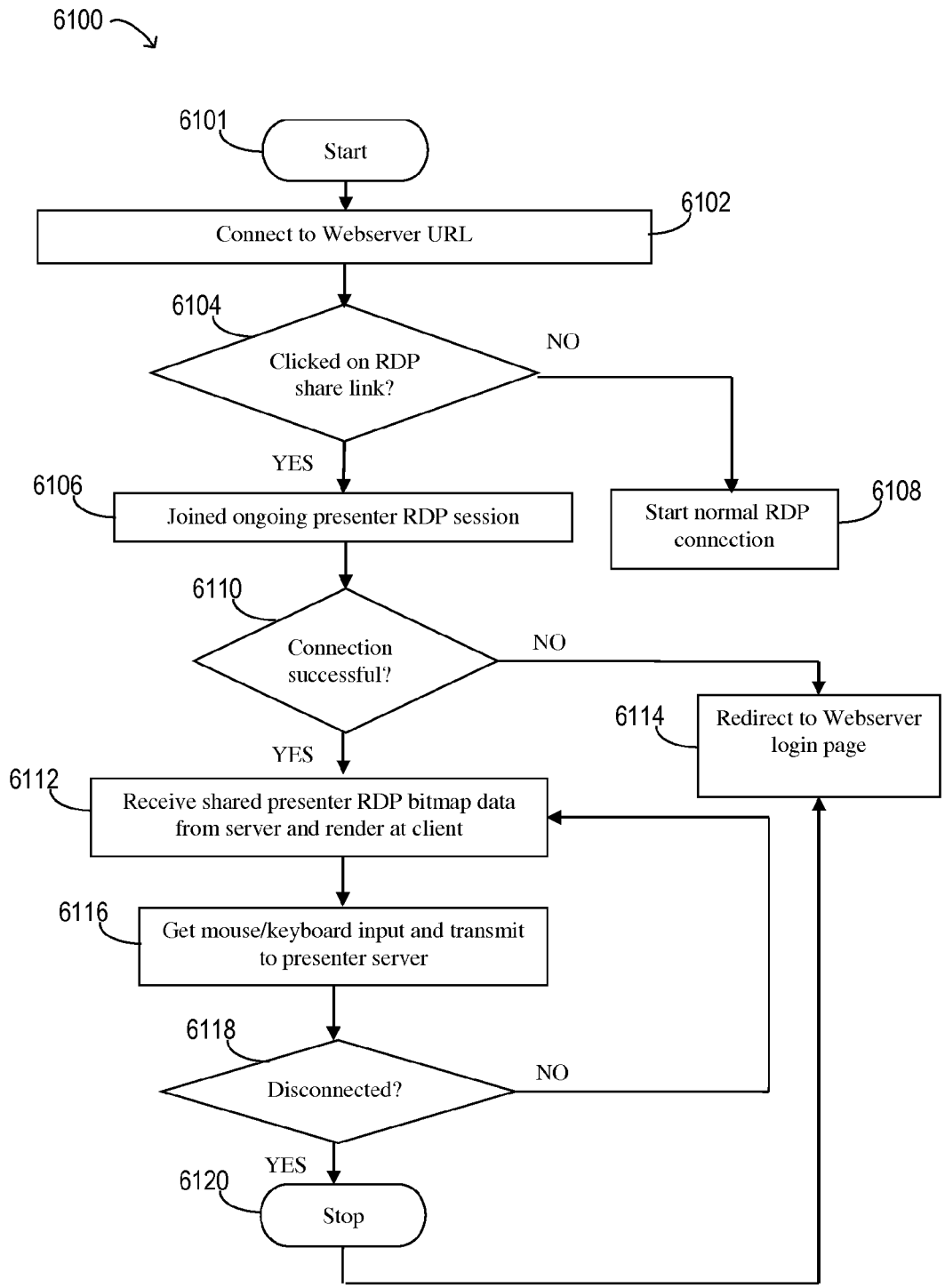
FIG. 61 illustrates an example of a configuration of an apparatus according to one aspect of the present disclosure.

The client component may provide a GUI option to enable or disable the RDP share or desktop sharing functionality. When any client initiates a connection with the RDP share functionality enabled, the information related to the RDP share functionality is saved on the server side. Next, when another client connects to the server, that client will be notified about the current active ongoing RDP shared sessions. For example, as illustrated in FIG. 61 and generally at 6100, a process begins at 6101. A user connects to the webserver URL as discussed previously, operation 6102. A user at the browser client may be notified by displaying one or more links associated with the RDP shared sessions. Once it is determined that any of the displayed links is selected by the user (6104), the client will join the shared RDP session (6106). If the user does not click on an RDP share link, a normal RDP connection is attempted to be established, operation 6108. If the connection is not established, the browser client is redirected to the webserver login page, operation 6114. If a connection is established, the browser client receives shared presenter RDP bitmap data from the RDP server (or RDP presentation server) and subsequently rendered at the browser client, operation 6112. The inputs are acquired and transmitted to the RDP server (or RDP presentation server), operation 6116. Next, it is determined if the RDP session has been disconnected, operation 6118. If the RDP session is still active, processing continues at operation 6112. If the RDP session is not active, or disconnected, the processing stops at 6120 and the browser client is redirected to the webserver login page, operation 6114. An active RDP session may be operated by any one or all of the users. Any changes made by one user or client in the session may be visible to all the joined users in their respective browsers. The client component is provided with extra intelligence and flexibility to allow controlling of the inputs in the main presenter session and in any of the joined sessions. The inputs may be any inputs known to one of ordinary skill in the art, for example, mouse, keyboard or touchscreen inputs.

Several steps may be required to enable the data sharing mode of the RDP client component to achieve the RDP share or desktop sharing functionality provided by the webserver. For example, a GUI option may be provided to allow the enabling or disabling of the RDP share/desktop sharing functionality. A user may access a login page that provides a GUI interface where the user is permitted to enable or disable the RDP share functionality. In another example, the browser client communicates to the webserver that the RDP share functionality should be enabled or disabled.

Once the RDP share functionality has been selected or enabled, the value of a parameter, such as the "desks" parameter, is set to '1' and passed to the webserver. The webserver responds by enabling the RDP share functionality. The webserver sets an internal flag which identifies that RDP share functionality is enabled. In multiple instance environments information associated with each RDP shared session is recorded to track which instance has enabled RDP sharing functionality. Such information may be stored in a database, for example, an internal Instance.ini file may be used as a database. An entry of the database, for example a "DeskShare" entry of the ini file, may be updated with the current Instance ID (for example, using 1 or 2 . . . n). The information associated with the current Instance ID may indicate that the specific instance is running under shared desktop mode.

The webserver begins operating in broadcast mode to serve the requests of one or more different browser clients. In one embodiment, an RDP session connection is active and the server redirects the RDP image data to the presenter client browser and the mouse and keyboard inputs are directed to the RDP session. Another user (or attendee) may also connect to the server. Before the login page is loaded, certain steps may take place. On the home page load event, the client may send a request to the server to determine whether any RDP server session is running in shared mode. The server reads the information associated with the RDP share, for example, the Instance.ini file, to obtain the list of instance ID's which are running in RDP share mode. The list is sent in response to the browser client's request. The browser client parses the instance ID list and prepares the RDP share URL for each instance. Once the RDP share URL is ready it is written dynamically to the login page. A link is displayed for each RDP session running in Share mode on the login page. The newly connected user may now view all the RDP shared links on the login page.

Figure 62:
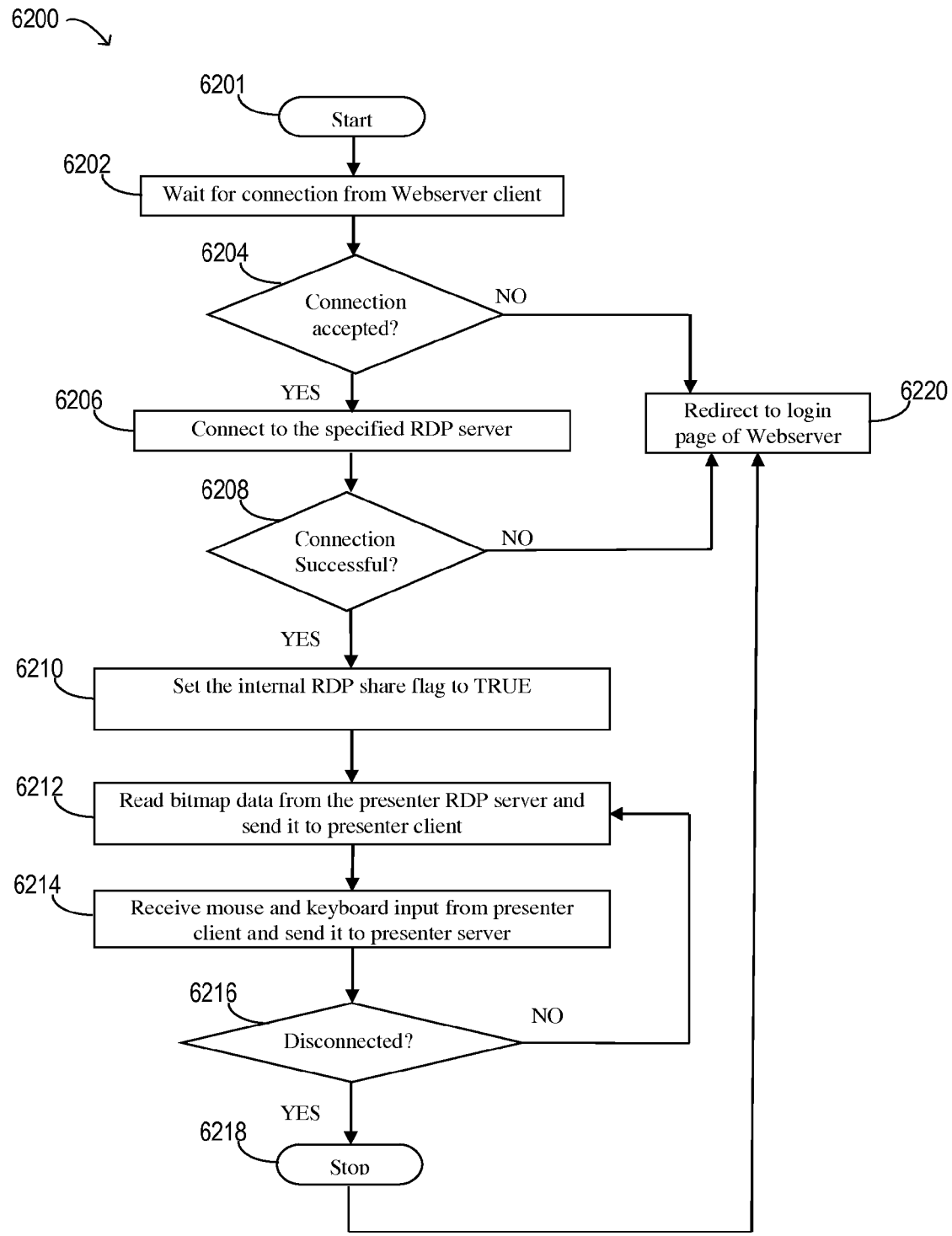
FIG. 62 illustrates an example of an operation of an apparatus according to one aspect of the present disclosure.

When a user selects any of the RDP shared links, a request is sent to the presenter RDP server. An exemplary process is illustrated in FIG. 62 and generally at 6200. The process begins at 6201 and the browser client waits for a connection to the webserver, operation 6202. The server returns an empty view to the browser client as a response without creating a new RDP connection. That is, the server has a single RDP session running which is listening for different requests from any number of browser clients. If a connection is not accepted by the webserver (6204) the client browser is redirected to the login page of the webserver, operation

6220. If the connection is accepted (6204), the process allows for connection to the specified RDP Server, operation 6206. If the connection to the RDP Server is not successful (6208) the client browser is redirected to the login page of the webserver (6220). If the connection is successful (6208) the process continues by setting the internal RDP share flag to "TRUE", operation 6210.

Figure 63:
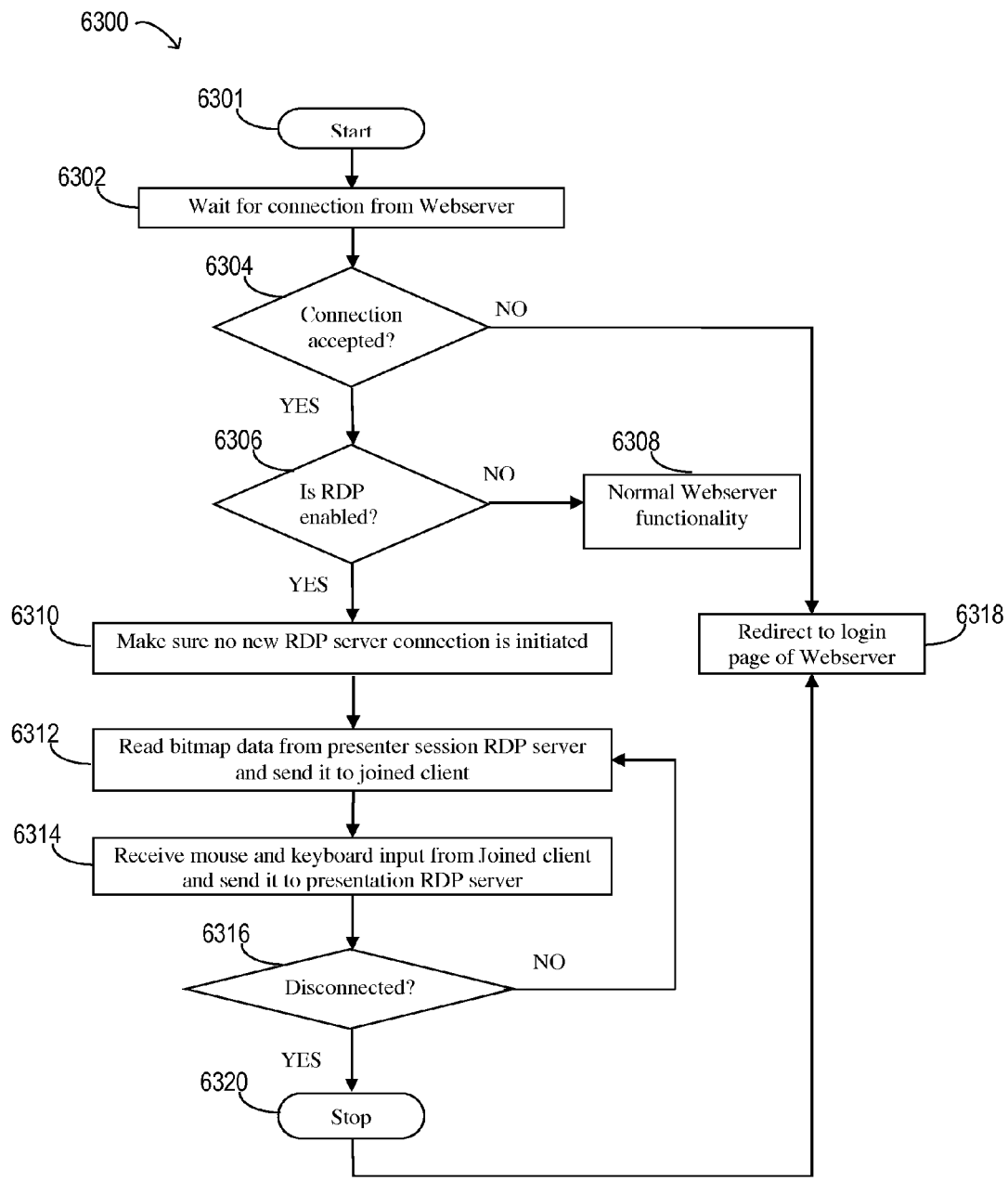
FIG. 63 illustrates an example of an operation of an apparatus according to one aspect of the present disclosure.

In another aspect, illustrated at FIG. 63 and generally at 6300, if the connection is accepted the process determines if the RDP share is enabled (6302) and if it is, the process makes sure that no new RDP server connection is initiated before proceeding, operation 6304. If the RDP share is not enabled the process continues to 6306 with normal webserver functionality. Returning to FIG. 62, Multiple browser clients may send requests to the webserver (which communicates with the RDP Server) for RDP Bitmap data (6212) and may also send captured input from keyboard and mouse events from different browser client instances to a single instance of an RDP session. For example, the mouse and keyboard inputs from the presenter browser client can be sent to the presenter server, operation 6214. RDP image data of one session may be shared between all instances of different client browsers and mouse and keyboard inputs from different browser clients may be communicated to a single instance of the RDP server. It is then determined if the RDP session is disconnected, operation 6216. If the RDP session is still active, not disconnected, the process continues to operation 6212. If the RDP session is not active, or has been disconnected, the process stops (6218) and the client browser is redirected to the webserver login page.

In one embodiment, flexibility of the system allows for certain operations to be restricted or rather only available to the main presenter session. For example, the mouse and keyboard inputs may be restricted to only the presenter session. When such restrictions are in the place, the attendee's may only be permitted to see what the presenter is presenting in the current RDP session. In other embodiments, no restrictions may be imposed and all content and functionality is available to both the presenter's session as well as the attendee's session. When the presenter and the attendee log off or disconnect from the RDP session, all connections are exited or dropped and the client browsers are redirected to a login page, for example, the login page of Cirrus.

Those of skill in the art would appreciate that the various illustrative blocks, modules, elements, components, methods, and algorithms described herein may be implemented as electronic hardware, computer software, or combinations of both.

For example, a module (e.g., a client remote session login information module 2604, a client session launch module 2606, a host trusted relationship module 2702, or any other modules) may be implemented as electronic hardware, computer software, or combinations of both. In one aspect, a module(s) may be an apparatus since a module(s) may include instructions encoded or stored on a machine-readable medium, on another device, or on a portion thereof. In one aspect, a module(s) may be software (e.g., an application, a subroutine) stored in a machine-readable medium and executable by a processing system or a processor. In another aspect, a module(s) may be hardware (e.g., machine-readable medium encoded with instructions, a preprogrammed general-purpose computer, or a special purpose electronic or optical device).

Various modules may reside in one machine or in multiple machines. In one example, modules for the server side (e.g., a host trusted relationship module 2702) may be located in one server or spread over multiple servers. In another example, modules for the client side (e.g., a client remote session login information module, a client session launch module 2606, etc.) may be located in one client device or spread over multiple client devices.

In one aspect of the disclosure, when actions or functions are described as being performed by a module or a component (e.g., establishing, sending, receiving, providing, building, displaying, registering, encrypting, decrypting, authenticating, notifying, accepting, selecting, controlling, issuing, transmitting, reporting, pushing, or any other action or function), it is understood that such actions or functions are performed by the module or the component directly or indirectly. As an example, when a module is described as performing an action, it is understood that the module may perform the action directly or may perform the action indirectly, for example, by facilitating such an action. For instance, when a session is described as being established by a module, it is understood that the module may establish the session indirectly by facilitating an establishment of the session. As yet another example, when a view of an application is described as being displayed or rendered by a module, it is understood that the view may be displayed or rendered by the module either directly or indirectly.

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system Skilled artisans may implement the described functionality in varying ways for each particular application.

Various components and blocks may be arranged differently (e.g., arranged in a different order, or partitioned in a different way) all without departing from the scope of the subject technology. In one aspect of the disclosure, the modules (or elements) recited in the accompanying claims may be performed by one module or by a smaller number of modules, and this arrangement is within the scope of the claims. In another aspect, the modules (or elements) recited in the accompanying claims may be performed by a larger number of modules, and this arrangement is within the scope of the claims. In yet another aspect, a module (or an element) recited in the accompanying claims may be performed by multiple modules, and this arrangement is within the scope of the claims. For example, a local view module and a remote view module may be combined into one module. A client remote access module, a local view module and a remote view module may be combined into one module. An agent module and a server remote access module may be combined into one module. In another example, these modules may be divided into a larger number of modules.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An information handling system comprising:
a memory;
a processor communicatively coupled to the memory; and
instructions encoded in the memory, the instructions, when executed by the processor, operable to perform operations comprising:
determining if a remote desktop protocol share option is enabled;
communicating to a remote desktop protocol (RDP) server via one or more RDP client components;
establishing a trusted relationship between a client device and the RDP server;
initiating an RDP session and setting one or more internal flags associated with the RDP session, wherein the internal flags include at least an RDP sharing flag;
communicating to the client device via the RDP session;
facilitating sharing of a desktop of the client device with one or more remote client devices;
determining whether to facilitate a second RDP session between a second client device and the RDP server;
beginning operation in broadcast mode based on the RDP sharing flag associated with the RDP session, wherein the second client device connects to the RDP session;
passing bitmap data associated with the RDP session to the client device and the second client device;
receiving one or more inputs from at least one of the client device and the second client device via the RDP session; and
placing one or more restrictions on the communication of the one or more inputs from at least one of the client device and the second client device.

2. A non-transitory machine-readable medium encoded with instructions for execution at an information handling system, the instructions comprising code for:
determining if a remote desktop protocol share option is enabled;
communicating to a remote desktop protocol (RDP) server via one or more RDP client components;
establishing a trusted relationship between a client device and the RDP server;
initiating an RDP session and setting one or more internal flags associated with the RDP session, wherein the internal flags include at least an RDP sharing flag;
communicating to the client device via the RDP session;
facilitating sharing of a desktop of the client device with one or more remote client devices;
determining whether to facilitate a second RDP session between a second client device and the RDP server;
beginning operation in broadcast mode based on the RDP sharing flag associated with the RDP session, wherein the second client device connects to the RDP session;
passing bitmap data associated with the RDP session to the client device and the second client device;
receiving one or more inputs from at least one of the client device and the second client device via the RDP session; and
placing at least one or more restrictions on the communication of the one or more inputs from at least one of the client device and the second client device.

3. The non-transitory machine-readable medium of claim 2, wherein the one or more inputs are inputs from one or more of a mouse or a keyboard.

4. The non-transitory machine-readable medium of claim 2, wherein the shared desktop comprises one or more sharing tools.

5. A non-transitory machine-readable medium encoded with instructions for execution at a server device side for communication and for forwarding display data related to a remote desktop protocol (RDP) session between a client device and a remote server device, the instructions comprising code for:

facilitating establishing a first RDP session between a first client device and the remote server device, wherein facilitating includes determining if an RDP share option is enabled;

establishing a trusted relationship between the first client device and the remote server device;

if the RDP share option associated with the first RDP session is enabled, initiating the first RDP session and setting one or more internal flags associated with the first RDP session, wherein the internal flags include at least an RDP sharing flag;

determining whether to facilitate a second RDP session between a second client device and the remote server device;

beginning operation in broadcast mode if the RDP sharing flag associated with the first RDP session is set, wherein the second client device connects to the first RDP session;

passing bitmap data associated with the first RDP session to the first client device and the second client device;

receiving one or more inputs from at least one of the first client device and the second client device via the first RDP session; and placing one or more restrictions on the communication of the one or more inputs from at least one of the first client device and the second client device.

6. The non-transitory machine-readable medium of claim 5, wherein a GUI option to allow enabling or disabling of the RDP share flag is communicated via an RDP client of the remote sever device.

7. The non-transitory machine-readable medium of claim 5, wherein share functionality associated with the RDP session is saved on the remote server device.

8. The non-transitory machine-readable medium of claim 5, the instructions further comprising code for:
notifying the second client device of currently shared RDP sessions, wherein the notification occurs after a connection to the remote server device.

9. The non-transitory machine-readable medium of claim 8, wherein the notification includes transmitting one or more links for display at the second client device.

10. The non-transitory machine-readable medium of claim 9, wherein the second client device is connected to the first RDP session after receiving a selection of a displayed link associated with the first RDP session from the second client device.

11. The non-transitory machine-readable medium of claim 5, the instructions further comprising code for:
transmitting to the first client device and the second client device shared presenter RDP bitmap data from an RDP server, wherein the RDP server is in communication with the remote server device.

12. The non-transitory machine-readable medium of claim 5, the instructions further comprising code for:
acquiring one or more inputs from the remote client device.

13. The non-transitory machine-readable medium of claim 12, wherein the one or more inputs comprise one of a mouse input, a keyboard input, and a touchscreen input.

14. The non-transitory machine-readable medium of claim 5, wherein the remote server device sets the RDP share flag based, at least in part, on a communication from the client device.

15. The non-transitory machine-readable medium of claim 5, the instructions further providing code for:
initiating one or more RDP sessions and setting one or more internal flags associated with the one or more RDP sessions, where in the associated one or more internal flags include at least a corresponding RDP sharing flag for each of the one or more RDP sessions.

16. The non-transitory machine-readable medium of claim 15, the instructions further providing code for:
receiving an RDP share option for each of the one or more RDP sessions.

17. The non-transitory machine-readable medium of claim 5, the instructions further providing code for:
recording information associated with the first RDP session.

18. The non-transitory machine-readable medium of claim 5, the instructions further providing code for:
initiating a third RDP session, where the third RDP session listens for different requests from one or more client devices.

19. The non-transitory machine-readable medium of claim 5, the instructions further providing code for:
restricting one or more operations from at least one of the first client device and the second client device.

20. The non-transitory machine-readable medium of claim 19, wherein the one or more operations includes at least one of a mouse input, a keyboard input and a touchscreen input.

* * * * *